(12) United States Patent
Kadowaki et al.

(10) Patent No.: US 9,328,289 B2
(45) Date of Patent: May 3, 2016

(54) LIQUID CRYSTAL ELEMENT AND LIQUID CRYSTAL COMPOSITION

(71) Applicant: MITSUBISHI CHEMICAL CORPORATION, Chiyoda-ku (JP)

(72) Inventors: Masami Kadowaki, Kanagawa (JP); Noriyuki Kida, Kanagawa (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 177 days.

(21) Appl. No.: 14/042,051

(22) Filed: Sep. 30, 2013

(65) Prior Publication Data

US 2014/0028965 A1    Jan. 30, 2014

Related U.S. Application Data

(63) Continuation of application No. PCT/JP2012/057990, filed on Mar. 27, 2012.

(30) Foreign Application Priority Data

Mar. 28, 2011    (JP) ................. 2011-070824

(51) Int. Cl.
| | |
|---|---|
| *G02F 1/1333* | (2006.01) |
| *G02F 1/137* | (2006.01) |
| *C09K 19/32* | (2006.01) |
| *C09K 19/54* | (2006.01) |
| *C09K 19/56* | (2006.01) |
| *C09K 19/04* | (2006.01) |

(52) U.S. Cl.
CPC ............. *C09K 19/56* (2013.01); *C09K 19/322* (2013.01); *G02F 1/133365* (2013.01); *C09K 2019/0448* (2013.01); *C09K 2019/548* (2013.01); *G02F 1/13718* (2013.01); *G02F 2001/13706* (2013.01); *G02F 2001/13775* (2013.01)

(58) Field of Classification Search
CPC ...... C09K 19/42; C09K 19/56; C09K 19/322; C09K 2019/0448; C09K 2019/548; G02F 1/13718; G02F 2001/13706; G02F 2001/13775; G02F 2001/133365
See application file for complete search history.

(56) References Cited

U.S. PATENT DOCUMENTS

| | | |
|---|---|---|
| 5,305,126 A | 4/1994 | Kobayashi et al. |
| 5,680,185 A | 10/1997 | Kobayashi et al. |
| 2004/0161549 A1 | 8/2004 | Niyama et al. |
| 2006/0066793 A1 | 3/2006 | Ohmuro et al. |
| 2010/0272925 A1 | 10/2010 | Goetz et al. |
| 2012/0032112 A1 | 2/2012 | Czanta et al. |
| 2012/0236246 A1 | 9/2012 | Furusato et al. |

FOREIGN PATENT DOCUMENTS

| | | |
|---|---|---|
| JP | 05-224187 | 9/1993 |
| JP | 6-507505 | 8/1994 |
| JP | 09-090328 | 4/1997 |
| JP | 09-152578 | 6/1997 |
| JP | 11-160691 | 6/1999 |
| JP | 2000-119656 | 4/2000 |
| JP | 2006-91545 | 4/2006 |
| JP | 2010-256904 | 11/2010 |
| JP | 2011-092973 | 8/2011 |
| TW | 201035296 A1 | 10/2010 |
| TW | 201037063 A1 | 10/2010 |
| WO | 92/19695 | 11/1992 |
| WO | 93/23496 | 11/1993 |
| WO | 2010/089092 | 8/2010 |
| WO | 2011/092973 | 8/2011 |

OTHER PUBLICATIONS

Extended European Search Report issued Oct. 16, 2014 in Patent Application No. 12764839.2.
International Search Report issued May 15, 2012 in PCT/JP2012/057990 filed Mar. 27, 2012.
"Polymer Network-Stabilized Liquid Crystals", Dierking, I. Adv Mater 2000, 12, 167.
"Effects of Monomer Structure on the Morphology of Polymer Network and the Electro-Optical Property of Reverse-Mode Polymer-Stabilized Cholesteric Texture", Yuhai Yin, Journal of Applied Polymer Science, vol. 111, 1353-1357(2009).
Combined Chinese Office Action and Search Report issued Sep. 11, 2014, in Chinese Patent Application No. 201280015853.1 with English translation.
Office Action issued on May 12, 2015 in Chinese Patent Application No. 201280015853.1 with English translation.
Combined Taiwanese Office Action and Search Report issued Jun. 15, 2015 in Patent Application No. 101110719 (with English translation).

*Primary Examiner* — Shean C Wu
(74) *Attorney, Agent, or Firm* — Oblon, McClelland, Maier & Neustadt, L.L.P.

(57) ABSTRACT

A liquid crystal element which comprises: a pair of substrates with electrodes, in which the substrates are arranged so as to face each other and at least one of the substrates is a transparent substrate; and a liquid crystal light adjusting layer which is disposed between the substrates and contains a composite containing a chiral nematic liquid crystal phase and a polymer resin phase, wherein the polymer resin phase contains a polymer compound having a specific repeating unit, and dielectric constant anisotropy of the chiral nematic liquid crystal phase is positive.

17 Claims, 3 Drawing Sheets

LIQUID CRYSTAL ELEMENT AND LIQUID CRYSTAL COMPOSITION

This application is a continuation of PCT/JP2012/057990 filed Mar. 27, 2012 and claims the benefit of JP 2011-070824 filed Mar. 28, 2011.

TECHNICAL FIELD

The present invention relates to a liquid crystal element and a liquid crystal composition. More specifically, it relates to a liquid crystal element and a liquid crystal composition, which are effective as a liquid crystal element which does not use a polarizing plate and is capable of being used in a so-called reverse mode in which it becomes a transparent state or a selectively reflective state toward a visible light at the time when voltage is not applied and it becomes a scattered state at the time when voltage is applied.

BACKGROUND ART

Hitherto, a liquid crystal element in which a liquid crystal and a transparent polymer resin are compounded to fix a liquid crystal alignment is called a polymer-stabilized liquid crystal (PSLC), has attracted attention since the element exhibit excellent optical properties and response properties, and has been used in displays and the like. As the liquid crystal element, a liquid crystal composition and an element suitable for an AM (active matrix) element have been disclosed (Patent Document 1).

Among liquid crystal elements, a transmissive-scattering liquid crystal element that is obtained by compounding a liquid crystal and a transparent polymer resin and utilizes the difference in refractive index between the polymer and the liquid crystal or between liquid crystal domains exhibits a high efficiency of utilization of visible light since it does not require a polarizing plate, and hence the element has attracted attention. As the transmissive-scattering electro-optical element, in addition to PSLC, polymer dispersed liquid crystals (PDLC) have been widely known. In the former, a minute amount of polymer ranges as a reticulate network in a continuously spread liquid crystal phase and the latter has a structure in which liquid drops of a liquid crystal phase are dispersed in a polymer film (Non-Patent Document 1).

These liquid crystal elements have been in practical use as light modulating shutters in windows, doors, partitions, and the like of vehicles such as electric trains and automobiles, buildings such as office buildings and hospitals, for the purpose of design, protection of privacy, and the like. Moreover, they have been used as display devices for displaying characters and diagrams.

In such devices, in general, since the use time in a transparent state is overwhelmingly long, it is desired to have a reverse mode electro-optical effect that acts so that the element is transparent at the time when voltage is not applied and becomes in a scattered state at the time when voltage is applied, from the viewpoint of electric power saving.

In order to realize the reverse mode transmissive-scattering electro-optical element, generally, there has been known a method of photocuring a photocurable liquid crystal composition with retaining a transparent state such as homogeneous, planer, or homeotropic one to form a composite of a liquid crystal and a polymer resin. As such a liquid crystal element, there have been known PSCT (Polymer Stabilized Cholesteric Texture) utilizing transmission and scattering of visible light by phase change of a chiral nematic liquid crystal having a positive dielectric constant anisotropy as PSLC and a method of using a liquid crystal having a negative dielectric constant anisotropy as PDLC. However, the latter has problems that temperature dependency of visible light transmittance is large, view angle dependency is large, the liquid crystal is expensive, or the like. On the other hand, the former has advantages that temperature dependency of the visible light transmittance is small, view angle dependency of the visible light transmittance is small, and the response rate of the element is fast, and hence is considered promising.

As a process for producing the PSCT-method liquid crystal element, there is opened to public in Patent Document 2 a method of inducing a phase separation into a chiral nematic liquid crystal phase and a polymer resin phase by photopolymerization to form a reticulate polymer network, in a liquid crystal composition in which a minute amount of a polymerizable monomer and a polymerization initiator are mutually dissolved in a chiral nematic liquid crystal having a positive dielectric constant anisotropy.

As a characteristic feature of the polymerizable monomer for use in the PSCT method, in general, it has been known that the monomer has (i) crosslinking ability, (ii) linearity, and (iii) a rigid core (Non-Patent Document 2). As the polymerizable monomer, in Patent Document 3, a curable compound having a chroman structure as a partial structure is mentioned and also a liquid crystal element composed of a resin derived from the curable compound and a chiral nematic liquid crystal and having a good optical properties is mentioned.

In Patent Document 4, a composite containing a cured product of a curable compound having a 4,4'-biphenylene skeleton wherein a curing rate is improved and a liquid crystal is described. Moreover, Patent Document 5 describes that a polymerized product of a 4,4'-bisacryloyloxybiphenyl compound is used as a transparent solid substance of a light adjusting layer, and the element is produced for a short period of time by ultraviolet irradiation at a high illuminance.

PRIOR ART DOCUMENTS

Patent Documents

Patent Document 1: WO2011/092973
Patent Document 2: JP-T-6-507505
Patent Document 3: JP-A-9-90328
Patent Document 4: JP-A-2000-119656
Patent Document 5: JP-A-5-224187

Non-Patent Documents

Non-Patent Document 1: Dierking, I. Adv Mater 2000, 12, 167
Non-Patent Document 2: Yuhai Yin, Journal of Applied Polymer Science, Vol. 111, 1353-1357 (2009)

SUMMARY OF THE INVENTION

Problems that the Invention is to Solve

In order to realize a good contrast in a reverse mode PSCT liquid crystal element, in a composite of a chiral nematic liquid crystal and a polymer resin at the time when voltage is not applied, it is necessary to retain a planer structure of the liquid crystal stably. Hitherto, the property is known to be greatly dependent on the interfacial interaction between the chiral nematic liquid crystal and the polymer resin and a structural form of the polymer. However, the interaction and the structural form have not been able to predict from the molecular structure of a polymer precursor. In recent studies, for improving compatibility of a host liquid crystal with a polymer precursor in order to obtain a high contrast, a method of using a liquid crystalline monomer as in Patent Document 4 is known. However, even in the case of using such a monomer, there arises a difficulty that a liquid crystal structure is disturbed owing to severe phase separation and temperature increase caused by a light source or heat of reaction when rapid curing is intended with a strong light and thus transmittance in a transparent state decreases. Furthermore, in the above Patent Document 3, a long period of time, e.g., several hours, is required for composition curing. In Patent Document 4, an improvement in the curing rate is achieved but several tens of minutes are still required for the composition curing and thus the improvement is not yet satisfactory in view of productivity. On the other hand, in Patent Document 5, an element is produced for a short period of time by ultraviolet irradiation at a high illuminance but the method is not yet satisfactory in view of optical properties and driving properties.

Patent Document 1 discloses AM elements exhibiting a high contrast, which are produced using liquid crystal compositions containing a bis(meth)acryloyloxynaphthalene compound dissolved therein and having a large negative dielectric constant anisotropy. However, they are all compositions applied to a method which needs a polarizing plate for displaying, visible light transmittance of the liquid crystal element is small, and efficiency of utilization of light is low.

The present invention is accomplished in consideration of the above problems and an object thereof is to provide a liquid crystal element suitable for a liquid crystal element capable of being utilized as a liquid crystal element of the PSCT method, capable of being produced for a short period of time, and having a high contrast.

Means for Solving the Problems

As a result of extensive studies for solving the above problems, the present inventors have found that the use of a liquid crystal element containing a chiral nematic liquid crystal phase and a specific polymer resin enables driving in a reverse mode and a high contrast and a rapid response are exhibited. In addition, they have found that, in a liquid crystal composition containing a chiral nematic liquid crystal and a polymerizable monomer, even when a liquid crystal composition containing the polymerizable monomer that is a specific polymer precursor is rapidly cured at a high illuminance for a short period of time, the planar structure of the liquid is not disturbed although the polymerizable monomer has no liquid crystallinity and, as a result, a reverse-mode liquid crystal element exhibiting a high contrast is realized. Thus, they have accomplished the present invention.

Namely, the gist of the invention lies in the following.

(1)
A liquid crystal element which comprises: a pair of substrates with electrodes, in which the substrates are arranged so as to face each other and at least one of the substrates is a transparent substrate; and a liquid crystal light adjusting layer which is disposed between the substrates and contains a composite containing a chiral nematic liquid crystal phase and a polymer resin phase, wherein the polymer resin phase contains a polymer compound having a repeating unit represented by the following general formula (1), and dielectric constant anisotropy of the chiral nematic liquid crystal phase is positive:

[Chem 1]

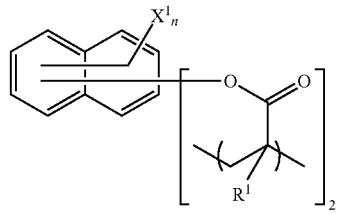

(1)

wherein $R^1$ represents a hydrogen atom or a methyl group and two $R^1$ groups present in one repeating unit represented by the general formula (1) may be the same or different, n represents an integer of 1 to 3 and, in the case where n is 2 or more, two or more $X^1$ groups present in one repeating unit represented by the general formula (1) may be the same or different, $X^1$ represents a group represented by the following general formula (2):

[Chem 2]

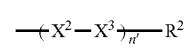

(2)

wherein $X^2$ represents a direct bond or one linking group selected from the following group:

[Chem 3]

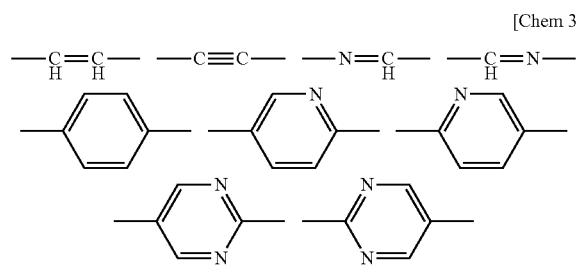

$X^3$ represents a direct bond or one linking group selected from the following group:

[Chem 4]

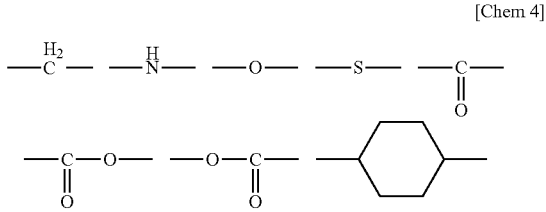

$R^2$ represents a hydrogen atom, a halogen atom, a hydroxyl group, a linear or branched alkyl group having 1 to 7 carbon atoms, a linear or branched alkoxy group having 1 to 7 carbon atoms, or a cyano group, n' represents an integer of 1 to 3 and, in the case where n' is 2 or more, two or more —$X^2$—$X^3$— groups present in one repeating unit represented by the general formula (1) may be the same or different.

(2)

The liquid crystal element according to the item (1), wherein a compound represented by the following general formula (3) and at least one of methyl acrylate and methyl methacrylate are detected by derivatization pyrolytic gas chromatography-mass spectrometry of the polymer resin phase in the presence of an organic alkali derivatizing agent:

[Chem 5]

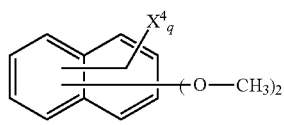
(3)

wherein q represents an integer of 1 to 3 and, in the case where q is 2 or more, two or more $X^4$ groups present in one molecule of the compound represented by the general formula (3) may be the same or different, $X^4$ represents a group represented by the following general formula (4):

[Chem 6]

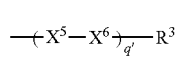
(4)

wherein $X^5$ represents a direct bond or one linking group selected from the following group:

[Chem 7]

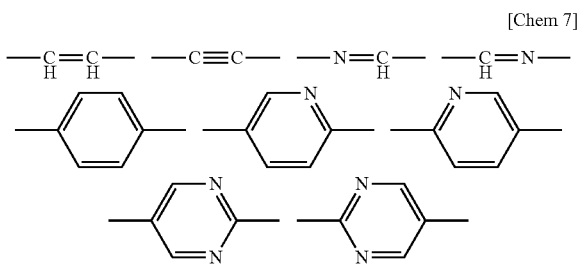

$X^6$ represents a direct bond or one linking group selected from the following group:

[Chem 8]

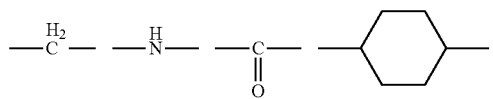

$R^3$ represents a hydrogen atom, a halogen atom, a hydroxyl group, a linear or branched alkyl group having 1 to 7 carbon atoms, a methoxy group, a methylthio group, or a cyano group, q' represents an integer of 1 to 3 and, in the case where q' is 2 or more, two or more —$X^5$—$X^6$— groups present in one molecule of the compound represented by the general formula (3) may be the same or different.

(3)

The liquid crystal element according to the item (2), wherein the compound represented by the above general formula (3) is detected in an amount of 0.10 mg or more and 0.85 mg or less by derivatization pyrolytic gas chromatography of 1.00 mg of the polymer resin phase in the presence of an organic alkali derivatizing agent.

(4)

The liquid crystal element according to any one of the items (1) to (3), wherein the repeating unit represented by the above general formula (1) is represented by the following general formula (5):

[Chem 9]

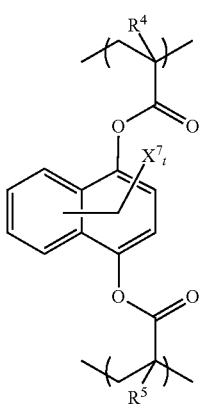
(5)

wherein $R^4$ and $R^5$ each independently represent a hydrogen atom or a methyl group, t represents an integer of 1 to 3 and, in the case where t is 2 or more, two or more $X^7$ groups present in one repeating unit represented by the general formula (5) may be the same or different, $X^7$ represents a group represented by the following general formula (6):

[Chem 10]

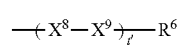
(6)

wherein $X^8$ represents a direct bond or one linking group selected from the following group:

[Chem 11]

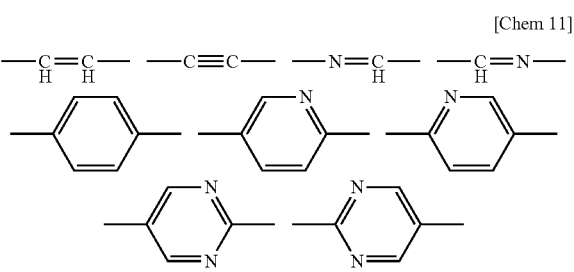

$X^9$ represents a direct bond or one linking group selected from the following group:

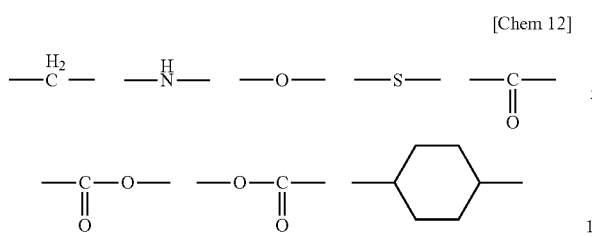

$R^6$ represents a hydrogen atom, a halogen atom, a hydroxyl group, a linear or branched alkyl group having 1 to 7 carbon atoms, a linear or branched alkoxy group having 1 to 7 carbon atoms, or a cyano group, t' represents an integer of 1 to 3 and, in the case where t' is 2 or more, two or more —$X^8$—$X^9$— groups present in one repeating unit represented by the general formula (5) may be the same or different.

(5)

The liquid crystal element according to any one of the items (1) to (4), wherein the chiral nematic liquid crystal phase has a polymerizable monomer represented by the following general formula (9):

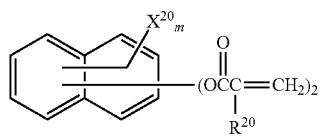

wherein $R^{20}$ represents a hydrogen atom or a methyl group and two $R^{20}$ groups present in one polymerizable monomer represented by the general formula (9) may be the same or different, m represents an integer of 1 to 3 and, in the case where m is 2 or more, two or more $X^{20}$ groups present in one molecule of the polymerizable monomer represented by the general formula (9) may be the same or different, $X^{20}$ represents a group represented by the following general formula (10):

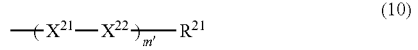

wherein $X^{21}$ represents a direct bond or one linking group selected from the following group:

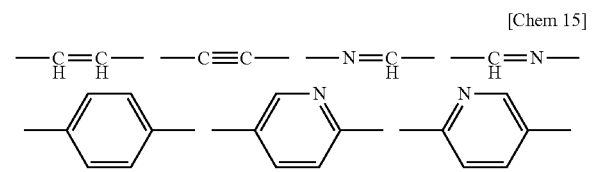

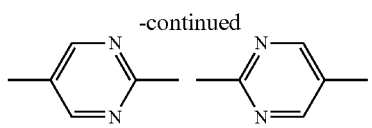

$X^{22}$ represents a direct bond or one linking group selected from the following group:

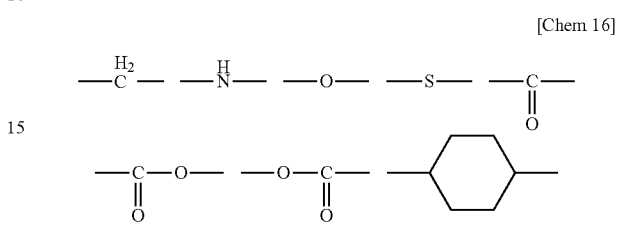

$R^{21}$ represents a hydrogen atom, a halogen atom, a hydroxyl group, a linear or branched alkyl group having 1 to 7 carbon atoms, a linear or branched alkoxy group having 1 to 7 carbon atoms, or a cyano group, m' represents an integer of 1 to 3 and, in the case where m' is 2 or more, two or more —$X^{21}$—$X^{22}$— groups present in one molecule of the polymerizable monomer represented by the general formula (9) may be the same or different.

(6)

The liquid crystal element according to any one of the items (1) to (5), wherein distance (d) between the substrates with electrodes is 100 μm or less and 2 μm or more and the relationship (d)/(p) between the chiral pitch length (p) of the chiral nematic liquid crystal and the distance (d) is 1 or more.

(7)

The liquid crystal element according to any one of the items (1) to (6), wherein the liquid crystal light adjusting layer is a polymer stabilized liquid crystal.

(8)

The liquid crystal element according to any one of the items (1) to (7), wherein, the liquid crystal element has a region where visible light transmittance at the time when at least one of direct-current voltage or alternative-current voltage is applied, decreases as compared with the visible light transmittance at the time when the voltage is not applied.

(9)

The liquid crystal element according to any one of the items (1) to (8), wherein haze at the time when at least one of direct-current voltage or alternative-current voltage is applied is 70% or more and haze at the time when voltage is not applied is 15% or less.

(10)

The liquid crystal element according to any one of the items (1) to (9), wherein, in the temperature range of −10° C. or higher, when the visible light transmittance of the liquid crystal element at the time when at least one of direct-current voltage and alternative-current voltage is not applied, is normalized to be 100% and the visible light transmittance that is decreased and becomes minimum by the application of at least one of direct-current voltage and alternative-current voltage, is normalized to be 0%, a time required for decreasing the visible light transmittance to 10% from the time when at least one of direct-current voltage or alternative-current voltage is applied and a time required for increasing the visible light transmittance to 90% from the time when the application of at least one of direct-current voltage or alternative-current voltage is stopped, are each 8 msec or less.

(11)

A screen comprising the liquid crystal element according to any one of the items (1) to (10).

(12)

A display comprising the liquid crystal element according to any one of the items (1) to (11).

(13)

A liquid crystal element which comprises: a pair of substrates with electrodes, in which the substrates are arranged so as to face each other and at least one of the substrates is a transparent substrate; and a liquid crystal light adjusting layer which is disposed between the substrates and contains a composite containing a chiral nematic liquid crystal phase and a polymer resin phase, wherein the chiral nematic liquid crystal phase contains a polymerizable monomer represented by the following general formula (9), and dielectric constant anisotropy of the chiral nematic liquid crystal phase is positive:

[Chem 17]

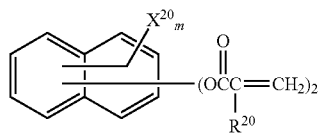
(9)

wherein $R^{20}$ represents a hydrogen atom or a methyl group and two $R^{20}$ groups present in one molecule of the polymerizable monomer represented by the general formula (9) may be the same or different, m represents an integer of 1 to 3 and, in the case where m is 2 or more, two or more $X^{20}$ groups present in one molecule of the polymerizable monomer represented by the general formula (9) may be the same or different, $X^{20}$ represents a group represented by the following general formula (10):

[Chem 18]

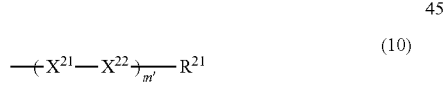
(10)

wherein $X^{21}$ represents a direct bond or one linking group selected from the following group:

[Chem 19]

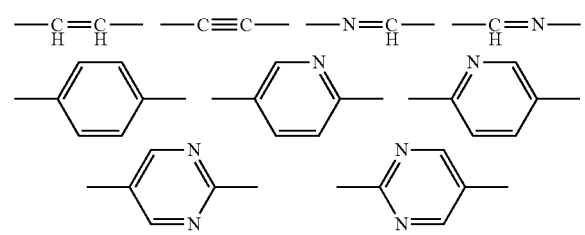

$X^{22}$ represents a direct bond or one linking group selected from the following group:

[Chem 20]

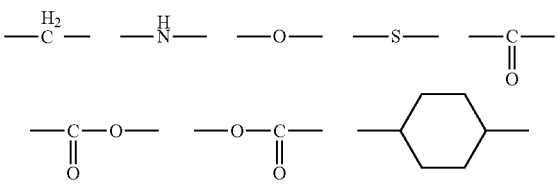

$R^{21}$ represents a hydrogen atom, a halogen atom, a hydroxyl group, a linear or branched alkyl group having 1 to 7 carbon atoms, a linear or branched alkoxy group having 1 to 7 carbon atoms, or a cyano group, m' represents an integer of 1 to 3 and, in the case where m' is 2 or more, two or more $—X^{21}—X^{22}—$ groups present in one molecule of the polymerizable monomer represented by the general formula (9) may be the same or different.

(14)

The liquid crystal element according to the item (13), wherein the polymerizable monomer represented by the general formula (9) is contained in an amount of 100 μg or more and 1,000 μg or less in 1 g of the chiral nematic liquid crystal.

(15)

The liquid crystal element according to the item (13) or (14), wherein the liquid crystal light adjusting layer is a polymer stabilized liquid crystal.

(16)

The liquid crystal element according to any one of the items (13) to (15), wherein the polymerizable monomer represented by the above general formula (9) is represented by the following general formula (11):

[Chem 21]

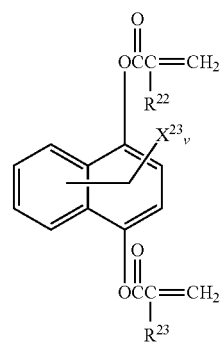
(11)

wherein $R^{22}$ and $R^{23}$ each independently represent a hydrogen atom or a methyl group, v represents an integer of 1 to 3 and, in the case where v is 2 or more, two or more $X^{23}$ groups present in one molecule of the polymerizable monomer represented by the general formula (11) may be the same or different, $X^{23}$ represents a group represented by the following general formula (12):

[Chem 22]

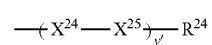
(12)

wherein $X^{24}$ represents a direct bond or one linking group selected from the following group:

[Chem 23]

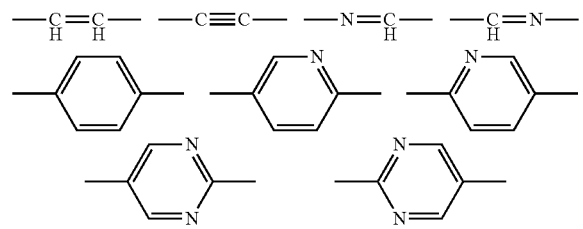

$X^{25}$ represents a direct bond or one linking group selected from the following group:

[Chem 24]

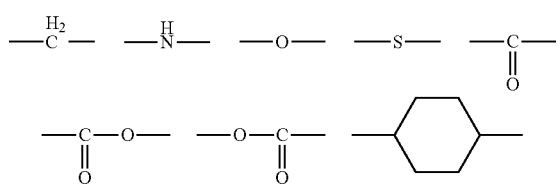

$R^{24}$ represents a hydrogen atom, a halogen atom, a hydroxyl group, a linear alkyl group having 1 to 7 carbon atoms, a linear alkoxy group having 1 to 7 carbon atoms, or a cyano group, v' represents an integer of 1 to 3 and, in the case where v' is 2 or more, two or more $—X^{24}—X^{25}—$ groups present in one molecule of the polymerizable monomer represented by the general formula (11) may be the same or different.

(17)

The liquid crystal element according to any one of the items (13) to (16), wherein a distance (d) between the substrates with electrodes is 100 μm or less and 2 μm or more and the relationship (d)/(p) between a chiral pitch length (p) of the chiral nematic liquid crystal and the distance (d) is 1 or more.

(18)

The liquid crystal element according to any one of the items (13) to (17), wherein the liquid crystal light adjusting layer is a polymer stabilized liquid crystal.

(19)

The liquid crystal element according to any one of the items (13) to (18), wherein the liquid crystal element has a region where the visible light transmittance at the time when at least one of direct-current voltage or alternative-current voltage is applied decreases as compared with the visible light transmittance at the time when the voltage is not applied.

(20)

The liquid crystal element according to any one of the items (13) to (19), wherein haze at the time when at least one of direct-current voltage or alternative-current voltage is applied is 70% or more and haze at the time when voltage is not applied is 15% or less.

(21)

The liquid crystal element according to any one of the items (13) to (20), wherein, in the temperature range of −10° C. or higher, when the visible light transmittance of the liquid crystal element at the time when at least one of direct-current voltage or alternative-current voltage is not applied, is normalized to be 100% and the visible light transmittance that is decreased and becomes minimum by the application of at least one of direct-current voltage or alternative-current voltage, is normalized to be 0%, a time required for decreasing the visible light transmittance to 10% from the time when at least one of direct-current voltage or alternative-current voltage is applied and a time required for increasing the visible light transmittance to 90% from the time when the application of at least one of direct-current voltage or alternative-current voltage is stopped, are each 8 msec or less.

(22)

A screen comprising the liquid crystal element according to any one of the items (13) to (21).

(23)

A display comprising the liquid crystal element according to any one of the items (13) to (21).

(24)

A liquid crystal composition comprising a chiral nematic liquid crystal having a positive dielectric constant anisotropy, a polymerizable monomer represented by the general formula (13), and a radical polymerization initiator:

[Chem 25]

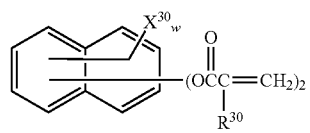

(13)

wherein w represents an integer of 1 to 3 and, in the case where w is 2 or more, two or more $X^{30}$ groups present in one molecule of the polymerizable monomer represented by the general formula (13) may be the same or different, $R^{30}$ represents a hydrogen atom or a methyl group and two $R^{30}$ groups present in one molecule of the polymerizable monomer represented by the general formula (13) may be the same or different, $X^{30}$ represents a group represented by the following general formula (14):

[Chem 26]

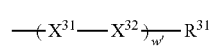

(14)

wherein $X^{31}$ represents a direct bond or one linking group selected from the following group:

[Chem 27]

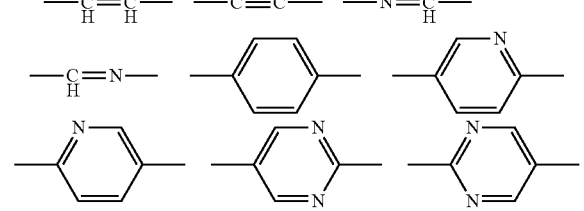

$X^{32}$ represents a direct bond or one linking group selected from the following group:

[Chem 28]

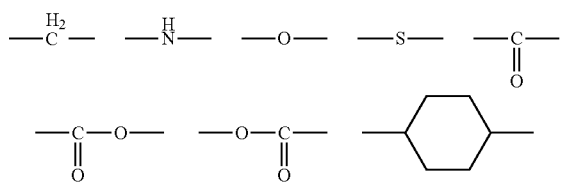

$R^{31}$ represents a hydrogen atom, a halogen atom, a hydroxyl group, a linear or branched alkyl group having 1 to 7 carbon atoms, a linear or branched alkoxy group having 1 to 7 carbon atoms, or a cyano group, w' represents an integer of 1 to 3 and, in the case where w' is 2 or more, two or more —$X^{31}$—$X^{32}$— groups present in one molecule of the polymerizable monomer represented by the general formula (13) may be the same or different.

(25)

The liquid crystal composition according to the item (24), wherein the polymerizable monomer represented by the above general formula (13) is represented by the following general formula (15):

[Chem 29]

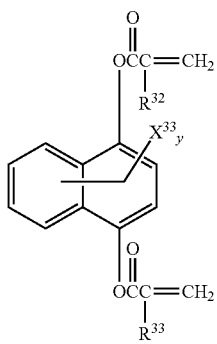

(15)

wherein $R^{32}$ and $R^{33}$ each independently represent a hydrogen atom or a methyl group, y represents an integer of 1 to 3 and, in the case where y is 2 or more, two or more $X^{33}$ groups present in one molecule of the polymerizable monomer represented by the general formula (15) may be the same or different, $X^{33}$ represents a group represented by the following general formula (16):

[Chem 30]

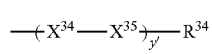

(16)

wherein $X^{34}$ represents a direct bond or one linking group selected from the following group:

[Chem 31]

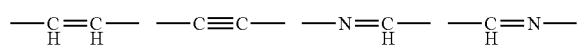

-continued

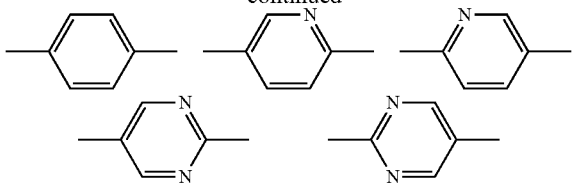

$X^{35}$ represents a direct bond or one linking group selected from the following group:

[Chem 32]

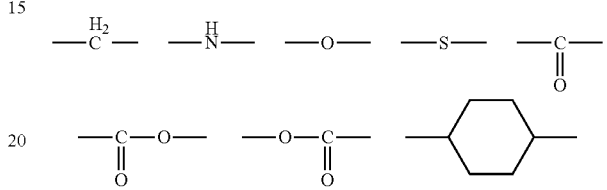

$R^{34}$ represents a hydrogen atom, a halogen atom, a hydroxyl group, a linear or branched alkyl group having 1 to 7 carbon atoms, a linear or branched alkoxy group having 1 to 7 carbon atoms, or a cyano group, y' represents an integer of 1 to 3 and, in the case where y' is 2 or more, two or more —$X^{34}$—$X^{35}$— groups present in one molecule of the polymerizable monomer represented by the general formula (15) may be the same or different.

(26)

The liquid crystal composition according to the item (24) or (25), wherein a chiral pitch length p of the chiral nematic liquid crystal is 0.3 μm or more and 3 μm or less.

(27)

The liquid crystal composition according to any one of the items (24) to (26), wherein the radical polymerization initiator is an acylphosphine oxide-based initiator.

(28)

The liquid crystal composition according to any one of the items (24) to (27), wherein, when the content ratio of the polymerizable monomer represented by the general formula (13) to the liquid crystal composition is regarded as A % by mass and the content ratio of the radical polymerization initiator thereto is regarded as B % by mass, B/A is 0.01 or more and 0.4 or less.

(29)

The liquid crystal composition according to any one of the items (24) to (28), wherein a liquid crystal-isotropic phase transition temperature is 40° C. or higher.

Advantage of the Invention

The liquid crystal element of the invention is capable of driving in a reverse mode, has a high efficiency of utilization of visible light, exhibits small temperature dependency and viewing angle dependency, exhibits a high contrast, and capable of a rapid response.

The liquid crystal composition of the invention is capable of being cured for a short period of time and the liquid crystal element obtained using the liquid crystal composition exhibits a high contrast and a rapid response although curing is performed at a high illuminance for a short period of time.

The liquid crystal element of the invention is useful for the use in screens, displays, and the like owing to these properties. For example, the element can be utilized as screens for view interruption of windows of buildings, partitions, show windows, and the like and as displays and panels for notification boards, computer terminals, projection, and the like by electrically switching displayed items with a rapid response.

MODE FOR CARRYING OUT THE INVENTION

Figure 1:
FIG. 1 is a SEM picture of the polymer resin phase of a liquid crystal element (Example 20).

The explanation of constitutional requirements described in the following is one example (representative example) of embodiments of the invention and the invention is not specified to these contents.

Moreover, in the present Description, "% by mass" and "% by weight" as well as "part(s) by mass" and "part(s) by weight" have each the same meaning.

The liquid crystal element of the invention is a liquid crystal element which comprises: a pair of substrates with electrodes, which are arranged so as to face each other and at least one of which is a transparent substrate; and a liquid crystal light adjusting layer which is disposed between the substrates and contains a composite containing a chiral nematic liquid crystal phase and a polymer resin phase, wherein the polymer resin phase contains a polymer compound having a repeating unit represented by the following general formula (1), and dielectric constant anisotropy of the chiral nematic liquid crystal phase is positive:

[Chem 33]

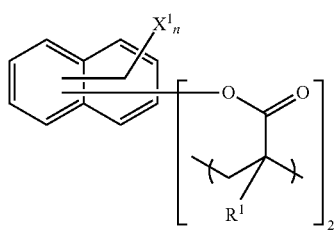

(1)

wherein $R^1$ represents a hydrogen atom or a methyl group and two $R^1$ groups present in one repeating unit represented by the general formula (1) may be the same or different, n represents an integer of 1 to 3 and, in the case where n is 2 or more, $X^1$ groups contained in one repeating unit represented by the general formula (1) may be the same or different, $X^1$ represents a group represented by the following general formula (2):

[Chem 34]

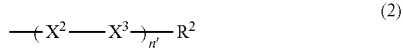

(2)

wherein $X^2$ represents a direct bond or one linking group selected from the following group:

[Chem 35]

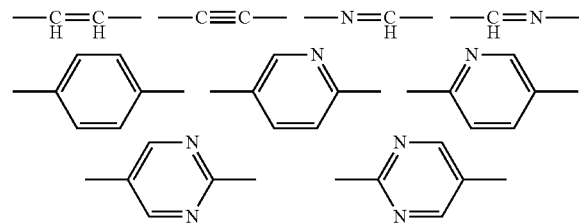

$X^3$ represents a direct bond or one linking group selected from the following group:

[Chem 36]

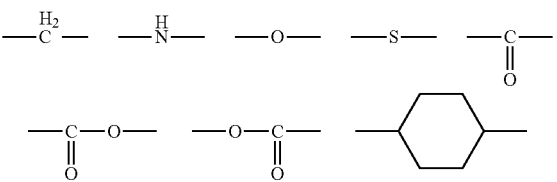

$R^2$ represents a hydrogen atom, a halogen atom, a hydroxyl group, a linear or branched alkyl group having 1 to 7 carbon atoms, a linear or branched alkoxy group having 1 to 7 carbon atoms or a cyano group, n' represents an integer of 1 to 3 and, in the case where n' is 2 or more, two or more $-X^2-X^3-$ groups present in one repeating unit represented by the general formula (1) may be the same or different.

Generally, in PSCT, since the ratio of the polymer resin phase to the liquid crystal phase is so small as 10% by mass or less, the polymer resin phase is mechanically destroyed by driving of the liquid crystal phase through voltage application or the liquid crystal molecules do not sufficiently obtain interfacial interaction at the interface of the polymer resin phase in some cases. As a result, it is considered that a sufficient contrast as a liquid crystal element (hereinafter sometimes expressed as "element") is not obtained and, when the application of direct voltage and/or alternative voltage are stopped (hereinafter sometimes expressed as "OFF") from the application of voltage and/or alternative voltage (hereinafter sometimes expressed as "ON"), a time required for reaching a desired light transmittance (hereinafter sometimes expressed as "response time") increases.

In the polymer resin phase of the invention, two polymerization main chains are crosslinked with naphthalene rings in a ladder-like manner and the resin phase has a very rigid structure. Therefore, it is considered that there is obtained an effect that the phase has a sufficient mechanical strength and also the response time from electric source application to no application of the powder is sufficiently shortened by an anchoring effect (an effect of aligning the liquid crystal molecules by interfacial interaction) which is considered to be derived from the naphthalene ring.

In the case where the polymerization main chain bonding to the naphthalene ring is one chain, mechanical strength of the polymer resin phase is not sufficiently obtained. On the other hand, in the case where the main chain is three chains, steric hindrance between repeating units is large, so that, at the formation of the polymer resin phase, the polymerization main chain is sometimes interrupted before a structure in which a minute amount of the polymer is ranged as a reticulate network (polymer network structure) is sufficiently developed in the continuously spreading chiral nematic liquid crystal phase.

Moreover, the liquid crystal element of the invention is a liquid crystal element which comprises: a pair of substrates with electrodes, which are arranged so as to face each other and at least one of which is a transparent substrate; and a liquid crystal light adjusting layer which is disposed between the substrates and contains a composite containing a chiral nematic liquid crystal phase and a polymer resin phase, wherein the chiral nematic liquid crystal phase contains a polymerizable monomer represented by the following general formula (9), and dielectric constant anisotropy of the chiral nematic liquid crystal phase is positive:

[Chem 37]

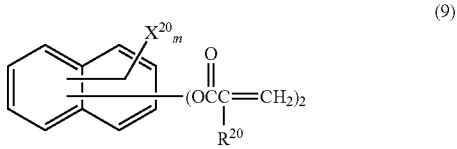

(9)

wherein $R^{20}$ represents a hydrogen atom or a methyl group and two $R^{20}$ groups present in one polymerizable monomer represented by the general formula (9) may be the same or different, $X^{20}$ represents a group represented by the following general formula (10), m represents an integer of 1 to 3 and, in the case where m is 2 or more, two or more $X^{20}$ groups present in one molecule of the polymerizable monomer represented by the general formula (9) may be the same or different, $R^{20}$ represents a hydrogen atom or a methyl group,

[Chem 38]

(10)

wherein $X^{21}$ represents a direct bond or one linking group selected from the following group:

[Chem 39]

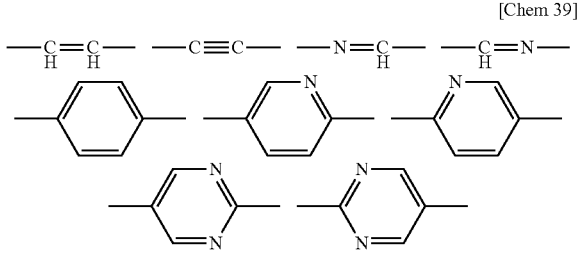

$X^{22}$ represents a direct bond or one linking group selected from the following group:

[Chem 40]

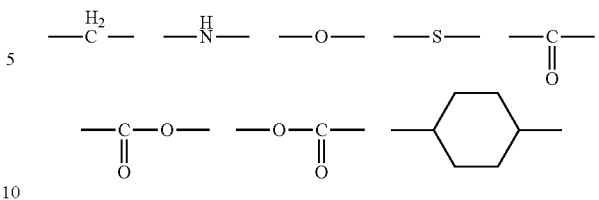

$R^{21}$ represents a hydrogen atom, a halogen atom, a hydroxyl group, a linear or branched alkyl group having 1 to 7 carbon atoms, a linear or branched alkoxy group having 1 to 7 carbon atoms, or a cyano group, m' represents an integer of 1 to 3 and, in the case where m' is 2 or more, two or more —$X^{21}$—$X^{22}$— groups present in one molecule of the polymerizable monomer represented by the general formula (9) may be the same or different.

The liquid crystal element of the invention comprises a pair of substrates with electrodes, which are arranged so as to face each other and at least one of which is a transparent substrate and a liquid crystal light adjusting layer which is disposed between the substrates and contains a composite containing a chiral nematic liquid crystal phase having a positive dielectric constant anisotropy and a polymer resin phase <Polymer Resin Phase>

The polymer resin phase of the invention contains a polymer compound having a repeating unit represented by the general formula (1).

The polymer resin phase of the invention is preferably 10% by mass or less and more preferably 7% by mass or less relative to the chiral nematic liquid crystal phase. Also, the polymer resin phase is preferably 0.1% by mass or more and preferably 1% by mass or more.

When the ratio of the polymer resin phase is too small, the polymer resin phase becomes mechanically brittle and repeated durability gets worse. Moreover, since the liquid crystal molecule cannot receive a sufficient interfacial interaction, the contrast and response time of the liquid crystal element are deteriorated in some cases. On the other hand, when the ratio of the polymer resin phase is too large, the chiral nematic liquid crystal phase is spatially divided and the planar structure is not stabilized, so that the transparency of the liquid crystal element at the time when voltage is not applied gets worse in some cases.

<Repeating Unit Represented by General Formula (1)>

The above polymer resin phase contains a polymer compound having a repeating unit represented by the general formula (1).

[Chem 41]

(1)

wherein $R^1$ represents a hydrogen atom or a methyl group and two $R^1$ groups present in one repeating unit represented by the general formula (1) may be the same or different, n represents an integer of 1 to 3 and, in the case where n is 2 or more, $X^1$ groups contained in one repeating unit represented by the general formula (1) may be the same or different, $X^1$ represents a group represented by the following general formula (2):

[Chem 42]

(2)

wherein $X^2$ represents a direct bond or one linking group selected from the following group:

[Chem 43]

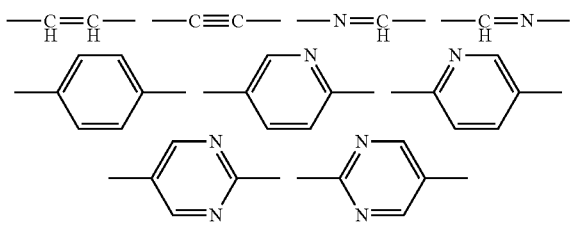

$X^3$ represents a direct bond or one linking group selected from the following group:

[Chem 44]

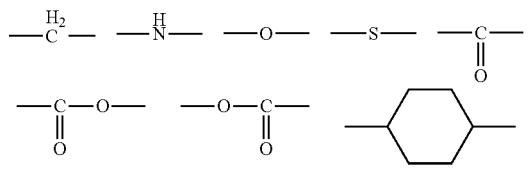

$R^2$ represents a hydrogen atom, a halogen atom, a hydroxyl group, a linear or branched alkyl group having 1 to 7 carbon atoms, a linear or branched alkoxy group having 1 to 7 carbon atoms, or a cyano group, n' represents an integer of 1 to 3 and, in the case where n' is 2 or more, two or more —$X^2$—$X^3$— groups present in one molecule may be the same or different.

$R^1$ represents a hydrogen atom or a methyl group and two $R^1$ groups present in one repeating unit represented by the general formula (1) may be the same or different. The substitution position of the side chain containing $R^1$ is not particularly limited but, when a rod-like structure containing the naphthalene ring is formed, the contrast of the liquid crystal element is improved in some cases by the interfacial interaction with the chiral nematic liquid crystal phase, so that the case is preferable. Especially, the substitution position of the side chain containing $R^1$ is particularly preferably 4-position, 5-position, and 6-position toward 1-position; 3-position and 6-position toward 2-position; 7-position toward 3-position; and 4-position and 5-position toward 8-position.

When the naphthalene ring in the repeating unit represented by the general formula (1) has a substituent represented by the general formula (2), there is a case where the liquid crystallinity of the polymer resin phase can be controlled. For example, in order to improve the liquid crystal-linity, $R^2$ in the general formula (2) is preferably a linear or branched alkyl group having 3 to 7 carbon atoms or a linear alkoxy group having 3 to 7 carbon atoms.

The substitution position of the general formula (2) is not particularly limited but, when the substituent represented by the general formula (2) is preferably attached to an opposing position (4-position and 5-position toward 1-position, 6-position toward 2-position, 7-position toward 3-position, 4-position and 5-position toward 8-position) and the side chain in the above general formula (1) is formed in a rod-like structure containing the naphthalene ring, the contrast of the liquid crystal element is improved in some cases by the interfacial interaction with the chiral nematic liquid crystal phase, so that the case is preferable.

n represents an integer of 1 to 3 and, in the case where n is 2 or more, two or more $X^1$ groups present in one repeating unit represented by the general formula (1) may be the same or different. When n is large, the interfacial interaction of the naphthalene ring with the liquid crystal molecule is sterically hindered in some cases, so that n is preferably 2 or less and more preferably 1.

$X^2$ represents a direct bond or one linking group selected from the following group.

[Chem 45]

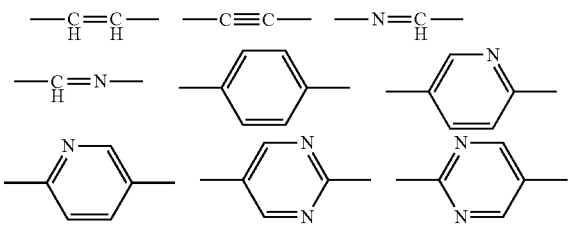

Of these, when $X^2$ is a direct bond or one linking group selected from the following group, the polymer resin phase does not have absorption toward visible light and a highly transparent liquid crystal element can be obtained in some cases, so that the case is preferable and a direct bond is more preferable.

[Chem 46]

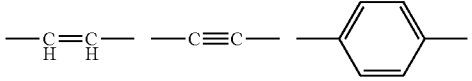

$X^3$ represents a direct bond or one linking group selected from the following group.

[Chem 47]

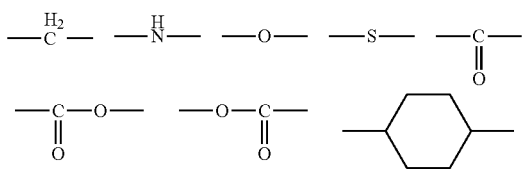

Of these, when $X^3$ is a direct bond or one linking group selected from the following group, there is a case where the durability of the polymer resin phase can be made high, so that the case is preferable and a direct bond is more preferable.

[Chem 48]

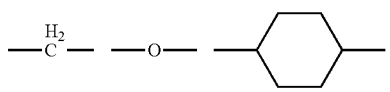

n' represents an integer of 1 to 3 and, in the case where n' is 2 or more, two or more —$X^2$—$X^3$— groups present in one molecule may be the same or different.

When n' is 2 or less, there is a case where the polymer resin phase does not have absorption toward visible light and thus a highly transparent liquid crystal element can be obtained in some cases, so that the case is preferable and n' is more preferably 1.

$R^2$ represents a hydrogen atom, a halogen atom, a hydroxyl group, a linear or branched alkyl group having 1 to 7 carbon atoms, a linear or branched alkoxy group having 1 to 7 carbon atoms, or a cyano group.

The linear alkyl group having 1 to 7 carbon atoms includes a methyl group, an ethyl group, an n-propyl group, an n-butyl group, an n-pentyl group, an n-hexyl group, and an n-heptyl group, and the branched alkyl group having 1 to 7 carbon atoms includes an isopropyl group, an isobutyl group, a t-butyl group, a 2-methylpentyl group, a 3-methylpentyl group, a 4-methylpentyl group, a 2-ethylpentyl group, a 3-ethylpentyl group, a 4-ethylpentyl group, and the like.

The linear alkoxy group having 1 to 7 carbon atoms includes a methoxy group, an ethoxy group, an n-propoxy group, an n-butoxy group, an n-pentoxy group, an n-hextoxy group, an n-heptoxy group, and the branched alkoxy group having 1 to 7 carbon atoms includes an isopropoxy group, an isobutoxy group, a t-butoxy group, a 2-methylpentoxy group, a 3-methylpentoxy group, a 4-methylpentoxy group, a 2-ethylpentoxy group, a 3-ethylpentoxy group, a 4-ethylpentoxy group, and the like.

Of these, when $R^2$ is a hydrogen atom, a linear alkyl group having 1 to 7 carbon atoms, or a linear alkoxy group having 1 to 7 carbon atoms, there is a case where the durability of the polymer resin phase can be made high, so that the case is preferable and a hydrogen atom, a methyl group, or a methoxy group is more preferable.

Specific examples of the repeating unit represented by the general formula (1) are exemplified in the following. The invention is not limited to these unless it exceeds the gist thereof.

[Chem 49]

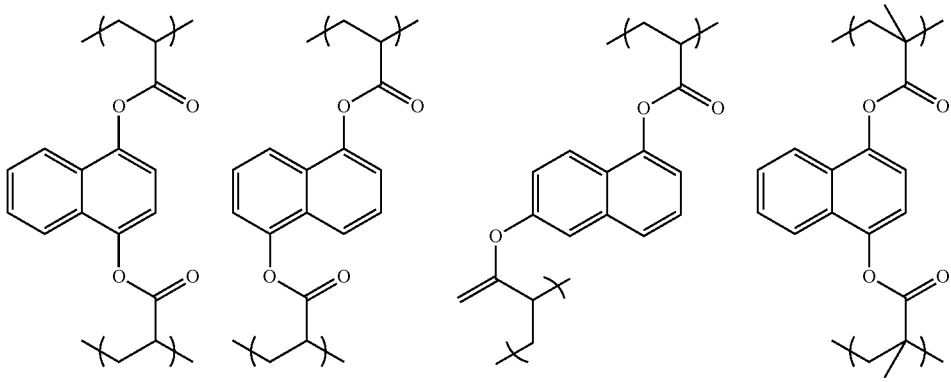

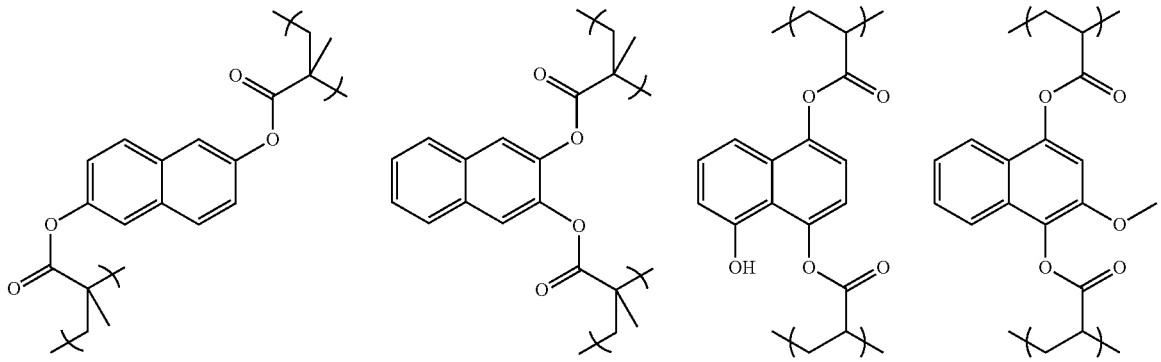

23
-continued
24
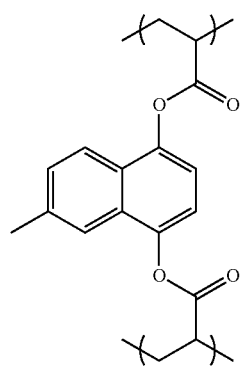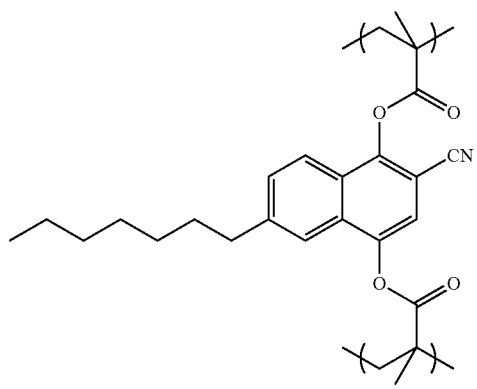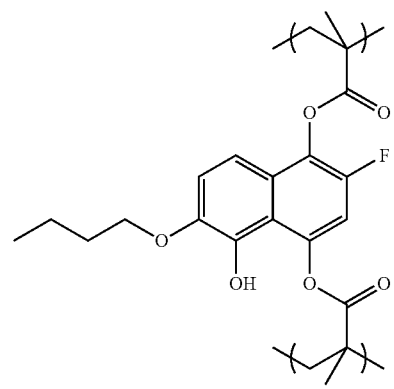
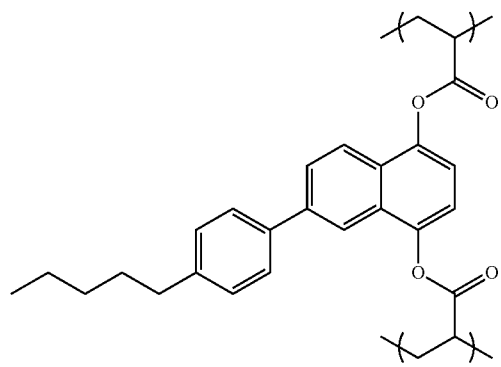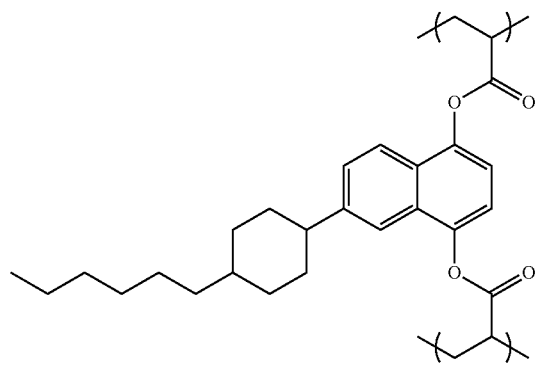
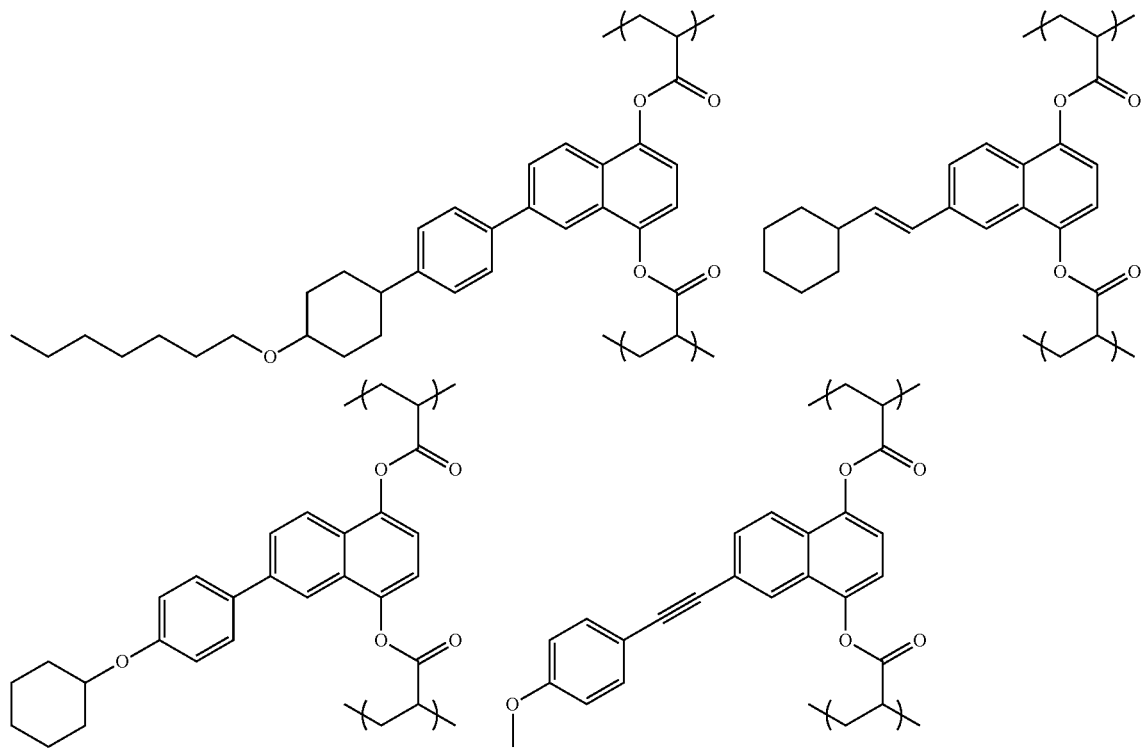

25
26
-continued
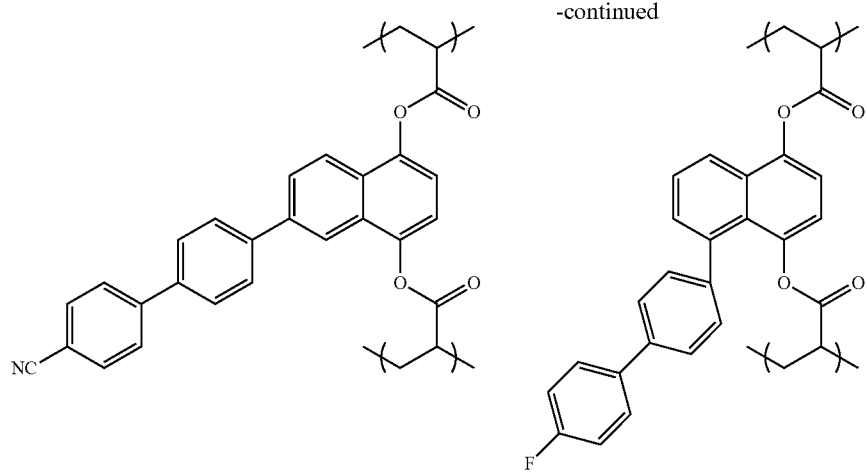
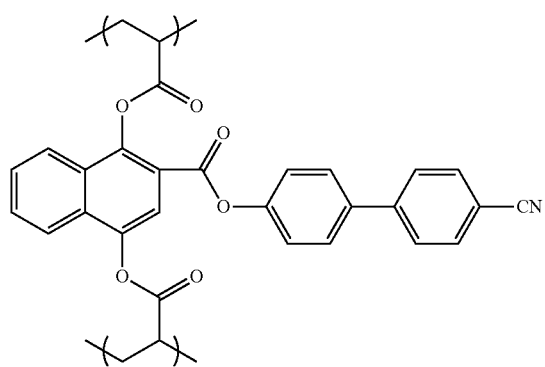
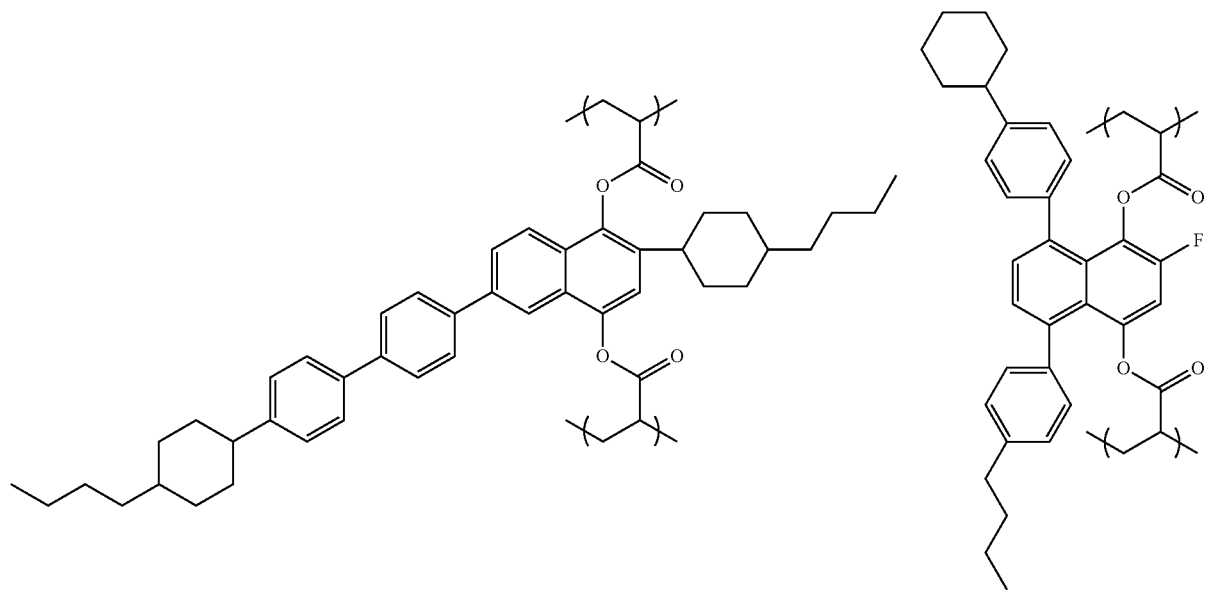

Moreover, when the repeating unit represented by the general formula (1) contained in the above polymer resin phase is represented by the following general formula (5), the interfacial interaction with the chiral nematic liquid crystal increases and the contrast of the liquid crystal element becomes high, so that the case is preferable.

[Chem 50]

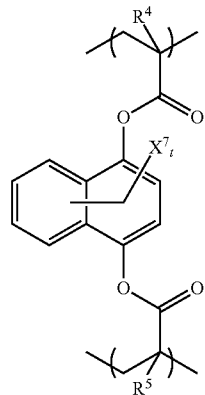

(5)

wherein $R^4$ and $R^5$ each independently represent a hydrogen atom or a methyl group, t represents an integer of 1 to 3 and, in the case where t is 2 or more, two or more $X^7$ groups present in one repeating unit represented by the general formula (5) may be the same or different, $X^7$ represents a group represented by the following general formula (6):

[Chem 51]

$$-\!\!\left(X^8-X^9\right)_{t'}\!\!-R^6 \quad (6)$$

wherein $X^8$ represents a direct bond or one linking group selected from the following group:

[Chem 52]

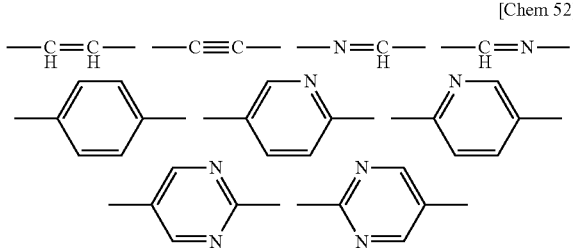

$X^9$ represents a direct bond or one linking group selected from the following group:

[Chem 53]

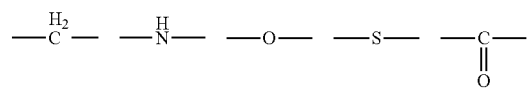

-continued

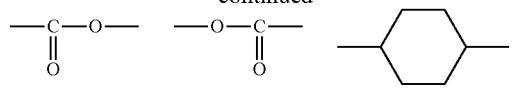

$R^6$ represents a hydrogen atom, a halogen atom, a hydroxyl group, a linear or branched alkyl group having 1 to 7 carbon atoms, a linear or branched alkoxy group having 1 to 7 carbon atoms, or a cyano group, t' represents an integer of 1 to 3 and, in the case where t' is 2 or more, two or more $-X^8-X^9-$ groups present in one repeating unit represented by the general formula (5) may be the same or different.

The alkyl group and alkoxy group of $R^6$ have the same meanings as the alkyl group and alkoxy group exemplified in $R^2$ of the general formula (2). Of the $R^6$ groups, when it is a hydrogen atom, a linear alkyl group having 1 to 7 carbon atoms, or a linear alkoxy group having 1 to 7 carbon atoms, there is a case where the durability of the polymer resin phase can be made high, so that the case is preferable and a hydrogen atom, a methyl group, or a methoxy group is more preferable.

Since the polymer resin phase of the invention contains the polymer compound having a repeating unit represented by the general formula (1) as mentioned above, it is characterized in that a compound represented by the following general formula (3) and at least one of methyl acrylate and methyl methacrylate are detected by derivatization pyrolytic gas chromatography-mass spectrometry of the polymer resin phase in the presence of an organic alkali derivatizing agent.

[Chem 54]

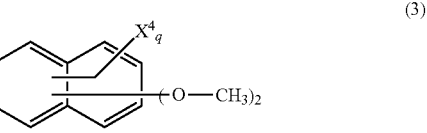

(3)

wherein q represents an integer of 1 to 3 and, in the case where q is 2 or more, two or more $X^4$ groups present in one molecule of the compound represented by the general formula (3) may be the same or different, $X^4$ represents a group represented by the following general formula (4):

[Chem 55]

$$-\!\!\left(X^5-X^6\right)_{q'}\!\!-R^3 \quad (4)$$

wherein $X^5$ represents a direct bond or one linking group selected from the following group:

[Chem 56]

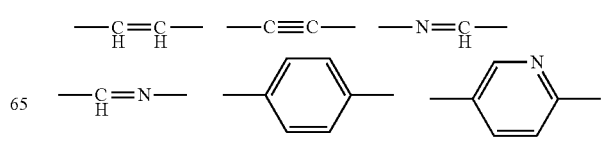

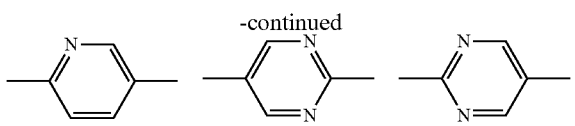

$X^6$ represents a direct bond or one linking group selected from the following group:

[Chem 57]

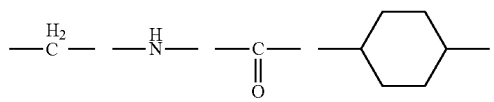

$R^3$ represents a hydrogen atom, a halogen atom, a hydroxyl group, a linear or branched alkyl group having 1 to 7 carbon atoms, a methoxy group, a methylthio group, or a cyano group, q' represents an integer of 1 to 3 and, in the case where q' is 2 or more, two or more —$X^5$—$X^6$— groups present in one molecule may be the same or different.

The alkyl group and alkoxy group of $R^3$ have the same meanings as the alkyl group and alkoxy group exemplified in $R^2$ of the general formula (2).

The method of analyzing a hydrolyzable polymer by the derivatization pyrolytic gas chromatography-mass spectrometry in the presence of an organic alkali derivatizing agent and by the derivatization pyrolytic gas chromatography in the presence of an organic alkali derivatizing agent utilized in the invention has been hitherto used. For example, (1) J. M. Challinor: J. Anal. Appl. Pyrolysis, 16, 323 (1989), (2) H. Ohtani, R. Fujii, S. Tsuge: J. High Res. Chromatogr., 14, 388 (1991), and the like have reported that a quaternary ammonium compound represented by tetramethylammonium hydroxide (TMAH) has a strong basicity and an alkyl ester of a highly polar compound such as carboxylic acid is instantaneously formed by adding it to a condensation polymer and pyrolyzing the polymer and is observed as a sharp peak on a chromatogram, and (3) Hajime Ohtani: Second Pyrolytic Gas Chromatography Workshop Abstracts, pp. 98-113 (1991) has reported an alkali hydrolysis mechanism thereof.

The polymer resin phase of the invention has polyacrylic acid and/or polymethacrylic acid but the ester bonding part is dissociated by alkali derivatization thereof and, as a result, a dimethoxynaphthalene derivative and methyl acrylate and/or methyl methacrylate are detected as pyrolysis products.

Moreover, since the polymer resin phase of the invention is present as an insoluble solid in the liquid crystal element, it can be easily isolated by an operation such as washing the chiral nematic liquid crystal phase in the liquid crystal element with an organic solvent.

In the invention, as the organic alkali derivatizing agent for use in the derivatization pyrolytic gas chromatography-mass spectrometry in the presence of an organic alkali derivatizing agent and in the derivatization pyrolytic gas chromatography in the presence of an organic alkali derivatizing agent, TMAH and tetrabutylammonium hydroxide may be mentioned. The pyrolytic gas chromatography-mass spectrometer for use in the analysis is not particularly limited and the analysis can be performed by a method well known by those skilled in the art.

The compound represented by the above general formula (3) can be quantitatively determined by an internal standard method in the derivatization pyrolytic gas chromatography in the presence of an organic alkali derivatizing agent. When the compound represented by the above general formula (3) is detected in an amount of preferably 0.10 mg or more and more preferably 0.30 mg or more relative to 1.00 mg of the polymer resin phase of the invention, the contrast and response rate as a liquid crystal element can be improved. Moreover, since the compound represented by the above general formula (3) to be detected varies depending on the repeating unit represented by the general formula (1), an upper limit of the amount of the compound represented by the above general formula (3) to be detected is not categorically mentioned but, since the molecular weight of the compound represented by the general formula (3) is usually 500 g/mol or less, the limit is 0.85 mg or less.

The liquid crystal light adjusting layer of the invention contains a composite containing a chiral nematic liquid crystal phase and a polymer resin phase and is further preferably a polymer stabilized liquid crystal (PSLC). PSLC is characterized in that the polymer resin phase has a reticulate polymer network structure and the ratio of the polymer resin phase to the chiral nematic liquid crystal phase is 10% by mass or less. When the layer is PSLC, the chiral nematic liquid crystal phase can form a continuously connected structure in the liquid crystal light adjusting layer and transparency at the time when voltage is not applied to the liquid crystal element and the scattering intensity at the time when voltage is applied thereto can be sufficiently enhanced.

<Other Repeating Unit>

The liquid crystal element of the invention may have other repeating unit(s) in addition to the repeating unit represented by the general formula (1) within the range where the effects of the invention are not impaired.

As the other repeating units, the following structures may be mentioned.

[Chem 58]

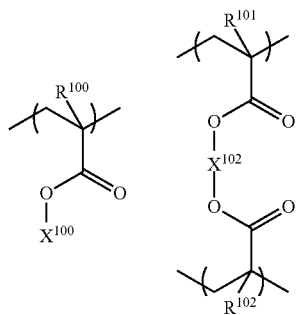

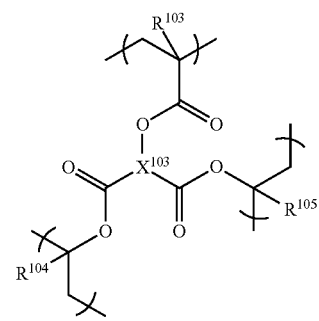

-continued

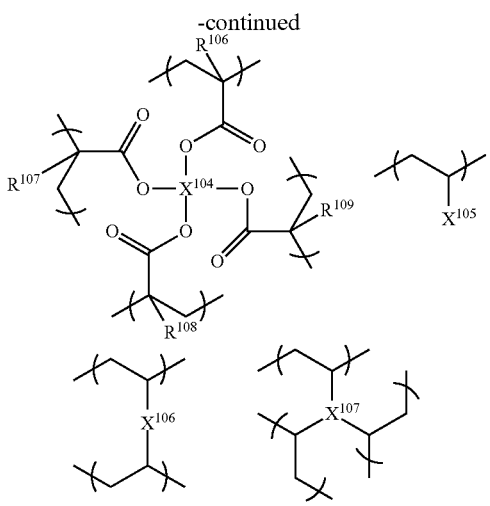

In the above structural formulae,
$R^{100}$ to $R^{109}$ each independently represent a hydrogen atom or a methyl group,
$X^{100}$ and $X^{105}$ each independently represent any monovalent substituent,
$X^{102}$ and $X^{106}$ each independently represent any divalent substituent,
$X^{103}$ and $X^{107}$ each independently represent any trivalent substituent, and
$X^{104}$ represents any tetravalent substituent.

Of the above, the following repeating units are preferable since the production by photopolymerization is easy and the polymer resin phase becomes rigid.

[Chem 59]

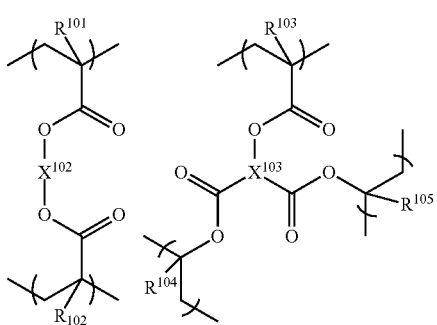

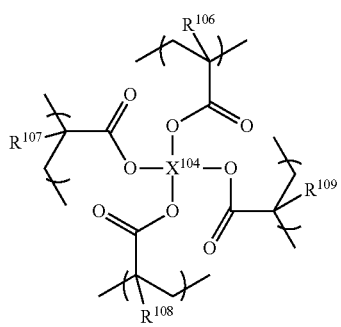

Furthermore, the following repeating unit is particularly preferable.

[Chem 60]

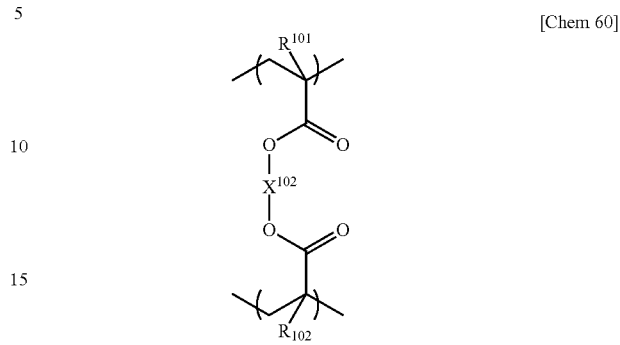

The ratio of the repeating unit represented by the general formula (1) to the other repeating unit(s) contained in the liquid crystal element of the invention is not particularly limited within the range where the effects of the invention are not impaired but the repeating unit represented by the general formula (1) is preferably 30% by mass or more, further preferably 50% by mass or more, and most preferably 80% by mass or more.

When the ratio of the repeating unit represented by the general formula (1) is too small, there is a case where any of the liquid crystal element production for a short period of time, a high contrast, and a short response time or two or more thereof are not sufficient. Moreover, an upper limit of the repeating unit represented by the general formula (1) is 100% by mass.

Furthermore, in the case where the polymer resin contained in the polymer resin phase of the invention is a copolymer, it may be any of an alternative copolymer, a block copolymer, a random copolymer, or a graft copolymer.

<Chiral Nematic Liquid Crystal Phase>

The chiral nematic liquid crystal phase of the invention has a chiral nematic liquid crystal and a polymerizable monomer represented by the general formula (9):

[Chem 61]

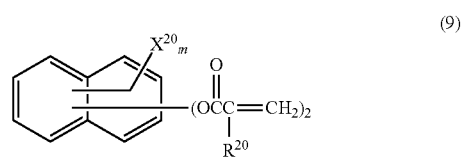

(9)

wherein $R^{20}$ represents a hydrogen atom or a methyl group and two $R^{20}$ groups present in one molecule of the polymerizable monomer represented by the general formula (9) may be the same or different, m represents an integer of 1 to 3 and, in the case where m is 2 or more, two or more $X^{20}$ groups present in one molecule of the polymerizable monomer represented by the general formula (9) may be the same or different, $X^{20}$ represents a group represented by the following general formula (10):

[Chem 62]

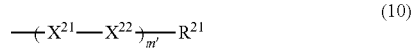

(10)

wherein $X^{21}$ represents a direct bond or one linking group selected from the following group:

[Chem 63]

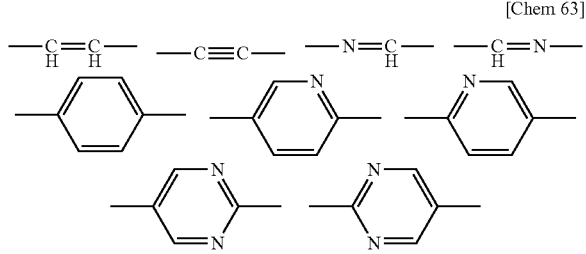

$X^{22}$ represents a direct bond or one linking group selected from the following group:

[Chem 64]

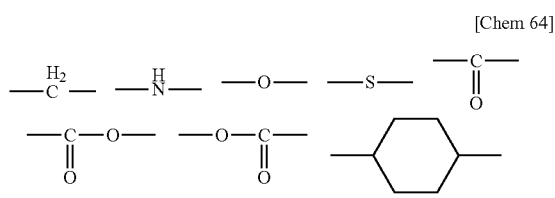

$R^{21}$ represents a hydrogen atom, a halogen atom, a hydroxyl group, a linear or branched alkyl group having 1 to 7 carbon atoms, a linear or branched alkoxy group having 1 to 7 carbon atoms, or a cyano group, m' represents an integer of 1 to 3 and, in the case where m' is 2 or more, two or more —$X^{21}$—$X^{22}$— groups present in one molecule of the polymerizable monomer represented by the general formula (9) may be the same or different.

$R^{20}$ represents a hydrogen atom or a methyl group and two $R^{20}$ groups present in one molecule of the polymerizable monomer represented by the general formula (9) may be the same or different. The substitution position of the side chain containing $R^{20}$ is not particularly limited but, when a rod-like structure containing the naphthalene ring is formed, the contrast of the liquid crystal element is improved in some cases by the interfacial interaction with the chiral nematic liquid crystal phase, so that the case is preferable. Especially, the substitution position of the side chain containing $R^{20}$ is particularly preferably 4-position, 5-position, and 6-position toward 1-position; 3-position and 6-position toward 2-position; 7-position toward 3-position; and 4-position and 5-position toward 8-position.

When the naphthalene ring in the polymerizable polymer represented by the general formula (9) has a substituent represented by the general formula (10), there is a case where the liquid crystallinity of the polymer resin phase can be controlled. For example, in order to improve the liquid crystallinity, $R^{21}$ in the general formula (10) is preferably a linear or branched alkyl group having 3 to 7 carbon atoms or a linear alkoxy group having 3 to 7 carbon atoms.

The substitution position of the general formula (10) is not particularly limited but, preferably, a mesogen group may be substituted at an opposing position toward 1-position, and further preferably, when the substituent represented by the general formula (11) is preferably attached to an opposing position (4-position and 5-position toward 1-position, 6-position toward 2-position, 7-position toward 3-position, 4-position and 5-position toward 8-position) and the side chain in the above general formula (9) is formed in a rod-like structure containing the naphthalene ring, the compatibility with the chiral nematic liquid crystal is improved and the contrast of the liquid crystal element is improved in some cases.

m represents an integer of 1 to 3 and, in the case where m is 2 or more, two or more $X^{20}$ groups contained in one molecule of the compound represented by the general formula (9) may be the same or different.

When m is too large, the compatibility of the general formula (9) with the chiral nematic liquid crystal phase decreases in some cases, so that m is preferably 2 or less and more preferably 1.

Of the above $X^{21}$ groups, when $X^{21}$ represents a direct bond or one linking group selected from the following group, the chiral nematic liquid crystal phase does not have absorption toward visible light and a highly transparent liquid crystal element can be obtained in some cases, so that the case is preferable.

[Chem 65]

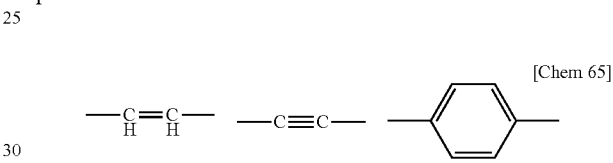

Of the above $X^{22}$ groups, when $X^{22}$ is a direct bond or one linking group selected from the following group, there is a case where the durability of the liquid crystal element can be made high, so that the case is preferable and a direct bond is more preferable.

[Chem 66]

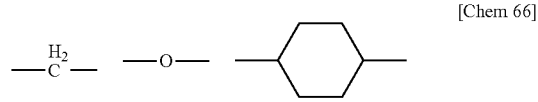

m' represents an integer of 1 to 3 and, in the case where m' is 2 or more, two or more —$X^{21}$—$X^{22}$— groups present in one molecule of the compound represented by the general formula (9) may be the same or different.

When m' is 2 or less, there is a case where the chiral nematic liquid crystal phase does not have absorption toward visible light and thus a highly transparent liquid crystal element can be obtained, so that the case is preferable and m' is more preferably 1.

$R^{21}$ represents a hydrogen atom, a halogen atom, a hydroxyl group, a linear or branched alkyl group having 1 to 7 carbon atoms, a linear or branched alkoxy group having 1 to 7 carbon atoms, or a cyano group.

The linear or branched alkyl group having 1 to 7 carbon atoms of $R^{21}$ has the same meaning as the linear or branched alkyl group exemplified in $R^2$ of the general formula (2). Also, the linear or branched alkoxy group having 1 to 7 carbon atoms of $R^{21}$ has the same meaning as the linear or branched alkoxy group exemplified in $R^2$ of the general formula (2).

Of the $R^{21}$ groups, when $R^{21}$ is a hydrogen atom, a linear alkyl group having 1 to 7 carbon atoms, or a linear alkoxy group having 1 to 7 carbon atoms, there is a case where the durability of the polymer resin phase can be made high, so that the case is preferable and a hydrogen atom, a methyl group, or a methoxy group is more preferable.

In the invention, when the polymerizable monomer represented by the general formula (9) is present in the chiral nematic liquid crystal phase, the improvement and stabilization of driving properties of the liquid crystal element can be achieved.

In the liquid crystal element of the invention, in the production process, by causing polymerization-induced phase separation of a liquid crystal composition containing a chiral nematic liquid crystal, a polymerizable monomer, and a polymerization initiator in a cholesteric phase, the polymer resin phase is obtained. The polymerization initiator is useful in view of accelerating the polymerization rate to improve the curing rate at the production of the liquid crystal element but there is a case where decomposition products formed in the polymerization process remain in the chiral nematic liquid crystal phase as ionic low-molecular-weight compounds and deteriorate the driving of the liquid crystal element or unreacted substances remain in the chiral nematic liquid crystal phase in the liquid crystal element to generate radical species with time and decompose the compounds in the liquid crystal element, and thereby the driving of the liquid crystal element is deteriorated.

In the invention, by using a polymerizable monomer having a high photo-reactivity and allowing the polymerization to proceed sufficiently even with a minute amount of a polymerization initiator and also performing the production so that the polymerization initiator is all consumed during the polymerization-induced phase separation process and the polymerizable monomer remains in the chiral nematic liquid crystal phase, a liquid crystal element satisfying all of the liquid crystal element production for a short period of time, a high contrast, and a rapid response is obtained.

In the invention, the amount of the polymerizable monomer represented by the general formula (9) contained in the chiral nematic liquid crystal phase is not particularly limited unless the effects of the invention are not impaired but the polymerizable monomer represented by the general formula (9) is preferably contained in an amount of 10 µg or more and preferably contained in an amount of 100 µg or more in 1 g of the chiral nematic liquid crystal phase. Moreover, the monomer is preferably contained in an amount of 1,000 µg or less and further preferably contained in an amount of 500 µg or less.

In the case where the amount of the polymerizable monomer represented by the general formula (9) contained in the chiral nematic liquid crystal phase is too small, the case means that the amount of the polymerization initiator added in the liquid crystal composition before polymerization is too large, which sometimes becomes a main cause of deteriorating the driving of the liquid crystal element as mentioned above. On the other hand, when the amount of the polymerizable monomer is too large, the amount sometimes becomes a main cause of variation in the properties of the liquid crystal element, such as driving voltage, owing to the polymerization reaction with time.

The chiral nematic liquid crystal phase in the invention can be easily separated and collected by the method of washing it away from the liquid crystal element using an organic solvent. Moreover, the polymerizable monomer represented by the general formula (9) in the chiral nematic liquid crystal phase can be easily quantitatively determined using a liquid chromatography-mass spectrometry.

As the polymerizable monomer represented by the general formula (9), the polymerizable monomer represented by the following general formula (11) is preferable since derivatives thereof are easily synthesized and are industrially easily available:

[Chem 67]

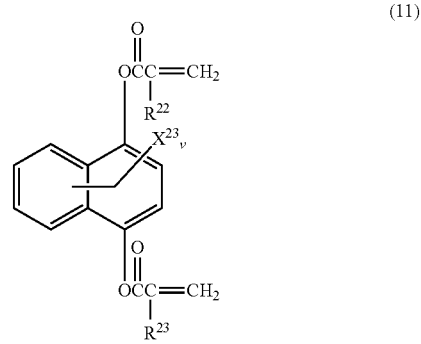

(11)

wherein $R^{22}$ and $R^{22}$ each independently represent a hydrogen atom or a methyl group, v represents an integer of 1 to 3 and, in the case where v is 2 or more, two or more $X^{23}$ groups present in one molecule of the polymerizable monomer represented by the general formula (11) may be the same or different, $X^{23}$ represents a group represented by the following general formula (12):

[Chem 68]

(12)

wherein $X^{24}$ represents a direct bond or one linking group selected from the following group:

[Chem 69]

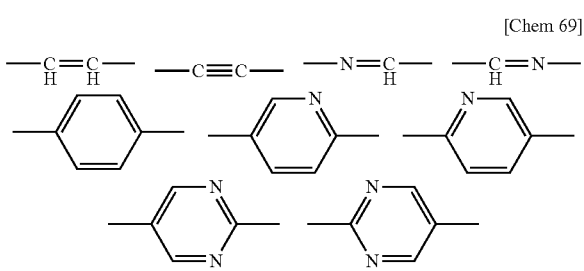

$X^{25}$ represents a direct bond or one linking group selected from the following group:

[Chem 70]

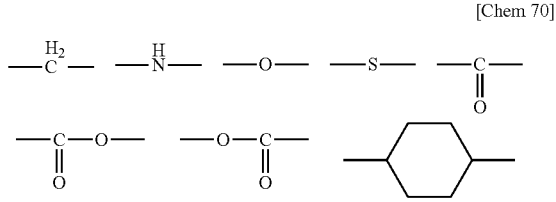

$R^{24}$ represents a hydrogen atom, a halogen atom, a hydroxyl group, a linear or branched alkyl group having 1 to 7 carbon atoms, a linear or branched alkoxy group having 1 to 7 carbon atoms, or a cyano group, v' represents an integer of 1 to 3 and, in the case where v' is 2 or more, two or more —$X^{24}$—$X^{25}$— groups present in one molecule of the polymerizable monomer represented by the general formula (11) may be the same or different.

v represents an integer of 1 to 3 and, in the case where v is 2 or more, two or more $X^{23}$ groups contained in one molecule of the compound represented by the general formula (11) may be the same or different. When v is too large, the compatibility of the general formula (11) with the chiral nematic liquid crystal phase decreases in some cases, so that v is preferably 2 or less and more preferably 1.

Of the above $X^{24}$ groups, when $X^{24}$ is a direct bond or one linking group selected from the following group, the chiral nematic liquid crystal phase does not have absorption toward visible light and a highly transparent liquid crystal element can be obtained in some cases, so that the case is preferable.

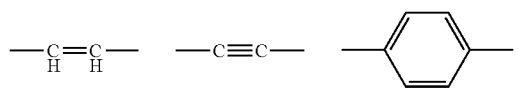

[Chem 71]

Of the above $X^{25}$ groups, when $X^{25}$ is a direct bond or one linking group selected from the following group, there is a case where the durability of the liquid crystal element can be made high, so that the case is preferable and a direct bond is more preferable.

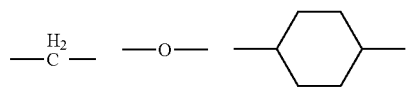

[Chem 72]

v' represents an integer of 1 to 3 and, in the case where v' is 2 or more, two or more groups represented by the general formula (12) present in one molecule of the compound represented by the general formula (11) may be the same or different.

When v' is 2 or less, there is a case where the chiral nematic liquid crystal phase does not have absorption toward visible light and thus a highly transparent liquid crystal element can be obtained, so that the case is preferable and v' is more preferably 1.

$R^{24}$ represents a hydrogen atom, a halogen atom, a hydroxyl group, a linear or branched alkyl group having 1 to 7 carbon atoms, a linear or branched alkoxy group having 1 to 7 carbon atoms, or a cyano group.

The linear or branched alkyl group having 1 to 7 carbon atoms of $R^{24}$ has the same meaning as the linear or branched alkyl group exemplified in $R^2$ of the general formula (2). Also, the linear or branched alkoxy group having 1 to 7 carbon atoms of $R^{24}$ has the same meaning as the linear or branched alkoxy group exemplified in $R^2$ of the general formula (2).

Of the $R^{24}$ groups, when $R^{24}$ is a hydrogen atom, a linear alkyl group having 1 to 7 carbon atoms, or a linear alkoxy group having 1 to 7 carbon atoms, there is a case where the durability of the polymer resin phase can be made high, so that the case is preferable and a hydrogen atom, a methyl group, or a methoxy group is more preferable.

Specific examples of the polymerizable monomer represented by the general formula (11) are exemplified in the following. The invention is not limited to these unless it exceeds the gist thereof.

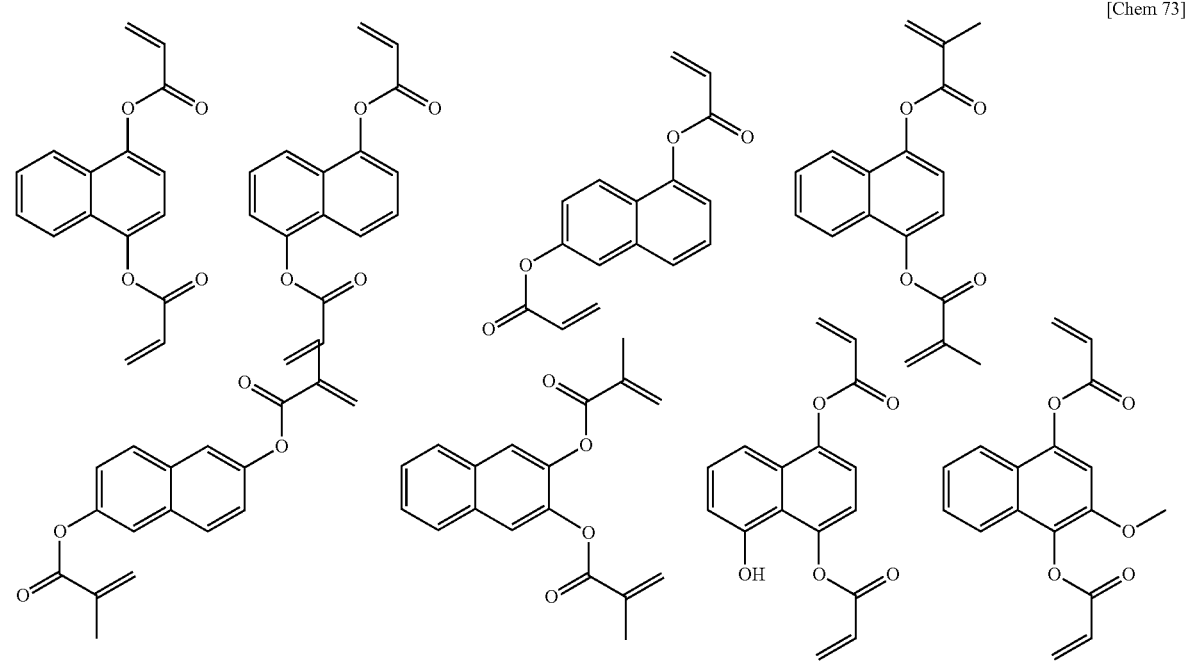

[Chem 73]

-continued
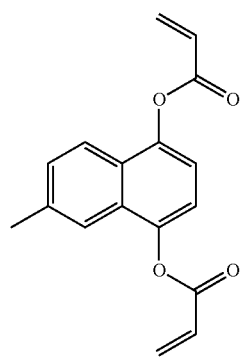
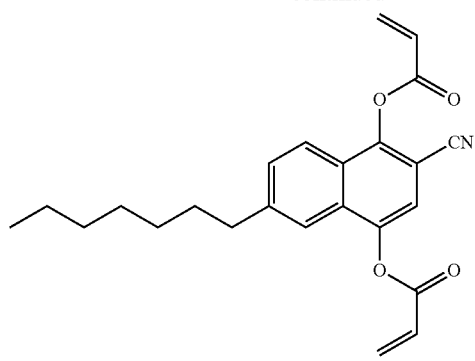
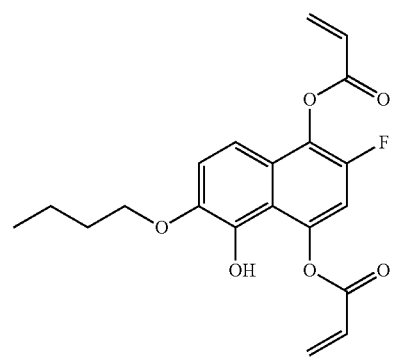
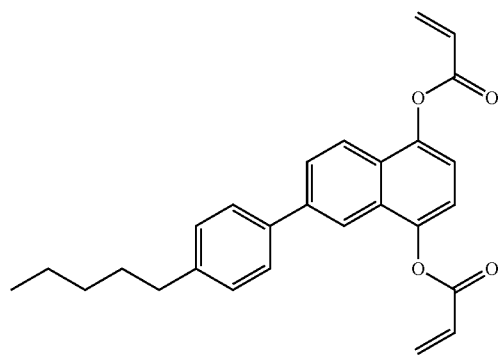
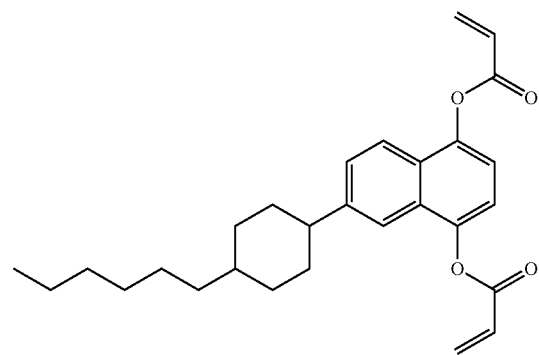
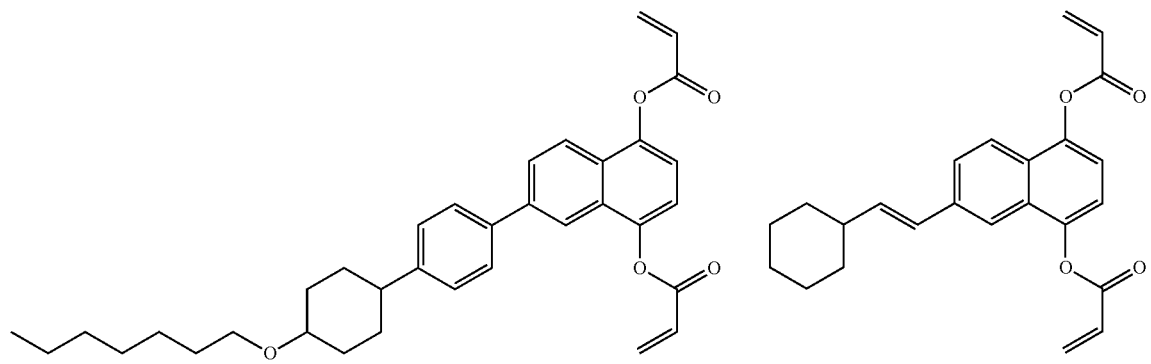
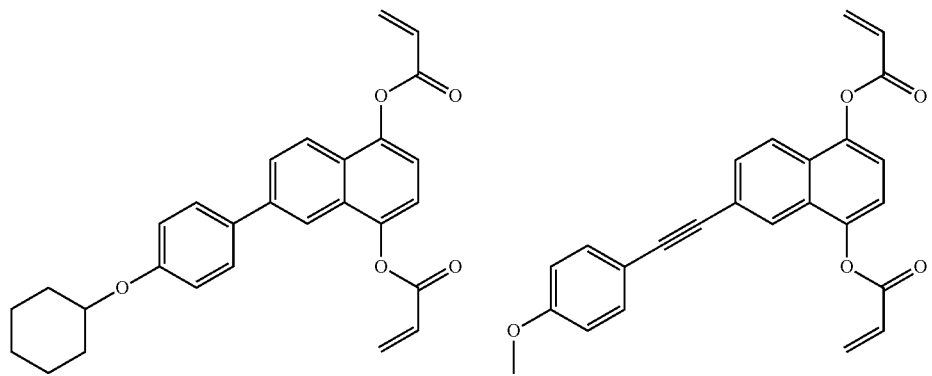

-continued

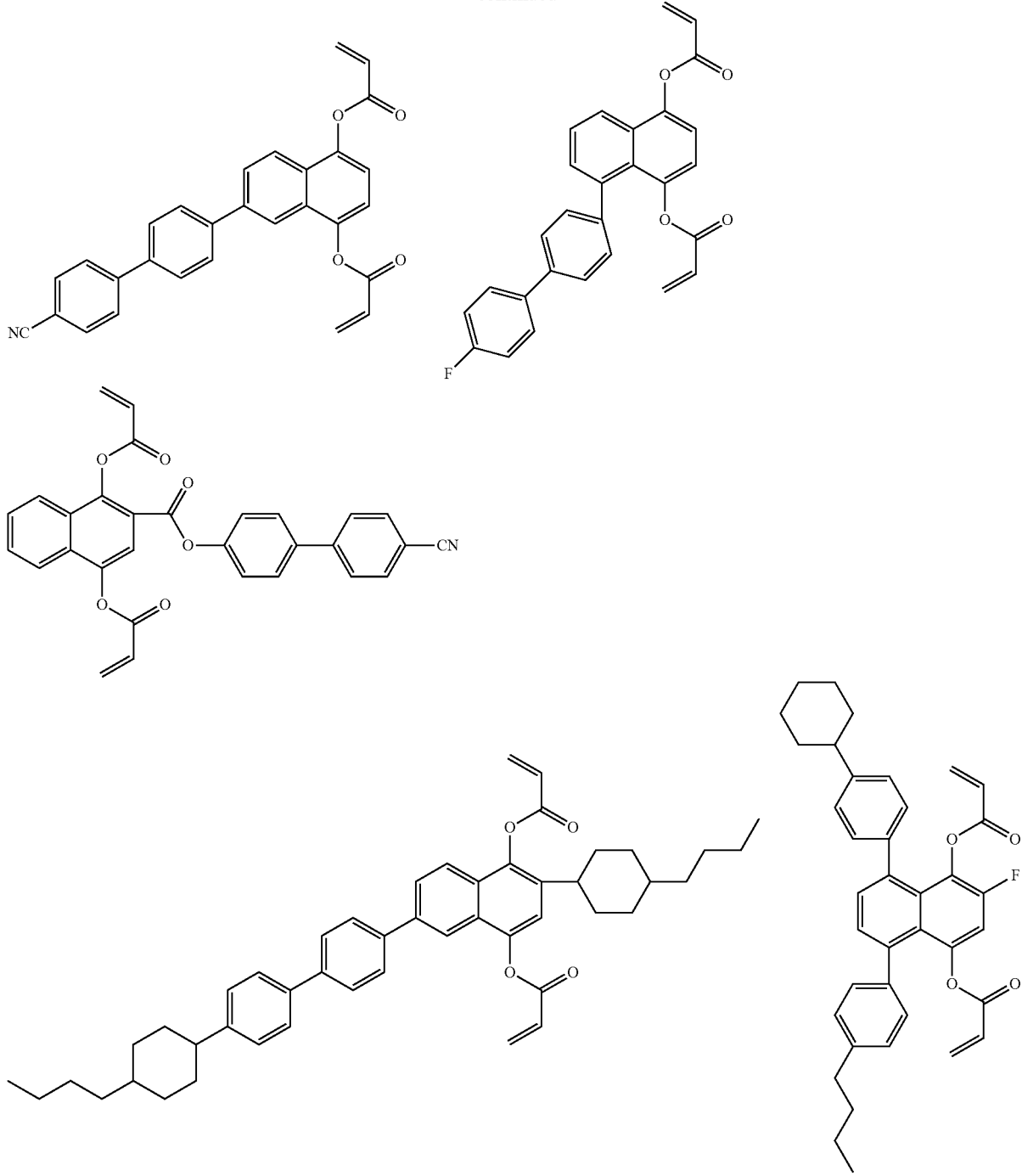

The dielectric constant anisotropy of the chiral nematic liquid crystal phase of the invention is positive. The driving in a reverse mode becomes possible due to the positive dielectric constant anisotropy. The dielectric constant anisotropy ($\Delta\epsilon$) of the chiral nematic liquid crystal phase is not particularly limited as long as it is positive but is preferably 5 or more and 8 or more is preferable for reducing the driving voltage of the liquid crystal element.

The chiral nematic liquid crystal phase of the invention may contain additives such as a photostabilizer, an antioxidant, a thickener, a polymerization inhibitor, a photosensitizer, an adhesive, a defoaming agent, and a surfactant according to need. They may not have liquid crystallinity and the dielectric constant anisotropy may be positive or negative. For obtaining the effects of the invention, the chiral nematic liquid crystal phase forms a chiral nematic liquid crystal structure and has a positive dielectric constant anisotropy. Since the chiral nematic liquid crystal phase of the invention contains a chiral nematic liquid crystal as a main component, the dielectric constant anisotropy of the chiral nematic liquid crystal phase depends on the dielectric constant anisotropy of the chiral nematic liquid crystal, and the sign is usually not reversed by the additives.

<Chiral Nematic Liquid Crystal>

The chiral nematic liquid crystal for use in the liquid crystal element and liquid crystal composition of the invention has a positive dielectric constant anisotropy. Due to the positive dielectric constant anisotropy of the chiral nematic liquid crystal of the invention, the driving in a reverse mode becomes possible.

The value ($\Delta\in$) of the dielectric constant anisotropy of the chiral nematic liquid crystal is not particularly limited as long as it is positive but the value is preferably 5 or more and 8 or more is preferable for reducing the driving voltage of the liquid crystal element. Moreover, it is preferable that individual molecules constituting the chiral nematic liquid crystal do not have absorption at wavelengths longer than 350 nm, in view of shortening the curing time of the polymerizable monomer.

The chiral nematic liquid crystal may be an assembly of a liquid crystalline compound in which the liquid crystal itself exhibits a cholesteric phase or may be a chiral nematic liquid crystal obtained by adding a chiral agent to a nematic liquid crystal. From the viewpoint of designing a liquid crystal composition, it is preferable to control chiral pitch length (p) and liquid crystal-isotropic phase transition temperature (Tni) by adding a chiral agent to a nematic liquid crystal depending on the purpose.

The relationship between the chiral pitch length (p) of the chiral nematic liquid crystal of the invention and the distance (d) between the substrates with electrodes (d)/(p) is preferably 1 or more. It is further preferably 2 or more and is particularly preferably 4 or more. Moreover, it is preferably 20 or less and particularly preferably 12 or less. As (d)/(p) increases, the scattering at driving increases and light shielding properties are improved but, on the other hand, the driving voltage of the liquid crystal element also simultaneously increases, so that it is suitable to control (d)/(p) within the above range from the viewpoint of satisfying all of the light shielding properties, energy saving, and safety.

The chiral pitch length (p) of the chiral nematic liquid crystal is preferably 0.3 µm or more and further preferably 0.8 µm or more. On the other hand, it is preferably 3 µm or less and further preferably 2 µm or less.

When (p) is too small, the driving voltage of the liquid crystal element tends to increase and when it is too large, the contrast tends to be poor. In general, since (p) is inversely proportional to the concentration of the chiral agent, the concentration of the chiral agent may be determined by counting backward from the necessary value of (p). Incidentally, in the case where (p)×(n) (n is a refractive index of the chiral nematic liquid crystal) falls within the range of visible light wavelength (380 nm to 800 nm), the finally obtained liquid crystal element is colored at the time when voltage is not applied and, in the case where (p)×(n) is out of the range, the liquid crystal element is colorless and transparent at the time when voltage is not applied, so that (p) may be selected depending on the purpose.

The distance (d) between substrates with electrodes of the invention is necessarily the chiral pitch length (p) of the chiral nematic liquid crystal used or more and is usually preferably 2 µm or more, further preferably 3 µm or more, and particularly preferably 5 µm or more. Moreover, the distance (d) is preferably 100 µm or less and further preferably 20 µm or less.

The light transmittance of the liquid crystal element in a state that voltage is not applied decreases with the increase in (d) and the response time of the liquid crystal element also increases in some cases. On the other hand, when (d) is too small, the light shielding properties at driving decreases and, in the case of a large-area liquid crystal element, the liquid crystal element short-circuits in some cases. When (d) falls within the range, these requirements can be satisfied in a balanced manner.

Since the upper limit of the temperature capable of acting the liquid crystal element is determined by (Tni) of the chiral nematic liquid crystal, (Tni) of the chiral nematic liquid crystal is preferably 50° C. or higher and further preferably 70° C. or higher. On the other hand, when (Tni) is raised, viscosity also tends to increase, so that (Tni) is preferably 200° C. or lower and further preferably 150° C. or lower.

The nematic liquid crystal may be any of known ones and may be synthesized one or commercially available one without particular limitation in molecular skeleton, substituents, and molecular weight of the constituting molecule. For making the dielectric constant anisotropy of the chiral nematic liquid crystal in the chiral nematic liquid crystal phase of the liquid crystal element and the liquid crystal composition positive, it is preferable that the dielectric constant anisotropy of the nematic liquid crystal is positive and large. Moreover, it is preferable that the constituting molecule does not have absorption at wavelengths longer than 350 nm, in view of shortening the curing time of the polymerizable monomer.

In the case of using known liquid crystalline substances, specifically, use can be made of various low-molecular-weight compounds such as biphenyl-based ones, phenylcyclohexane-based ones, and cyclohexylcyclohexane-based ones or mixtures thereof as described in "Liquid Crystal Device Handbook" edited by Japan Society for the Promotion of Science 142nd committee, Nippon Kogyo Shinbun (1989), pp. 152-192 and "Ekisho Binran (Liquid Crystal Handbook)" edited by Ekisho Binran Editing Committee, Maruzen Co., Ltd. (2000), pp. 260-330. In addition, polymeric compounds or mixtures thereof as described in "Ekisho Binran (Liquid Crystal Handbook)" edited by Ekisho Binran Editing Committee, Maruzen Co., Ltd. (2000), pp. 365-415 can be also used. Examples of compounds constituting the nematic liquid crystal include:

[Chem 74]

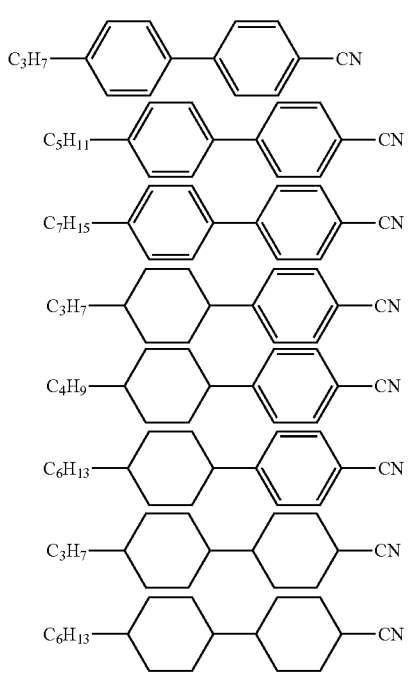

-continued

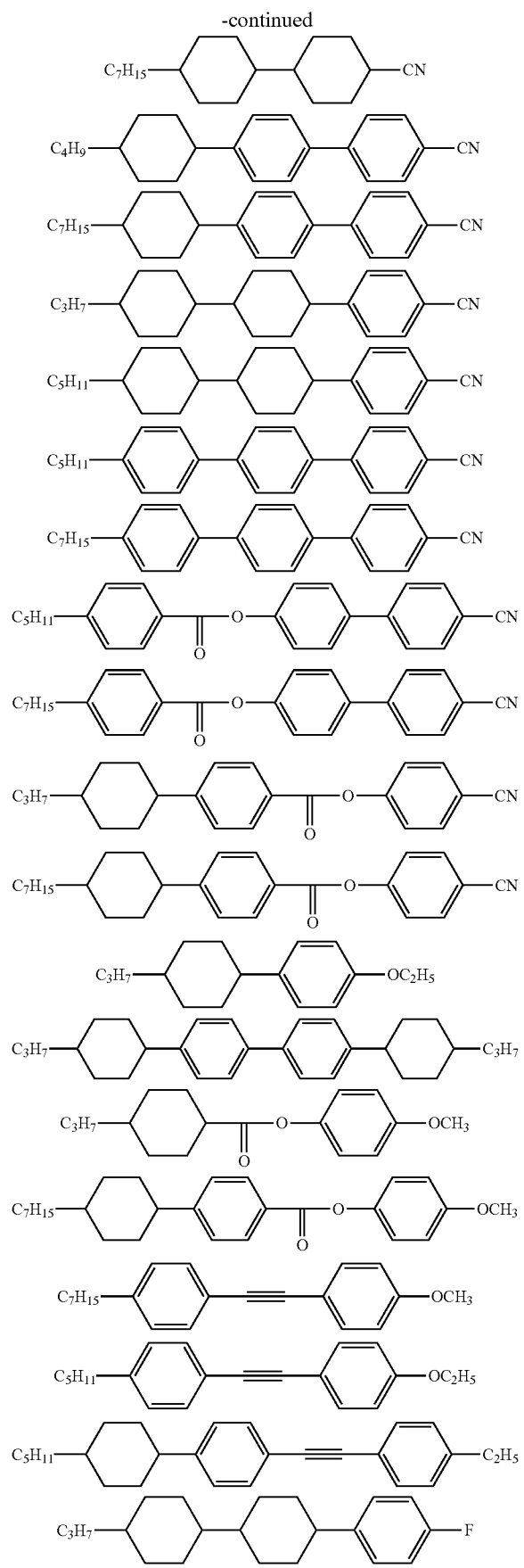

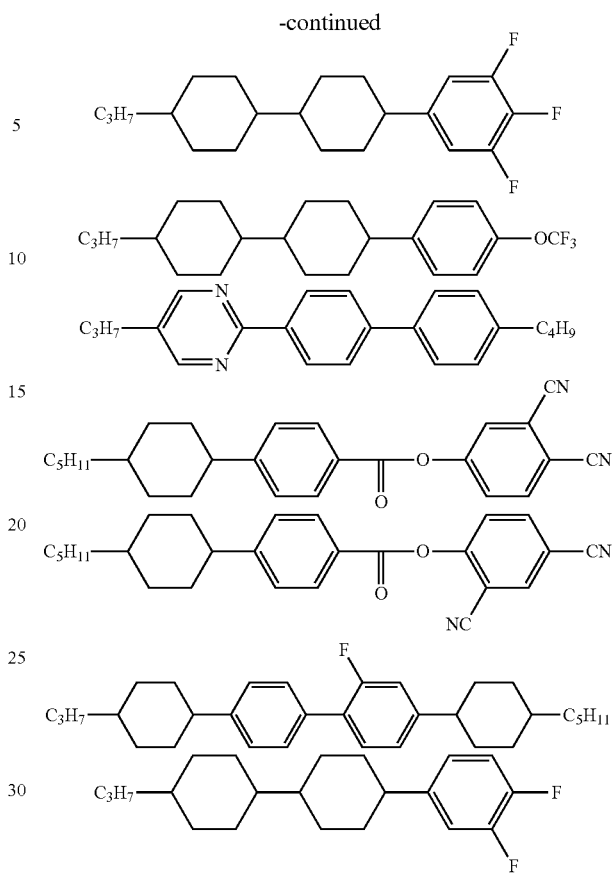

and the like. As the cholesteric liquid crystal and the nematic liquid crystal, those having a high dielectric constant anisotropy are preferable in view of rapid response of the liquid crystal element and easiness of liquid crystal element production.

The chiral agent may be any one as long as it is a chiral compound compatible with a host liquid crystal, may be synthesized one or commercially available one, may be one which itself shows liquid crystallinity, and may have a polymerizable functional group. Moreover, it may be dextrorotatory or levorotatory and a dextrorotatory chiral agent and a levorotatory chiral agent may be used in combination. Furthermore, as the chiral agent, one having a large positive dielectric constant anisotropy and a low viscosity is preferable from the viewpoints of driving voltage reduction and response rate of the liquid crystal element and one having a larger helical twisting power that is an index of a power of the chiral agent for twisting the liquid crystal is preferable. In addition, it is preferable that the agent does not have absorption at wavelengths longer than 350 nm, in view of shortening the curing time of the polymerizable monomer.

Examples of the chiral agent include CB 15 (trade name, manufactured by Merck), C15 (trade name, manufactured by Merck), S-811 (trade name, manufactured by Merck), R-811 (trade name, manufactured by Merck), S-1011 (trade name, manufactured by Merck), R-1011 (trade name, manufactured by Merck), and the like.

<Others>

The chiral nematic liquid crystal phase of the liquid crystal element of the invention may contain a polymerization initiator, a photostabilizer, an antioxidant, a thickener, a polymerization inhibitor, a photosensitizer, an adhesive, a defoaming agent, a surfactant, and the like. Moreover, the content of the above other components may be any ratio in the range where the performance of the liquid crystal element is not impaired.

<Uses of Liquid Crystal Element>

The liquid crystal composition and liquid crystal element of the invention can be used in screens, displays, and the like. For example, the composition and element can be utilized as screens for view interruption of windows of buildings, partitions, show windows, and the like and as displays for notification boards and the like and panels for projection by electrically switching displayed items with a rapid response.

A system of projection may be front projection, rear projection, or the like without particular limitation. For example, there may be mentioned a rear projection system shown in JP-A-6-82748 or WO2009/150579 and a projection system using coherent light as a light source as shown in JP-A-2010-217291.

<Liquid Crystal Composition>

The liquid crystal composition of the invention contains a chiral nematic liquid crystal having a positive dielectric constant anisotropy, at least a polymerizable monomer represented by the general formula (13), and a radical polymerization initiator:

[Chem 75]

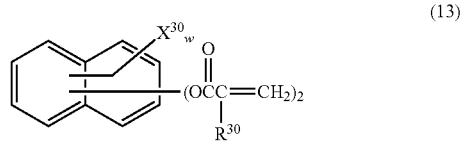

(13)

wherein w represents an integer of 1 to 3 and, in the case where w is 2 or more, two or more $X^{30}$ groups present in one molecule of the polymerizable monomer represented by the general formula (13) may be the same or different, $R^{30}$ represents a hydrogen atom or a methyl group and two $R^{30}$ groups present in one molecule of the polymerizable monomer represented by the general formula (13) may be the same or different, $X^{30}$ represents a group represented by the following general formula (14):

[Chem 76]

(14)

wherein $X^{31}$ represents a direct bond or one linking group selected from the following group:

[Chem 77]

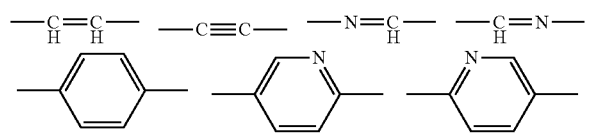

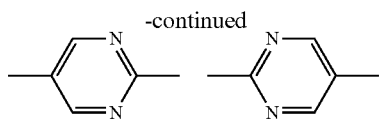

$X^{32}$ represents a direct bond or one linking group selected from the following group:

[Chem. 78]

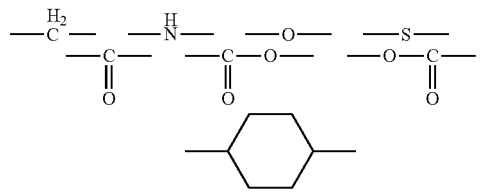

$R^{31}$ represents a hydrogen atom, a halogen atom, a hydroxyl group, a linear or branched alkyl group having 1 to 7 carbon atoms, a linear or branched alkoxy group having 1 to 7 carbon atoms, or a cyano group, w' represents an integer of 1 to 3 and, in the case where w' is 2 or more, two or more $—X^{31}—X^{32}—$ groups present in one molecule of the polymerizable monomer represented by the general formula (13) may be the same or different.

$R^{30}$ represents a hydrogen atom or a methyl group and two $R^{30}$ groups present in one molecule of the polymerizable monomer represented by the general formula (13) may be the same or different. The substitution position of the side chain containing $R^{30}$ is not particularly limited but, when a rod-like structure containing the naphthalene ring is formed, the contrast of the liquid crystal element is improved in some cases by the interfacial interaction with the chiral nematic liquid crystal phase, so that the case is preferable. Especially, the substitution position of the side chain containing $R^{30}$ is particularly preferably 4-position, 5-position, and 6-position toward 1-position; 3-position and 6-position toward 2-position; 7-position toward 3-position; and 4-position and 5-position toward 8-position.

When the naphthalene ring in the polymerizable polymer represented by the general formula (13) has a substituent represented by the general formula (14), there is a case where the liquid crystallinity of the polymer resin phase can be controlled. For example, in order to improve the liquid crystallinity, $R^{31}$ in the general formula (14) is preferably a linear or branched alkyl group having 3 to 7 carbon atoms or a linear alkoxy group having 3 to 7 carbon atoms.

The substitution position of the general formula (14) is not particularly limited but, further preferably, when the substituent represented by the general formula (14) is attached to an opposing position (4-position and 5-position toward 1-position, 6-position toward 2-position, 7-position toward 3-position, 4-position and 5-position toward 8-position) and the side chain in the above general formula (13) is formed in a rod-like structure containing the naphthalene ring, the compatibility with the chiral nematic liquid crystal is improved and the contrast of the liquid crystal element is improved in some cases.

When w is too large, the compatibility of the general formula (13) with the chiral nematic liquid crystal decreases in some cases, so that m is preferably 2 or less and more preferably 1.

Of the above $X^{31}$ groups, when $X^{31}$ represents a direct bond or one linking group selected from the following group, the chiral nematic liquid crystal phase and the polymer resin phase do not have absorption toward visible light and a highly transparent liquid crystal element can be obtained in some cases, so that the case is preferable.

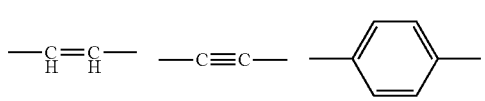

[Chem 79]

Of the above $X^{32}$ groups, when $X^{22}$ is a direct bond or one linking group selected from the following group, there is a case where the durability of the liquid crystal element can be made high, so that the case is preferable and a direct bond is more preferable.

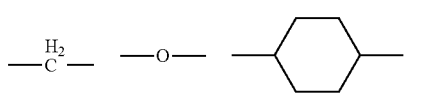

[Chem 80]

w' represents an integer of 1 to 3 and, in the case where w' is 2 or more, two or more groups represented by the general formula (14) present in one molecule of the compound represented by the general formula (13) may be the same or different.

When w' is 2 or less, there is a case where the chiral nematic liquid crystal phase and the polymer resin phase do not have absorption toward visible light and thus a highly transparent liquid crystal element can be obtained, so that the case is preferable and w' is more preferably 1.

$R^{31}$ represents a hydrogen atom, a halogen atom, a hydroxyl group, a linear or branched alkyl group having 1 to 7 carbon atoms, a linear or branched alkoxy group having 1 to 7 carbon atoms, or a cyano group.

The linear or branched alkyl group having 1 to 7 carbon atoms of $R^{31}$ has the same meaning as the linear or branched alkyl group exemplified in $R^2$ of the general formula (2). Also, the linear or branched alkoxy group having 1 to 7 carbon atoms of $R^{31}$ has the same meaning as the linear or branched alkoxy group exemplified in $R^2$ of the general formula (2).

Of the $R^{31}$ groups, when $R^{31}$ is a hydrogen atom, a linear alkyl group having 1 to 7 carbon atoms, or a linear alkoxy group having 1 to 7 carbon atoms, there is a case where the durability of the polymer resin phase can be made high, so that the case is preferable and a hydrogen atom, a methyl group, or a methoxy group is more preferable.

Although the above liquid crystal composition of the invention is rapidly cured at a high light intensity, the planar structure of the liquid crystal is not disturbed and, as a result, a reverse-mode liquid crystal element exhibiting a high contrast is realized. The main cause thereof is not necessarily clear but is considered that the above polymer precursor (polymerizable monomer) forms a structural form suitable for memorizing the planar structure toward the chiral nematic liquid crystal and the naphthalene ring in the polymer resin shows interfacial interaction useful for the chiral nematic liquid crystal.

Moreover, it is considered that the above action is exhibited since the number of the acryloyloxy group or methacryloyloxy group contained in the naphthalene ring of the polymerizable monomer is two. In the case where the number of the acryloyloxy group or methacryloyloxy group bonded to the naphthalene ring is one, mechanical strength of the polymer resin phase is not sufficiently obtained and repetition durability of the liquid crystal element is remarkably deteriorated, so that a high contrast is not obtained. On the other hand, in the case where the number of the acryloyloxy group or methacryloyloxy group bonded to the naphthalene ring is three, steric hindrance between the polymerizable monomers is large and the polymerization main chain is interrupted before the polymer network structure is sufficiently developed, so that a high contrast is also not obtained.

The polymerizable monomer represented by the general formula (13) is preferably a polymerizable monomer represented by the following general formula (15).

[Chem. 81]

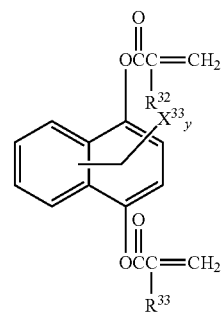

(15)

wherein $R^{32}$ and $R^{33}$ each independently represent a hydrogen atom or a methyl group, y represents an integer of 1 to 3 and, in the case where y is 2 or more, two or more $X^{33}$ groups present in one molecule of the polymerizable monomer represented by the general formula (15) may be the same or different, $X^{33}$ represents a group represented by the following general formula (16):

[Chem 82]

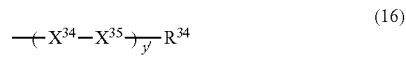

(16)

wherein $X^{34}$ represents a direct bond or one linking group selected from the following group:

[Chem 83]

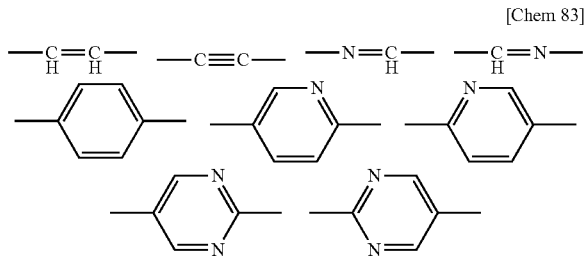

$X^{35}$ represents a direct bond or one linking group selected from the following group:

[Chem 84]

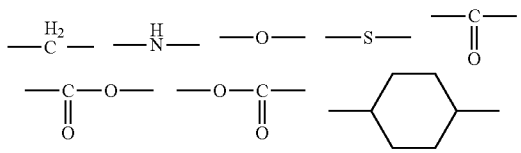

$R^{34}$ represents a hydrogen atom, a halogen atom, a hydroxyl group, a linear or branched alkyl group having 1 to 7 carbon atoms, a linear or branched alkoxy group having 1 to 7 carbon atoms, or a cyano group, y' represents an integer of 1 to 3 and, in the case where y' is 2 or more, two or more —$X^{34}$—$X^{35}$— groups present in one molecule of the polymerizable monomer represented by the general formula (15) may be the same or different.

The linear or branched alkyl group having 1 to 7 carbon atoms of $R^{34}$ has the same meaning as the linear or branched alkyl group exemplified in $R^2$ of the general formula (2). Also, the linear or branched alkoxy group having 1 to 7 carbon atoms of $R^{34}$ has the same meaning as the linear or branched alkoxy group exemplified in $R^2$ of the general formula (2).

Moreover the polymerizable monomer represented by the general formula (15) is preferably a polymerizable monomer represented by the general formula (17):

[Chem 85]

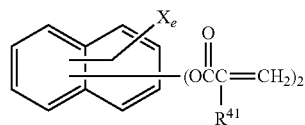

(17)

wherein $R^{41}$ represents a hydrogen atom or a methyl group and a plurality of $R^{41}$ groups represent the same atom or group; X represents a halogen atom, an alkyl group having 1 to 4 carbon atoms, or an alkoxy group having 1 to 4 carbon atoms, and e represents an integer of 0 to 3.

In the above formula (17), two acryloyloxy groups or methacryloyloxy groups may be bonded to the same ring or may be bonded to different rings. Since the curable monomer of the invention has a structure in which the naphthalene has two acryloyloxy groups or methacryloyloxy groups, curing for a short period of time is possible in the case where the monomer is converted into a liquid crystal composition and, after curing, a rigid polymer structure rich in repetition durability can be formed. In addition, although the reason is unclear, the polymer precursor forms a structural form suitable for memorizing the planar structure toward the chiral nematic liquid crystal and the naphthalene ring in the polymer resin shows interfacial interaction useful for the chiral nematic liquid crystal. As a result, it is considered that a reverse-mode liquid crystal element exhibiting a high contrast is realized. Incidentally, the naphthalene ring in the monomer may be substituted with a halogen atom, an alkyl group, or an alkoxy group in the range where the compatibility with the host liquid crystal and the interfacial interaction after curing are sterically not impaired.

The halogen atom represented by X includes a fluorine atom, a chlorine atom, a bromine atom, and the like. The alkyl group having 1 to 4 carbon atoms represented by X includes a methyl group, an ethyl group, an n-propyl group, an isobutyl group, an n-butyl group, a t-butyl group, and the like, and the alkoxy group having 1 to 4 carbon atoms represented by X includes a methoxy group, an ethoxy group, an n-propoxy group, an isopropoxy group, an n-butoxy group, a t-butoxy group, and the like. Of these, a fluorine atom, a chlorine atom, a bromine atom, a methyl group, and a methoxy group are preferable since the contrast becomes higher as compared with the case of the other substituents.

In the case of having a substituent represented by X, the substituent may be present in either ring of the naphthalene ring. e represents an integer of 0 to 3 and 0 or 1 is preferable as compared with 2 or 3 since the contrast becomes high.

Of the polymerizable monomers represented by the above formula (17), a polymerizable monomer represented by the following general formula (18) is preferable in view of high contrast, easy availability, and the like:

[Chem. 86]

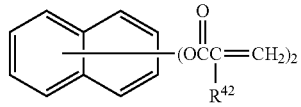

(18)

wherein $R^{42}$ represents a hydrogen atom or a methyl group and a plurality of $R^{42}$ groups represent the same atom or group.

Of the polymerizable monomers represented by the above formula (18), the acryloyloxy groups or methacryloyloxy groups are preferably bonded to the same ring and are particularly preferably bonded at 1-position and 4-position.

Specific examples of the polymerizable monomer represented by the general formula (18) are shown in the following but it is not limited to the following in the invention.

[Chem. 87]

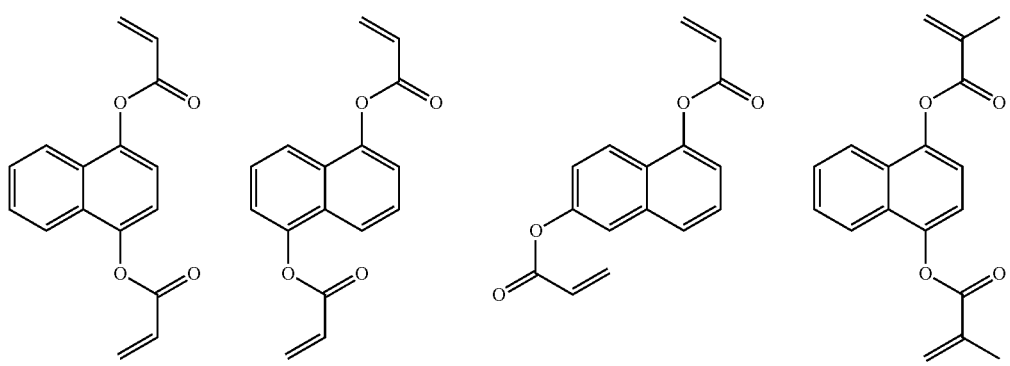

-continued
53
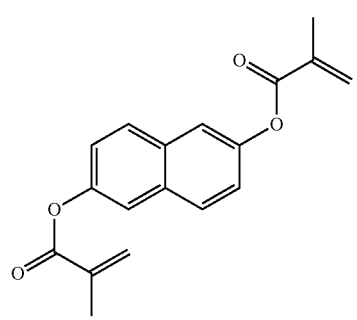
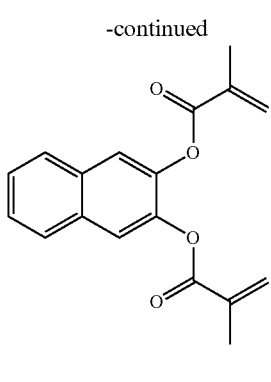
54
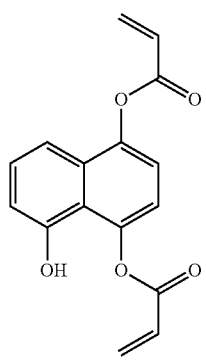
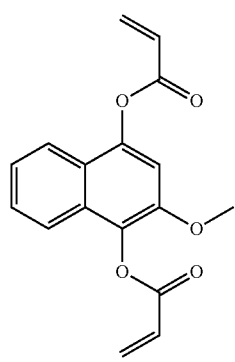
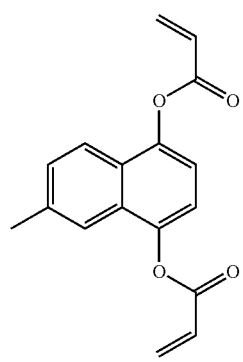
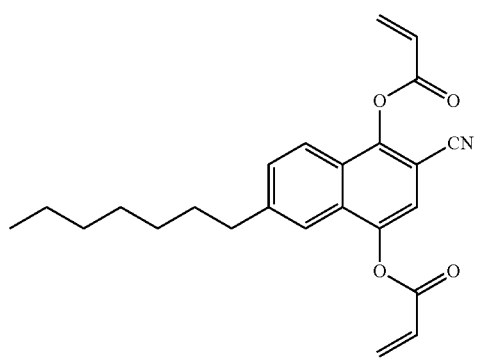
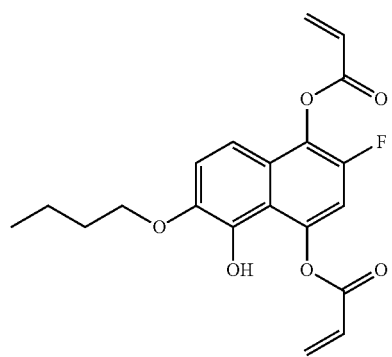
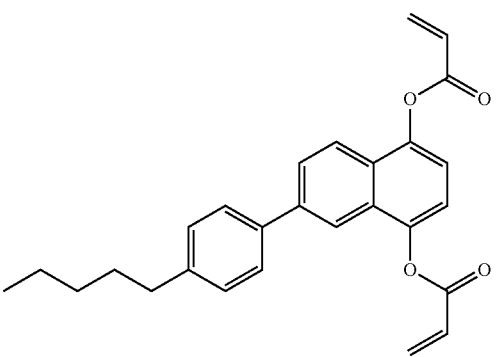
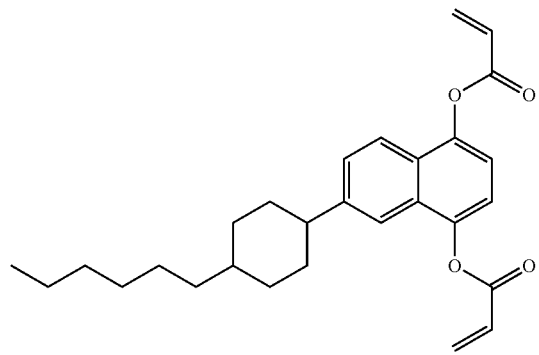

-continued
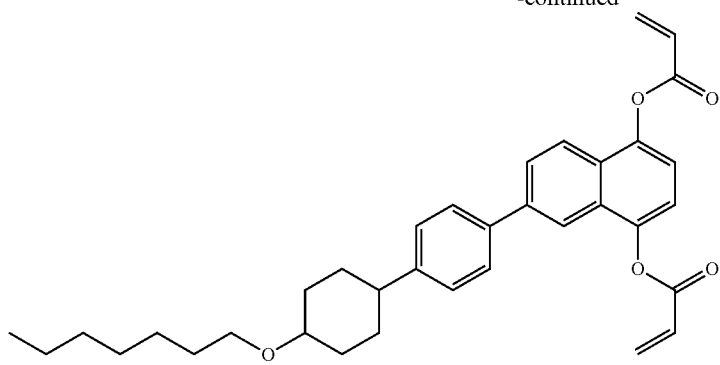
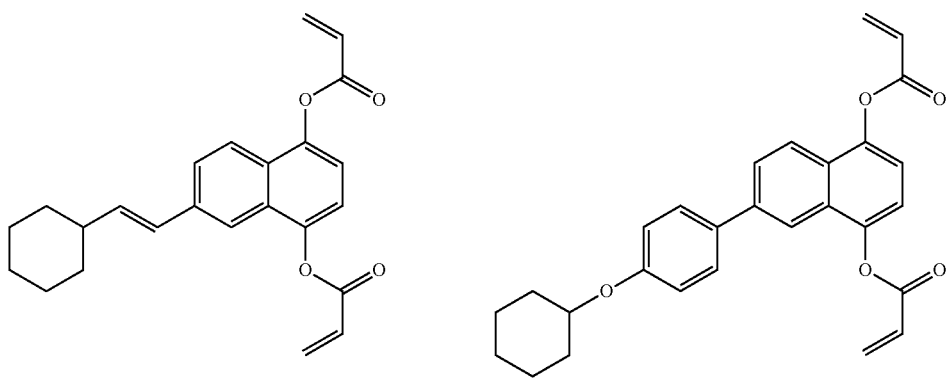
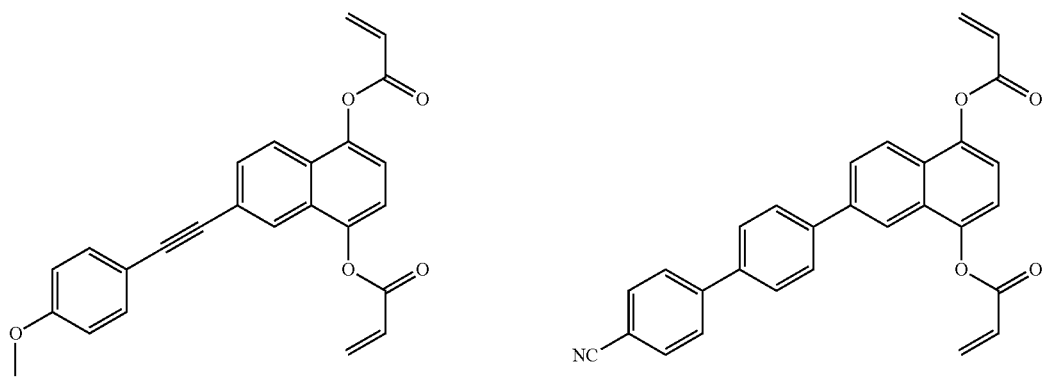
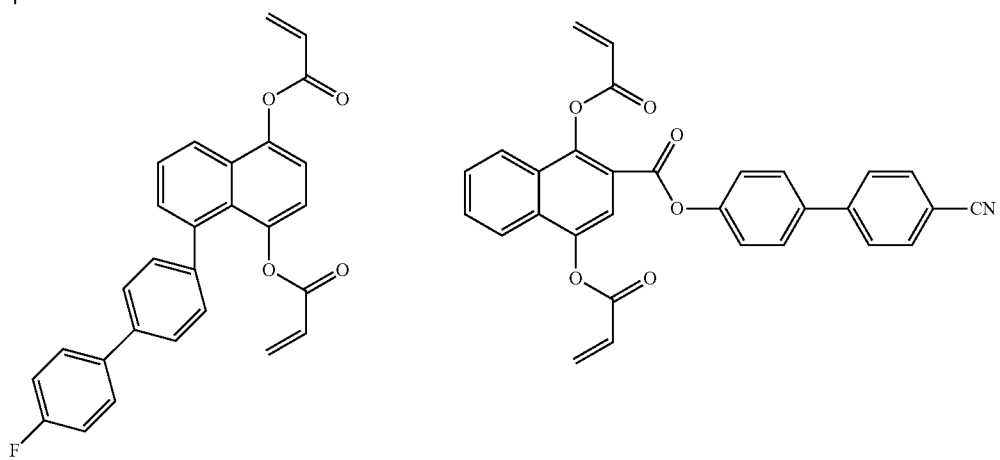

-continued

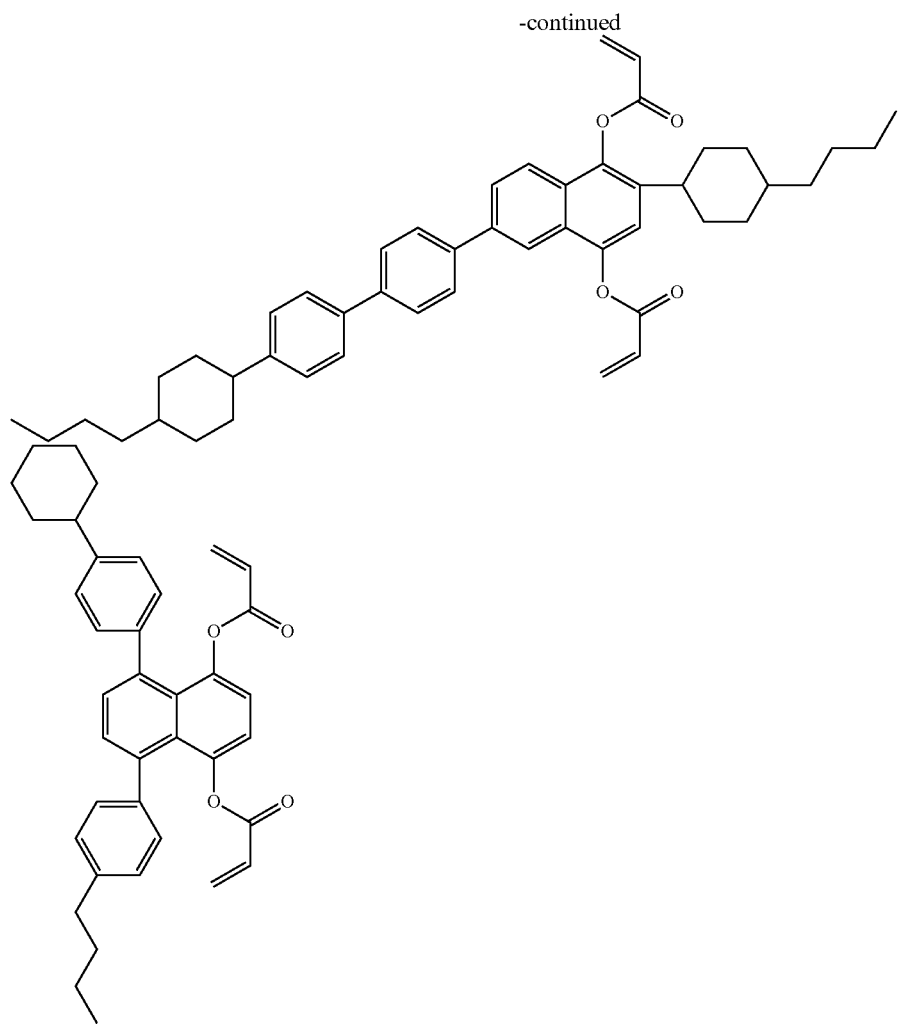

<Other Polymerizable Monomer>

The liquid crystal composition of the invention may contain, in addition to the polymerizable monomer represented by the general formula (13), (meth)acrylic or vinylic, other polymerizable monomer(s) having one or two or more ethylenically unsaturated double bonds and polymerizable oligomer(s) having one ethylenically unsaturated double bond, and the like, which may be copolymerized with the polymerizable monomer represented by the general formula (13) through the curing reaction.

For example, use can be made of polymerizable monomers such as monofunctional (meth)acrylic monomers, difunctional (meth)acrylic monomers, and trifunctional or multifunctional (meth)acrylic monomers described in JP-A-9-90328, polymerizable oligomers such as (meth)acrylic oligomers, and the like.

The vinyl monomer includes styrene, chlorostyrene, α-methylstyrene, divinylbenzene, and the like.

In the case where the aforementioned other polymerizable monomer(s) is used in combination with the polymerizable monomer represented by the general formula (13), the polymerizable monomer represented by the general formula (13) is preferably 30% by mass or more, further preferably 50% by mass or more, and most preferably 80% by mass or more relative to the sum of the polymerizable monomer represented by the general formula (13) and the other polymerizable monomer(s). When the ratio of the polymerizable monomer represented by the general formula (13) is too small, the effects of the invention that a high contrast is obtained when a liquid crystal element is formed while an excellent curability is maintained tend to decrease. Moreover, an upper limit in the case of the combined use is less than 100% by mass.

<Radical Polymerization Initiator>

As the radical polymerization initiator, the molecular structure is not particularly limited but a compound capable of being dissolved in the host liquid crystal is preferably selected. Moreover, since the molecule constituting the liquid crystal composition of the invention typically has ultraviolet absorption at a wavelength of 350 nm or less, as the radical polymerization initiator itself, it is preferable to select one which generates a radical by light having a wavelength of 350 nm or more.

The radical polymerization initiator includes acylphosphine oxide-based ones, alkylphenone-based ones, titanocene-based ones, polyhalogen compounds, alkyl boron salts of cyanine dyes, triaryl-biimidazoles, and the like. Of these, preferred are acylphosphine oxide-based and alkylphenone-based radical polymerization initiators. Of these, acylphosphine oxide-based radical polymerization initiators are particularly preferable in view of polymerization efficiency.

As the acylphosphine oxide-based radical polymerization initiators, for example, known monoacylphosphine oxide derivatives, bisacylphosphine oxide derivatives, trisacylphosphine oxide derivatives, and the like can be used. As commercially available ones, monoacylphosphine derivatives such as Lucirin TPO (trade name, manufactured by BASF) and IRGACURE 819 (trade name, manufactured by BASF) may be mentioned.

<Other Components>

The liquid crystal composition of the invention may contain-additives such as a photostabilizer, an antioxidant, a thickener, a polymerization inhibitor, a photosensitizer, an adhesive, a defoaming agent, and a surfactant. Moreover, when a spacer is contained, a gap between liquid crystal layers formed by photocuring by the method to be mentioned later can be also formed.

<Blend Ratio>

The liquid crystal composition of the invention is designed so as to show a cholesteric phase at room temperature (25° C.) and the liquid crystal-isotropic phase transition temperature (Tni) is preferably 40° C. or higher and further preferably 60° C. or higher. When Tni of the liquid crystal composition of the invention is out of the above range, there is a concern that the liquid crystal structure is sometimes destroyed by temperature elevation derived from the light source or heat of reaction at curing.

The blend ratio of each component in the liquid crystal composition of the invention is not categorically determined depending on the component as long as the liquid crystal composition forms a cholesteric phase. The content of the polymerizable monomer represented by the above general formula (13) in the liquid crystal composition of the invention is usually 0.1% by mass or more and preferably 1% by mass or more and, on the other hand, usually 10% by mass or less and preferably 7% by mass or less. Moreover, in the case where the polymerizable monomer represented by the above general formula (13) is used in combination with the other polymerizable monomer and/or a non-polymerizable monomer, the ratio of the sum of the polymerizable monomer and the non-polymerizable monomer to the liquid crystal composition is also usually 0.2% by mass or more and preferably 1.2% by mass or more and, on the other hand, usually 10% by mass or less and preferably 7% by mass or less. When the ratio is too small, the repetition durability of the liquid crystal element is poor and, when the ratio is too large, the haze in a transparent state becomes large and the haze in an opaque state becomes small in some cases.

The content of the radical polymerization initiator is usually 0.01% by mass or more and preferably 0.05% by mass or more and, on the other hand, usually 5% by mass or less and preferably 1% by mass or less. When the content is too small, the polymerization does not sufficiently proceed and the repetition durability of the liquid crystal element is poor in some cases and, when the ratio is too large, the haze in a transparent state tends to be poor.

Moreover, when the content of the polymerizable monomer represented by the above general formula (13) is taken as A % by mass and the content of the radical polymerization initiator is taken as B % by mass to the liquid crystal composition, B/A is preferably 0.01 or more and further preferably 0.05 or more. Also, it is preferably 0.4 or less and further preferably 0.35 or less. When B/A is in an appropriate range, the polymerization of the polymerizable monomer sufficiently proceeds, the repetition durability of the liquid crystal element is obtained, the haze also becomes a preferable value in some cases. Furthermore, with regard to the content of the above other components, they can be blended in any ratios where the performance of the liquid crystal composition of the invention is not impaired.

<Use of Liquid Crystal Composition>

The liquid crystal composition of the invention is used as a liquid crystal material when a layer containing a cured product thereof is present between a pair of substrates, which are arranged so as to face each other.

<Liquid Crystal Element>

The liquid crystal element of the invention comprises a pair of substrates with electrodes, which are arranged so as to face each other and at least one of which is a transparent substrate; and a liquid crystal light adjusting layer which is disposed between the substrates and contains a composite containing a chiral nematic liquid crystal phase and a polymer resin, the liquid crystal light adjusting layer being obtained by photocuring a liquid crystal composition composed of a polymerizable monomer and a chiral nematic liquid crystal.

The liquid crystal element of the invention is not particularly limited as long as it is the above liquid crystal element and the following will describe representative structures.

Examples of the material of the substrate include inorganic transparent substances such as glass and quartz, and colorless transparent or colored transparent ones or opaque ones such as metals, metal oxides, semiconductors, ceramics, plastic plates, and plastic films. An electrode is a thin film of a metal oxide, a metal, a semiconductor, an organic conductive substance, or the like formed on the whole surface or partial surface of the substrate by known application method, printing method, or a deposition method such as sputtering. Moreover, it may be partially etched one after the formation of the conductive thin film. Particularly, in order to obtain a large-area liquid crystal element, in view of productivity and processability, it is desirable to use an electrode substrate which is an ITO (a mixture of indium oxide and tin oxide) electrode formed on a transparent polymer film of PET or the like by using a vapor deposition method such as sputtering, a printing method, or the like. Incidentally, a wiring for connecting electrodes or an electrode and an outside thereof may be provided on the substrate. For example, the substrate may be an electrode substrate for segment driving, an electrode substrate for matrix driving, an electrode substrate for active matrix driving, or the like. Furthermore, the whole surface or partial surface of the electrode surface provided on the substrate may be covered with a passivation film or an alignment film composed of an organic compound such as a polyimide, a polyamide, a silicone, or a cyano compound, an inorganic compound such as $SiO_2$, $TiO_2$, or $ZrO_2$, or a mixture thereof. Incidentally, the substrate may be subjected to an alignment treatment so that the liquid crystal is aligned toward the substrate surface and, in the case where the alignment treatment is performed, any alignment treatment may be used as long as the liquid crystal composition to be come into contact forms a planar structure. For example, two substrates may be both homogeneously aligned or may be a so-called hybrid wherein one is homogeneously aligned and another is homeotropically aligned. For the alignment treatment, the electrode surface may be directly rubbed or a usual alignment film such as a polyimide for use in TN liquid crystals, STN liquid crystals, or the like may be used. Moreover, as a method for producing an alignment film, there may be used a so-called optical alignment method wherein light having anisotropy such as direct polarized light is applied to the organic thin film on the substrate. Incidentally, at the production of the liquid crystal element, when the alignment of the uncured liquid crystal composition can be controlled toward the substrate surface, the alignment treatment of the substrate is not always necessary. Namely, the liquid crystal composition of the invention can be made to have a planar structure through alignment of the liquid crystal composition before photocuring by the method of fluidizing the liquid crystal composition or applying shear stress thereto.

The opposing substrates may appropriately have an adhesive layer containing a resin body that adheres and supports the substrate on a periphery part. Here, by encapsulating the edge of the liquid crystal element or an injection port of the liquid crystal composition in the invention with a tape such as a pressure-sensitive adhesive tape, a thermocompression bonding tape, or a thermosetting tape or/and a curable resin or thermoplastic resin such as a thermosetting resin, a photocurable resin, a moisture-curable resin, a room temperature curable resin, an anaerobic adhesive, an epoxy-based adhesive, a silicone-based adhesive, a fluororesin-based adhesive, a polyester-based adhesive, or a vinyl chloride-based adhesive, exudation of the inner liquid crystal and the like can be prevented. Moreover, the encapsulation may simultaneously act as a role of preventing deterioration of the liquid crystal element. As a protection method of the edge on that occasion, the edge may be wholly covered or a curable resin or a thermosetting resin may be poured from the edge into the inside of the liquid crystal element and solidified or the surface may be further covered with a tape.

Between the substrates to be arranged so as to face each other, a spacer such as spherical or tubular glass, plastic, or ceramic, or a plastic film may be present. The spacer may be present in the liquid crystal light adjusting layer between the substrates by incorporating it as a component of the liquid crystal composition of the invention, may be sprayed on the substrate at the assembly of the liquid crystal element, or may be present in the adhesive layer with mixing the adhesive.

The liquid crystal light adjusting layer of the liquid crystal element of the invention is formed, for example, by forming an adhesive layer with a photo-curable adhesive or the like at the peripheral part of a pair of the substrate with electrodes which are arranged so as to face each other through the spacer to make an encapsulated cell and injecting the liquid crystal composition of the invention into one or more notches of the adhesive layer provided previously by dipping in the composition under normal pressure or under vacuum, or by applying the liquid crystal composition on one substrate using a coater and, after sandwiching the composition by a known method such as overlaying another substrate thereon, polymerizing and curing of the composition with a radiation ray such as an ultraviolet ray, visible light, or electron beam. In the case of a plastic film substrate, a continuously fed substrate with electrodes is sandwiched with two rubber rolls, a mixture of a liquid crystal containing a spacer dispersed therein and an uncured curable composition is fed and sandwiched between them, and thereafter, photocuring can be continuously performed, so that productivity is high. In either method, in the case where the substrate is not subjected to the alignment treatment, it is necessary to align the liquid crystal composition to form a planar structure, for example, by a method of fluidizing the liquid crystal composition before the photocuring of the uncured liquid crystal composition or applying shear stress. Specifically, by injecting the liquid crystal composition of the invention into the encapsulated cell not subjected to the alignment treatment, the liquid crystal composition can be allowed to form a planar structure.

As the curing method, among photocuring, curing with an ultraviolet ray is particularly preferable. Moreover, as a light source for photopolymerization, any one having a spectrum at the absorption wavelength of the radical photopolymerization initiator used may be employed. Typically, any light sources capable of radiating light having a wavelength of 220 nm or longer and 450 nm or shorter may be used. Examples thereof include a high-pressure mercury lamp, an ultrahigh-pressure mercury lamp, a halogen lamp, a metal halide lamp, UV-LED, blue LED, white LED, and the like. In addition, a heat ray-cutting filter, an ultraviolet-cutting filter, a visible light-cutting filter, and the like may be used in combination. Light may be applied to at least one surface from the upper side of the transparent substrate of the liquid crystal element and, in the case where the substrates sandwiching the liquid crystal composition are both transparent, the both surfaces may be irradiated with light. The light irradiation may be performed at once or may be performed dividedly at several times. So-called PSCOF (Phase Separated Composite Organic Film) (V. Vorflusev and S. Kumar, Science 283, 1903 (1999)), in which irradiance of light is distributed in a thickness direction of the liquid crystal element to change the density of the polymer resin layer continuously, may be formed.

In the case of photocuring, the irradiance of the light applied to the liquid crystal element is usually 0.01 mW/cm$^2$ or more, preferably 1 mW/cm$^2$ or more, further preferably 10 mW/cm$^2$ or more, and particularly preferably 30 mW/cm$^2$ or more. When the irradiance is too small, polymerization tends to proceed insufficiently. Moreover, for the photocuring of the liquid crystal composition, it is sufficient to apply an integral irradiation intensity of usually 2 J/cm$^2$ or more, preferably 3 J/cm$^2$ or more. The light irradiation time may be determined depending on the radiant intensity of the light source but, from the viewpoint of enhancing productivity, it is appropriate to complete the light irradiation usually within 200 seconds, preferably within 60 seconds. On the other hand, the light irradiation is preferably performed for 10 seconds or more. When the light irradiation time is too short, there is a case where the repetition durability of the liquid crystal element is poor. In the case where a large-area sheet-shaped liquid crystal element is produced using a plastic film substrate, a method of continuous light irradiation with moving the light source or the sheet can be employed and it is appropriate to control the moving speed depending on the radiant intensity of the light source.

In the liquid crystal light adjusting layer obtained as above, the chiral nematic liquid crystal is dispersed in a particulate form or forms a continuous layer in a thin-film transparent polymer, but the best contrast is shown in the case where the continuous layer is formed.

<Driving of Liquid Crystal Element>

The liquid crystal element of the invention can be switched from a transparent state to a scattered state (opaque state) by applying voltage or returning to a voltage non-applied state from a voltage-applied state. The liquid crystal element of the invention becomes a transparent state or a selectively reflective state toward visible light at the time when voltage is not applied and becomes a scattered state at the time when voltage is applied. Since the element is a liquid crystal element capable of being used in a so-called reverse mode, there is a region of direct-current voltage and/or alternative-current voltage in which the visible light transmittance at the time when voltage is applied is lower than the visible light transmittance at the time when voltage is not applied.

For switching the liquid crystal element of the invention from the transparent state to the scattered state, it is sufficient to apply a voltage capable of phase transfer of the chiral nematic liquid crystal phase from a planar state to a focal conic state, between the electrodes. Applied wave pattern is, for example, direct current, alternative current, pulse, or a synthetic wave thereof without particular limitation. In the case of direct-current voltage, 0.5 msec or more is preferable.

In the case of alternative-current voltage, any of a sine wave, a square wave, a triangular wave, and a synthetic wave thereof may be applicable and switching can be achieved by applying it preferably at a frequency of 100 kHz or less for 0.5 msec or more. In the case of a pulse wave, switching can be achieved by applying it, preferably at a pulse width of 0.5 msec or more.

Incidentally, the driving voltage of the liquid crystal element is usually 60V or less and preferably 30V or less in the case of direct-current voltage, usually 120 Vp-p or less and preferably 90 Vp-p or less in the case of alternative-current voltage, and is 60 V or less as a maximum value and preferably 30V or less as a maximum value in the case of pulse voltage.

Moreover, the haze of the liquid crystal element of the invention is preferably 15% or less at the time when direct-current voltage and/or alternative-current voltage is not applied (when power source is OFF) and is preferably 70% or more at the time when direct-current voltage and/or alternative-current voltage is applied (when power source is ON). Especially, it is preferable that the haze is 10% or less when the power source is OFF and is 90% or more when the power source is ON. Under a fluorescent light in a room, when the haze exceeds 15%, cloudiness is conspicuous and when the haze is less than 70%, a silhouette beyond the liquid crystal element tends to be seen.

Furthermore, the parallel ray transmittance of the liquid crystal element of the invention is preferably 85% or more when the power source is OFF and is preferably 10% or less when the power source is ON. Under a fluorescent light in a room, when the haze is less than 85%, the element is dim and when the haze exceeds 15%, an object at the front tends to be seen.

Incidentally, in the invention, the measurement of the haze of the liquid crystal element and the measurement of the parallel ray transmittance are measured according to JIS K 7105 (1981).

<Response Time of Liquid Crystal Element>

When the visible light (380 to 800 nm) transmittance of the liquid crystal element at no application of at least one of direct-current voltage and alternative-current voltage is normalized to be 100% and the visible light transmittance when it is decreased and becomes minimum by the application of at least one of direct-current voltage or alternative-current voltage is normalized to be 0%, the response time described in the present Description is defined as a time required for decreasing the visible light transmittance to 10% from the time when at least one of direct-current voltage or alternative-current voltage (a test wave pattern, a square wave at 100 Hz in the present Examples) is applied (rising response time) and as a time required for increasing the visible light transmittance to 90% from the time when the application of at least one of direct-current voltage or alternative-current voltage (a test wave pattern) is stopped (falling response time). With regard to the measuring method of the response time, it is measured by the method described in Examples.

The response time of the liquid crystal element of the invention is preferably 8 msec or less, further preferably 5 msec or less, and particularly preferably 3 msec or less in each of the rising response time and the falling response time at a temperature of $-10°$ C. or higher. Moreover, for use as a liquid crystal element, the rising response time and the falling response time are preferably the same.

An upper limit of the acting temperature of the liquid crystal element of the invention is Tni of the chiral nematic liquid crystal phase but, since the response time tends to increase at low temperature, an acting temperature range is preferably $-10°$ C. or higher and further preferably $0°$ C. or higher. Also, it is preferably $60°$ C. or lower and further preferably $40°$ C. or lower.

EXAMPLES

The following will explain the invention further in detail with reference to Examples but the invention is not limited to the following Examples unless it exceeds the gist thereof.

<Haze and Parallel Ray Transmittance of Liquid Crystal Element>

The haze, parallel ray transmittance, and response time of the liquid crystal element of the invention were measured at room temperature, 25° C. Moreover, for driving the liquid crystal, a square wave at 100 Hz was applied and measurement was performed using a measuring voltage of 60 Vp-p in Examples 1 to 3, 80 Vp-p in Examples 4 to 8, 10 to 15, and 18, 90 Vp-p in Examples 16, 17, and 19, and 100 Vp-p in Example 9.

The haze and parallel ray transmittance were measured by a double beam method using a haze computer Hz-2 (manufactured by SUGA) and a C light Source.

<Measuring Method of Response Time of Liquid Crystal Element>

The response time of the liquid crystal element of the invention was measured at room temperature, 25° C. Moreover, for driving the liquid crystal, a square wave at 100 Hz was applied and measurement was performed using a measuring voltage of 60 Vp-p in Examples 1 to 3, 80 Vp-p in Examples 4 to 8 and 10 to 15, 90 Vp-p in Examples 16 and 17, and 100 Vp-p in Example 9.

A halogen lamp was used as a light source and a photodiode was used as a detector. While light was allowed to enter vertically into the liquid crystal element, the rising response time and the falling response time were measured when the test wave pattern (square wave at 100 Hz) was applied.

<Measuring Method of Liquid Crystal-Isotropic Phase Transition Temperature (Tni) of Chiral Nematic Liquid Crystal and Liquid Crystal Composition>

A chiral nematic liquid crystal (liquid crystal alone or a mixture of it and a chiral agent) or a liquid crystal composition was once mutually dissolved and phase transfer or phase separation owing to temperature elevation was observed on a polarizing microscope, thereby obtaining the phase transition temperature.

<Measuring Method of Dielectric constant Anisotropy ($\Delta\in$) of Liquid Crystal>

The dielectric constant anisotropy ($\Delta\in$) of a liquid crystal was determined according to the equation: $\Delta\in=\in 1-\in 2$. $\in 1$ is a dielectric constant of the liquid crystal molecule in a long axis direction and $\in 2$ is a dielectric constant of the liquid crystal molecule in a single axis direction.

The dielectric constant $\in$ ($\in 1$ and $\in 2$) was determined according to the equation: $\in=Cd/S$ (C represents electrostatic capacity of the liquid crystal; d represents thickness of the liquid crystal layer; and S represents area of the overlapping part of electrodes of two electrode substrates).

<Measuring Method of Pitch Length (p) of Chiral Nematic Liquid Crystal and Liquid Crystal Composition>

A chiral nematic liquid crystal or a liquid crystal composition was injected into a vacant cell having a gap of 10 μm and composed of transparent glass substrates with electrode layers, which had been subjected to a homogeneous alignment treatment, and the length was determined according to the equation: $p=\lambda/n$ (wherein n is a refractive index of the chiral nematic liquid crystal or the liquid crystal composition) from selectively reflective wavelength λ measured on a spectrophotometer.

Example 1

Into 88.0% by mass of a cyano-based nematic liquid crystal (PDLC-001, manufactured by Hebei Luquan New Type Electronic Materials Co., Ltd.) having Tni of 118° C. and ΔЄ of 8.8 was mixed 12.0% by mass of a chiral agent represented by the following structural formula (I) (CB-15, manufactured by Merck Japan), thereby preparing a chiral nematic liquid crystal (a). This (a) has a pitch length p of 1.2±0.1 μm.

Into 95.0% by mass of the chiral nematic liquid crystal (a) were mixed 4.9% by mass of a monomer represented by the following structural formula (II) (Ac-N, manufactured by Kawasaki Kasei Chemicals Ltd.) and 0.1% by mass of a polymerization initiator represented by the following structural formula (III) (Lucirin TPO, manufactured by BASF JAPAN), and stirring and filtration were performed to prepare a liquid crystal composition (A) having Tni of 94° C.

The liquid crystal composition (A) was injected into a vacant cell composed of transparent glass substrates with electrodes (distance (d) between substrates with electrodes=10 μm). The cell was kept at 20° C., an ultraviolet ray (wavelength of 365 nm) of 80 mW/cm² was applied to one side with a high-pressure mercury lamp for 30 seconds to cure the monomer, thereby forming a liquid crystal element (A-1).

[Chem 88]

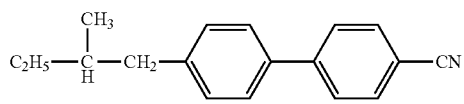
(I)

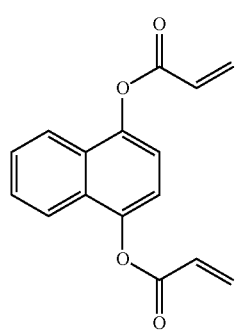
(II)

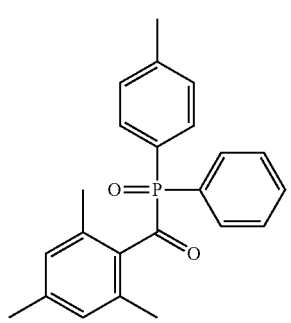
(III)

The prepared (A-1) had a transparent appearance and exhibited a reverse mode driving, where it was changed into an opaque appearance when voltage was applied. The characteristic properties of (A-1) are shown in Table 1.

Example 2

A chiral nematic liquid crystal (b) was prepared in the same manner as in Example 1 except that a cyano-based nematic liquid crystal (PDLC-005, manufactured by Hebei Luquan New Type Electronic Materials Co., Ltd.) having Tni of 98° C. and ΔЄ of 11.8 was used. This (b) had p of 1.2±0.1 μm.

A liquid crystal composition (B) having Tni of 94° C. was prepared in the same manner except that the chiral nematic liquid crystal (a) in Example 1 was changed into the chiral nematic liquid crystal (b). Using the (B), a liquid crystal element (B-1) was prepared in the same manner as in Example 1.

The prepared (B-1) had a transparent appearance and exhibited a reverse mode driving, where it was changed into an opaque appearance when voltage was applied. The characteristic properties of (B-1) are shown in Table 1.

Example 3

A liquid crystal composition (c) having Tni of 86° C. was prepared in the same manner as in Example 1 except that the monomer represented by the structural formula (II) was changed into a monomer represented by the following structural formula (IV) (Mc-N, manufactured by Kawasaki Kasei Chemicals Ltd.).

A liquid crystal element (C-1) was prepared in the same manner except that the chiral nematic liquid crystal (a) in Example 1 was changed into the chiral nematic liquid crystal (c).

The prepared (C-1) had a transparent appearance and exhibited a reverse mode driving, where it was changed into an opaque appearance when voltage was applied. The characteristic properties of (C-1) are shown in Table 1.

[Chem 89]

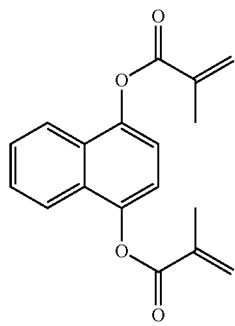
(IV)

TABLE 1

|  | Example 1 | Example 2 | Example 3 |
|---|---|---|---|
| Element | A-1 | B-1 | C-1 |
| Monomer | Structural formula (II) | Structural formula (II) | Structural formula (IV) |
| Ratio (B/A) of % by mass of polymerization initiator (B) to % by mass of monomer (A) | 0.02 | 0.02 | 0.02 |
| Chiral pitch length p of chiral nematic phase (μm) | 1.1 ± 0.1 | 1.2 ± 0.1 | 1.2 ± 0.1 |
| Distance d between substrates with electrode (μm) | 10 | 10 | 10 |
| d/p | 9.1 | 8.3 | 8.3 |
| Evaluation voltage (Vp-p) | 60 | 60 | 60 |
| When voltage is not applied — Haze (%) | 9.9 | 7.7 | 7.3 |
| When voltage is not applied — Parallel ray transmittance (%) | 90.1 | 92.3 | 86.1 |
| When voltage is applied — Haze (%) | 88.0 | 92.4 | 91.2 |
| When voltage is applied — Parallel ray transmittance (%) | 12.0 | 7.6 | 8.0 |
| Ultraviolet irradiation time (s) | 30 | 30 | 30 |
| Ultraviolet irradiation method | One side of cell | One side of cell | One side of cell |

Example 4

Into 88.0% by mass of a cyano-based nematic liquid crystal (E8, manufactured by Merck) having Tni of 70° C. and $\Delta\in$ of 15.6 was mixed 12.0% by mass of a chiral agent (CB-15, manufactured by Merck Japan), thereby preparing a chiral nematic liquid crystal (d). This (d) has p of 1.1±0.1 μm.

Into 95.0% by mass of the chiral nematic liquid crystal (d) were mixed 4.8% by mass of a monomer represented by the structural formula (II) (Ac-N, manufactured by Kawasaki Kasei Chemicals Ltd.) and 0.2% by mass of a polymerization initiator represented by the structural formula (III) (Lucirin TPO, manufactured by BASF JAPAN), and stirring and filtration were performed to prepare a liquid crystal composition (D) having Tni of 65° C.

The (D) was injected into a vacant cell having a gap of 10 μm and composed of transparent glass substrates with electrodes, which had been subjected to a homogeneous alignment treatment. The cell was kept at 20° C., an ultraviolet ray (wavelength of 365 nm) of 80 mW/cm² was applied to one side with a high-pressure mercury lamp for 30 seconds to cure the monomer, thereby forming a liquid crystal element (D-1).

The prepared (D-1) had a transparent appearance and exhibited a reverse mode driving, where it was changed into an opaque appearance when voltage was applied. The characteristic properties of (D-1) are shown in Table 2.

Example 5

A liquid crystal element (D-2) was prepared in the same manner as in Example 4 except that the ultraviolet irradiation time was changed into 60 seconds.

The prepared (D-2) had a transparent appearance and exhibited a reverse mode driving, where it was changed into an opaque appearance when voltage was applied. The characteristic properties of (D-2) are shown in Table 2.

Example 6

A chiral nematic liquid crystal (e) was prepared in the same manner as in Example 1 except that a cyano-based nematic liquid crystal (E43, manufactured by Merck) having Tni of 81° C. was used. This (e) had p of 1.2±0.1 μm.

A liquid crystal composition (E) having Tni of 73° C. was prepared in the same manner except that the chiral nematic liquid crystal (d) in Example 4 was changed into the chiral nematic liquid crystal (e). Using the (E), a liquid crystal element (E-1) was prepared in the same manner as in Example 4.

The prepared (E-1) had a transparent appearance and exhibited a reverse mode driving, where it was changed into an opaque appearance when voltage was applied. The characteristic properties of (E-1) are shown in Table 2.

Example 7

A chiral nematic liquid crystal (f) was prepared in the same manner as in Example 1 except that a cyano-based nematic liquid crystal (E44, manufactured by Merck) having Tni of 98° C. and $\Delta\in$ of 16.8 was used. This (f) had p of 1.2±0.1 μm.

A liquid crystal composition (F) having Tni of 88° C. was prepared in the same manner except that the chiral nematic liquid crystal (d) in Example 4 was changed into the chiral nematic liquid crystal (f). Using the (F), a liquid crystal element (F-1) was prepared in the same manner as in Example 4.

The prepared (F-1) had a transparent appearance and exhibited a reverse mode driving, where it was changed into an opaque appearance when voltage was applied. The characteristic properties of (F-1) are shown in the following Table 2.

Example 8

A chiral nematic liquid crystal (g) was prepared in the same manner as in Example 1 except that a nematic liquid crystal (TP-6533-300, manufactured by Hebei Luquan New Type Electronic Materials Co., Ltd.) having Tni of 104° C. and $\Delta\in$ of 0.7 was used. This (g) had p of (1.2±0.1) μm.

A liquid crystal composition (G) having Tni of 95° C. was prepared in the same manner except that the chiral nematic liquid crystal (d) in Example 4 was changed into the chiral nematic liquid crystal (g). Using the (G), a liquid crystal element (G-1) was prepared in the same manner as in Example 4.

The prepared (G-1) had a transparent appearance and exhibited a reverse mode driving, where it was changed into an opaque appearance when voltage was applied. The characteristic properties of (G-1) are shown in the following Table 2.

Example 9

Into 96.0% by mass of a cyano-based nematic liquid crystal (PDLC-005, manufactured by Hebei Luquan New Type Electronic Materials Co., Ltd.) having Tni of 98° C. and $\Delta\in$ of 11.8 was mixed 4.0% by mass of a chiral agent represented by the following structural formula (V) (R-1011, manufactured by Merck Japan), thereby preparing a chiral nematic liquid crystal (h). This (h) has a pitch length p of 1.1±0.1 µm.

A liquid crystal composition (H) having Tni of 98° C. was prepared in the same manner as in Example 4 except that the chiral nematic liquid crystal (d) in Example 4 was changed into the chiral nematic liquid crystal (g). Using the (H), a liquid crystal element (H-1) was prepared in the same manner as in Example 4.

The prepared (H-1) had a transparent appearance and exhibited a reverse mode driving, where it was changed into an opaque appearance when voltage was applied. The characteristic properties of (H-1) are shown in the following Table 2.

[Chem 90]

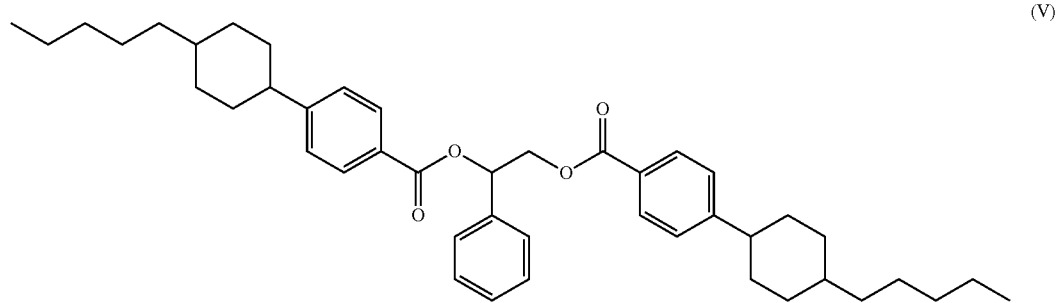

(V)

Example 10

A chiral nematic liquid crystal (i) was prepared in the same manner as in Example 9 except that a cyano-based nematic liquid crystal (MLC-2142, manufactured by Merck) having Tni of 96° C. and $\Delta\in$ of 10.8 was used. This (i) had p of 0.9±0.1 µm.

A liquid crystal composition (I) having Tni of 69° C. was prepared in the same manner except that the chiral nematic liquid crystal (d) was changed into the chiral nematic liquid crystal (i), in Example 4. Using the (I), a liquid crystal element (I-1) was prepared in the same manner as in Example 4.

The prepared (I-1) had a transparent appearance and exhibited a reverse mode driving, where it was changed into an opaque appearance when voltage was applied. The characteristic properties of (I-1) are shown in the following Table 2.

Example 11

A chiral nematic liquid crystal (j) was prepared in the same manner as in Example 4 except that a cyano-based nematic liquid crystal (PDLC-005, manufactured by Hebei Luquan New Type Electronic Materials Co., Ltd.) having Tni of 98° C. and $\Delta\in$ of 11.8 was used. This (j) had p of 1.2±0.1 µm.

A liquid crystal composition (J) having Tni of 84° C. was prepared in the same manner as in Example 4 except that the chiral nematic liquid crystal (d) in Example 4 was changed into the chiral nematic liquid crystal (j). Using the (J), a liquid crystal element (G-1) was prepared in the same manner as in Example 4.

The prepared (J-1) had a transparent appearance and exhibited a reverse mode driving, where it was changed into an opaque appearance when voltage was applied. The characteristic properties of (J-1) are shown in the following Table 2.

Example 12

A liquid crystal element (J-2) was prepared in the same manner as in Example 11 except that the ultraviolet irradiation time was changed into 10 seconds.

The prepared (J-2) had a transparent appearance and exhibited a reverse mode driving, where it was changed into an opaque appearance when voltage was applied. The characteristic properties of (J-2) are shown in the following Table 2.

Example 13

A liquid crystal element (J-3) was formed in the same manner as in Example 11 except that an ultraviolet ray (wavelength of 365 nm) of 80 mW/cm$^2$ was applied to one side for 30 seconds and was further applied to another side for 30 seconds with a high-pressure mercury lamp to cure the monomer.

The prepared (J-3) had a transparent appearance and exhibited a reverse mode driving, where it was changed into an opaque appearance when voltage was applied. The characteristic properties of (J-3) are shown in the following Table 2.

Example 14

A liquid crystal composition (K) having Tni of 86° C. was prepared in the same manner as in Example 11 except that the monomer represented by the structural formula (II) was changed into the monomer represented by the structural formula (IV). Using the (K), a liquid crystal element (K-1) was prepared in the same manner as in Example 11.

The prepared (K-1) had a transparent appearance and exhibited a reverse mode driving, where it was changed into an opaque appearance when voltage was applied. The characteristic properties of (K-1) are shown in the following Table 3.

Example 15

A liquid crystal composition (L) having Tni of 85° C. was prepared in the same manner as in Example 11 except that 4.8% by mass of the monomer represented by the structural formula (II) was changed into a mixture of 2.2% by mass of the monomer represented by the structural formula (II) and 2.6% by mass of a monomer represented by the structural formula (VI). Using the (L), a liquid crystal element (L-1) was prepared in the same manner as in Example 11.

The prepared (L-1) had a transparent appearance and exhibited a reverse mode driving, where it was changed into an opaque appearance when voltage was applied. The characteristic properties of (L-1) are shown in the following Table 3.

[Chem 91]

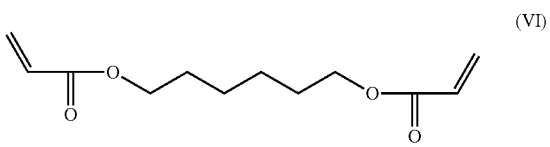

(VI)

Example 16

A liquid crystal composition (M) having Tni of 86° C. was prepared in the same manner as in Example 11 except that 4.8% by mass of the monomer represented by the structural formula (II) was changed into a mixture of 2.4% by mass of the monomer represented by the structural formula (II) and 2.4% by mass of the monomer represented by the structural formula (IV).

The (M) was injected into a vacant cell having a gap of 10 μm and composed of transparent glass substrates with electrodes, which had been subjected to a homogeneous alignment treatment. The cell was kept at 20° C., an ultraviolet ray (wavelength of 365 nm) of 80 mW/cm² was applied to one side with a high-pressure mercury lamp for 60 seconds to cure the monomer, thereby forming a liquid crystal element (M-1).

The prepared (M-1) had a transparent appearance and exhibited a reverse mode driving, where it was changed into an opaque appearance when voltage was applied. The characteristic properties of (M-1) are shown in the following Table 3.

Example 17

A liquid crystal element (M-2) was prepared in the same manner as in Example 16 except that the monomer was cured by applying an ultraviolet ray (wavelength of 365 nm) of 80 mW/cm² with a high-pressure mercury lamp for 60 seconds in such a set state that the ray was applied to both sides using a mirror.

The prepared (M-2) had a transparent appearance and exhibited a reverse mode driving, where it was changed into an opaque appearance when voltage was applied. The characteristic properties of (M-2) are shown in the following Table 3.

Example 18

Into 94.0% by mass of the chiral nematic liquid crystal (j) of Example 11 were mixed 5.0% by mass of the monomer represented by the structural formula (II) and 1.0% by mass of the polymerization initiator represented by the structural formula (III), and stirring and filtration were performed to prepare a liquid crystal composition (N) having Tni of 83° C. The (N) was injected into a vacant cell having a gap of 10 μm and composed of transparent glass substrates with electrodes, which had been subjected to a homogeneous alignment treatment. The cell was kept at 20° C., an ultraviolet ray (wavelength of 365 nm) of 80 mW/cm² was applied to one side with a high-pressure mercury lamp for 30 seconds to cure the monomer, thereby forming a liquid crystal element (N-1).

The prepared (N-1) had a transparent appearance and exhibited a reverse mode driving, where it was changed into an opaque appearance when voltage was applied. The characteristic properties of (N-1) are shown in the following Table 3.

Example 19

A liquid crystal element (N-2) was formed in the same manner as in Example 18 except that an ultraviolet ray (wavelength of 365 nm) of 80 mW/cm² was applied to one side for 30 seconds and was further applied to another side for 30 seconds with a high-pressure mercury lamp to cure the monomer.

The prepared (N-2) had a transparent appearance and exhibited a reverse mode driving, where it was changed into an opaque appearance when voltage was applied. The characteristic properties of (N-2) are shown in the following Table 3.

Example 20

When the liquid crystal element (J-1) of Example 11 was peeled off and the liquid crystal light adjusting layer exposed on the substrate was washed with isopropanol and air dried at room temperature, the chiral nematic liquid crystal phase on the substrate was removed and a white polymer resin phase alone remained.

Figure 2:
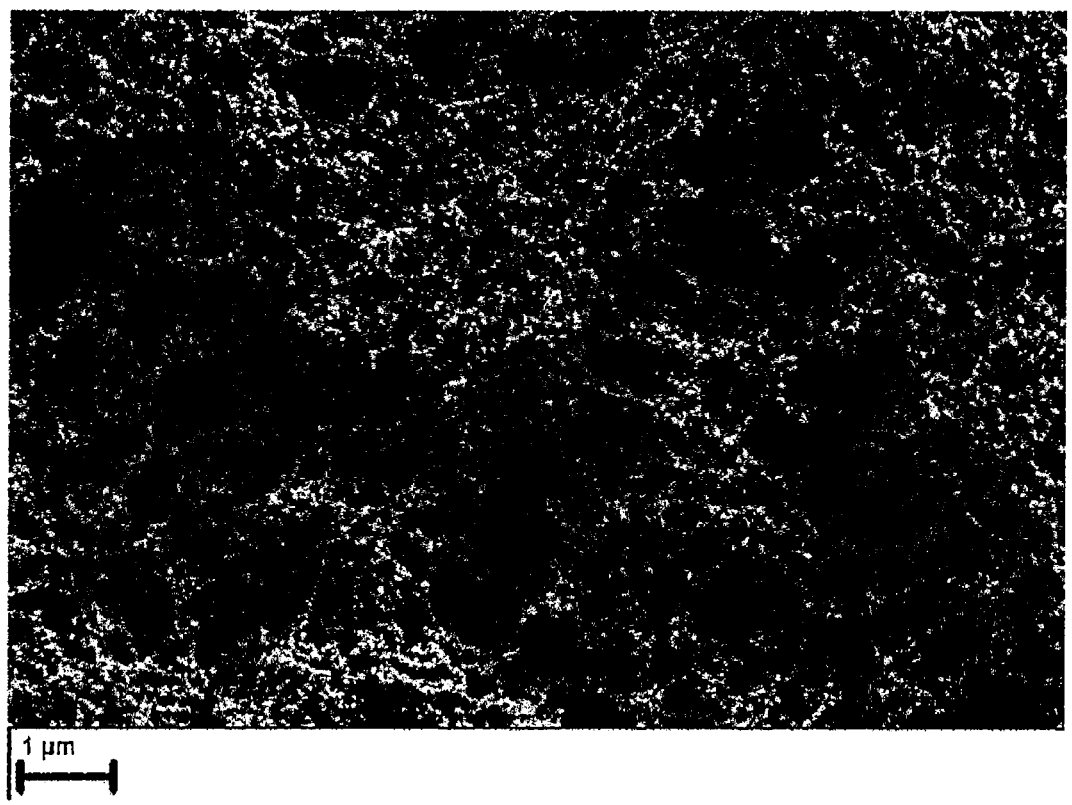
FIG. 2 is a SEM picture of the polymer resin phase of a liquid crystal element (Example 20).

When the substrate was observed on SEM, photographs shown in FIGS. 1 and 2 were obtained, in which the polymer resin phase formed a reticulate network and it was confirmed that the liquid crystal light adjusting layer was a polymer stabilized liquid crystal.

Example 21

The polymer resin phase in Example 20 was collected and compositional analysis was performed by derivatization pyrolytic gas chromatography-mass spectrometry in the presence of an organic alkali derivatizing agent. Measuring conditions are as follows.

(Measuring Conditions)

Gas chromatography apparatus/mass spectrometry apparatus: GC-2010/QP-2010 Plus (manufactured by Shimadzu Corporation)

Pyrolysis apparatus: PY-2010D (manufactured by FRONTIER LAB)

Reaction reagent: a 25% by mass methanol solution of tetramethylammonium hydroxide Reaction pyrolysis temperature: 300° C.

GC column: DB-5 (manufactured by Waters)

Figure 3:
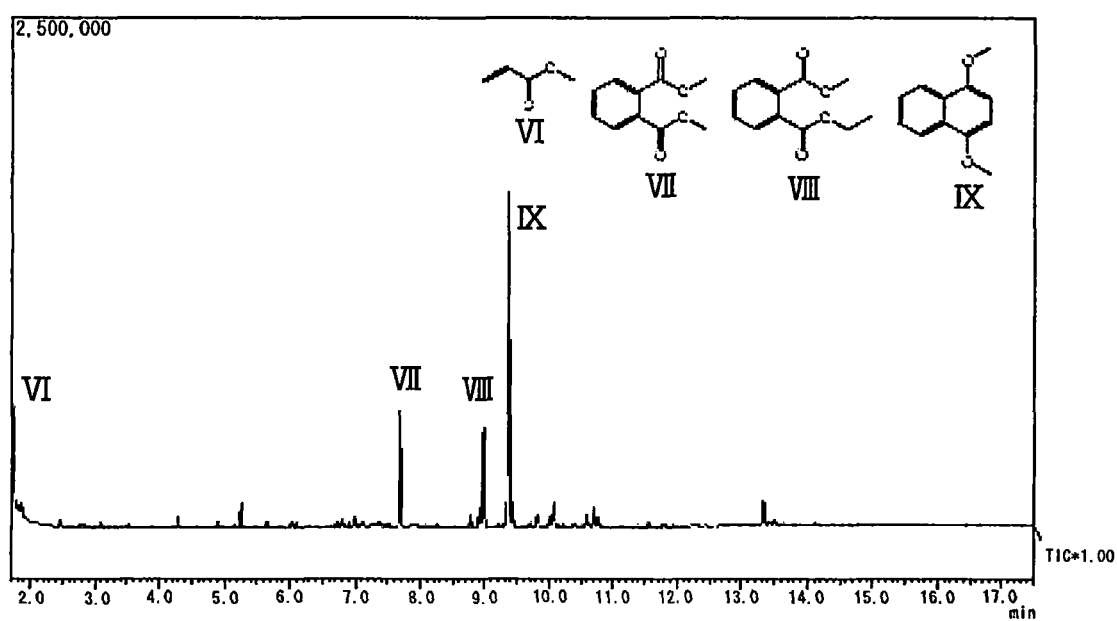
FIG. 3 is a total ion chromatogram obtained by derivatization pyrolytic gas chromatography-mass spectrometry of the polymer resin phase of a liquid crystal element in the presence of an organic alkali derivatizing agent (Example 21).

FIG. 3 shows the resulting total ion chromatogram. Compounds detected are compounds VI to IX shown in the following formulae (VI) to (IX) and FIG. 3. From the compounds VI and IX, it becomes apparent that the polymer resin phase of the liquid crystal element (J-1) has a structure containing a repeating unit of the following (X).

[Chem 92]

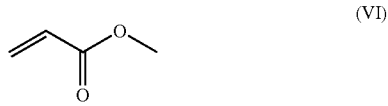

(VI)

(VII)

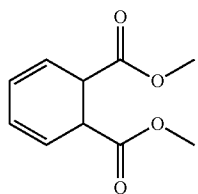

(VIII)

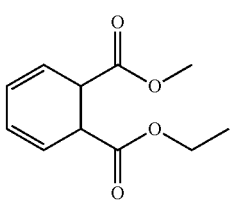

(IX)

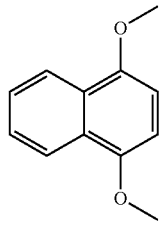

(X)

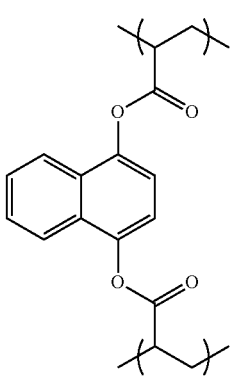

Example 22

By derivatization pyrolytic gas chromatography in the presence of an organic alkali derivatizing agent, quantitative determination of the compound IX shown in FIG. 3 was performed from the polymer resin phase obtained in Example 20 using an internal standard method. As a result, 0.59 mg of the compound IX was detected from 1.00 mg of the polymer resin phase (100% of theoretical yield). The measuring conditions are as follows.

(Measuring Conditions)

Gas chromatography apparatus: GC-17A (manufactured by Shimadzu Corporation)

Pyrolysis apparatus: PY-2010D (manufactured by FRONTIER LAB)

Reaction reagent: a 25% by mass methanol solution of tetramethylammonium hydroxide Reaction pyrolysis temperature: 300° C.

GC column: Agilent (manufactured by Waters)

Internal standard reagent: methyl benzoate

Example 23

The isopropanol-washed liquid in Example 20 was concentrated and quantitative determination of the monomer represented by the structural formula (II) was performed by derivatization pyrolytic gas chromatography in the presence of an organic alkali derivatizing agent. For quantitative determination, a peak area in the mass chromatogram at m/z=291.1 was used. As a result, 370 μg of the monomer represented by the structural formula (II) remained in 1 g of the chiral nematic liquid crystal phase of the above liquid crystal element (J-2). The measuring conditions are as follows.

(Measuring Conditions)

LC apparatus: ACQUITY (manufactured by Waters)

LC column: BEH C18 (manufactured by Waters)

Eluent: a gradient of water/methanol until 100% water

Ionization method: ESI (+)

Example 24

The concentration of the monomer represented by the structural formula (II) remaining in the chiral nematic liquid crystal phase was determined in the same manner as in Example 21 except that the liquid crystal element was changed into (J-3). As a result, 187 μg of the monomer represented by the structural formula (II) remained in 1 g of the chiral nematic liquid crystal phase of (J-3).

Example 25

The concentration of the monomer represented by the structural formula (II) remaining in the chiral nematic liquid crystal phase was determined in the same manner as in Example 23 except that the liquid crystal element was changed into (N-1). As a result, 15 μg of the monomer represented by the structural formula (II) remained in 1 g of the chiral nematic liquid crystal phase of (N-1).

Example 26

The concentration of the monomer represented by the structural formula (II) remaining in the chiral nematic liquid crystal phase was determined in the same manner as in Example 23 except that the liquid crystal element was changed into (N-2). As a result, 5 μg of the monomer represented by the structural formula (II) remained in 1 g of the chiral nematic liquid crystal phase of (N-2).

TABLE 2

| | Example 4 | Example 5 | Example 6 | Example 7 | Example 8 | Example 9 | Example 10 | Example 11 | Example 12 | Example 13 |
|---|---|---|---|---|---|---|---|---|---|---|
| Element | D-1 | D-2 | E-1 | F-1 | G-1 | H-1 | I-1 | J-1 | J-2 | J-3 |
| Monomer | Structural formula (II) | Structural formula (II) | Structural formula (II) | Structural formula (II) | Structural formula (II) | Structural formula (II) | Structural formula (II) | Structural formula (II) | Structural formula (II) | Structural formula (II) |
| Ratio (B/A) of % by mass of polymerization initiator (B) to % by mass of monomer (A) | 0.04 | 0.04 | 0.04 | 0.04 | 0.2 | 0.2 | 0.04 | 0.04 | 0.04 | 0.04 |
| Chiral pitch length p of chiral nematic phase (μm) | 1.1 ± 0.1 | 1.1 ± 0.1 | 1.2 ± 0.1 | 1.2 ± 0.1 | 1.2 ± 0.1 | 1.1 ± 0.1 | 0.9 ± 0.1 | 1.2 ± 0.1 | 1.2 ± 0.1 | 1.2 ± 0.1 |
| Distance d between substrates with electrode (μm) | 10 | 10 | 10 | 10 | 10 | 10 | 10 | 10 | 10 | 10 |
| d/p | 9 | 9 | 8 | 8 | 8 | 9 | 11 | 8 | 8 | 8 |
| Evaluation voltage (Vp-p) | 80 | 80 | 90 | 90 | 80 | 100 | 80 | 80 | 80 | 80 |
| When voltage is not applied — Haze (%) | 3.6 | 3.6 | 3.0 | 3.2 | 7.9 | 7.3 | 5.7 | 4.4 | 4.9 | 3.7 |
| When voltage is not applied — Parallel ray transmittance (%) | 94.3 | 86.3 | 95.8 | 94.1 | 84.6 | 85.4 | 80.4 | 87.3 | 84.3 | 89.8 |
| When voltage is applied — Haze (%) | 83.6 | 89.3 | 88.3 | 85.9 | 92.5 | 78.3 | 94.5 | 90.3 | 88.8 | 88.9 |
| When voltage is applied — Parallel ray transmittance (%) | 16.0 | 16.2 | 11.6 | 14.5 | 8.8 | 21.1 | 4.3 | 6.5 | 10.0 | 8.7 |
| Response time (msec) — Rising | 1.4 | 1.7 | 1.7 | 2.2 | 2.6 | 3.9 | 3.1 | 1.5 | 1.5 | 1.5 |
| Response time (msec) — Falling | 1.5 | 1.4 | 1.5 | 1.9 | 2.0 | 1.4 | 2.9 | 2.8 | 3.1 | 2.1 |
| Ultraviolet irradiation time (s) | 30 | 60 | 30 | 30 | 30 | 30 | 30 | 30 | 10 | 60 (30 s each for one side of cell) |
| Ultraviolet irradiation method | One side of cell | One side of cell | One side of cell | One side of cell | One side of cell | One side of cell | One side of cell | One side of cell | One side of cell | Both sides of cell (one by one) |

TABLE 3

| | Example 14 | Example 15 | Example 16 | Example 17 | Example 18 | Example 19 |
|---|---|---|---|---|---|---|
| Element | K-1 | L-1 | M-1 | M-2 | N-1 | N-2 |
| Monomer | Structural formula (IV) | Structural formulae (II), (V) | Structural formulae (II), (IV) | Structural formulae (II), (IV) | Structural formula (II) | Structural formula (II) |
| Ratio (B/A) of % by mass of polymerization initiator (B) to % by mass of monomer (A) | 0.04 | 0.04 | 0.04 | 0.04 | 0.2 | 0.2 |
| Chiral pitch length p of chiral nematic phase (μm) | 1.1 ± 0.1 | 1.2 ± 0.1 | 1.2 ± 0.1 | 1.2 ± 0.1 | 1.2 ± 0.1 | 1.2 ± 0.1 |
| Distance d between substrates with electrodes (μm) | 10 | 10 | 10 | 10 | 10 | 10 |
| d/p | 9 | 8 | 8 | 8 | 8 | 8 |
| Evaluation voltage (Vp-p) | 80 | 80 | 90 | 90 | 80 | 90 |
| When voltage is not applied — Haze (%) | 3.2 | 6.6 | 2.8 | 3.6 | 3.9 | 3.4 |
| When voltage is not applied — Parallel ray transmittance (%) | 90.2 | 81.2 | 87.6 | 85.0 | 83.9 | 82.9 |
| When voltage is applied — Haze (%) | 87.9 | 86.6 | 88.4 | 92.7 | 75.6 | 75.6 |
| When voltage is applied — Parallel ray transmittance (%) | 10.7 | 12.9 | 5.2 | 9.6 | 20.0 | 20.4 |
| Response time (msec) — Rising | 2.3 | 3.1 | 2.2 | 1.7 | 7.1 | 1.4 |
| Response time (msec) — Falling | 2.0 | 2.4 | 2.9 | 1.7 | 6.8 | 1.3 |
| Ultraviolet irradiation time (s) | 30 | 30 | 60 | 60 | 30 | 60 (30 s each for one side of cell) |
| Ultraviolet irradiation method | One side of cell | One side of cell | One side of cell | Both sides of cell (simultaneously) | One side of cell | Both sides of cell (one by one) |

While the invention has been described in detail and with reference to specific embodiments thereof, it will be apparent to one skilled in the art that various changes and modifications can be made therein without departing from the spirit and scope thereof. The present application is based on Japanese Patent Application No. 2011-070824 filed on Mar. 28, 2011, and the contents are incorporated herein by reference.

INDUSTRIAL APPLICABILITY

The present invention relates to a liquid crystal element in which transmittance, scattering, and reflection state of the liquid crystal element are controlled by the application/non-application of electric field and which is utilizable to light modulating elements and display elements such as panels and displays, optical shutters, and the like.

The invention claimed is:

1. A liquid crystal element which comprises: a pair of substrates with electrodes, in which the substrates are arranged so as to face each other and at least one of the substrates is a transparent substrate; and a liquid crystal light adjusting layer which is disposed between the substrates and contains a composite containing a chiral nematic liquid crystal phase and a polymer resin phase, wherein the polymer resin phase contains a polymer compound having a repeating unit represented by the following general formula (1), and dielectric constant anisotropy of the chiral nematic liquid crystal phase is positive, wherein distance (d) between the substrates with electrodes is 100 μm or less and 2 μm or more and the relationship (d)/(p) between the chiral pitch length (p) of the chiral nematic liquid crystal and the distance (d) is 1 or more:

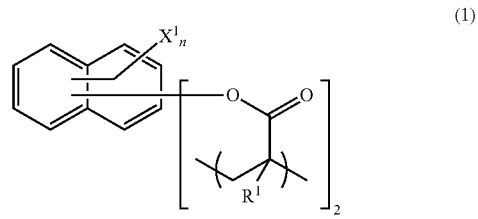

(1)

wherein $R^1$ represents a hydrogen atom or a methyl group and two $R^1$ groups present in one repeating unit represented by the general formula (1) may be the same or different, n represents an integer of 1 to 3 and, in the case where n is 2 or more, two or more $X^1$ groups present in one repeating unit represented by the general formula (1) may be the same or different, $X^1$ represents a group represented by the following general formula (2):

(2)

(2)

wherein $X^2$ represents a direct bond or one linking group selected from the following group:

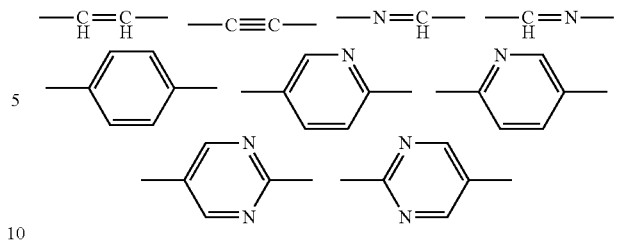

$X^3$ represents a direct bond or one linking group selected from the following group:

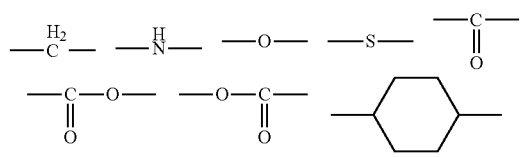

$R^2$ represents a hydrogen atom, a halogen atom, a hydroxyl group, a linear or branched alkyl group having 1 to 7 carbon atoms, a linear or branched alkoxy group having 1 to 7 carbon atoms, or a cyano group, n' represents an integer of 1 to 3 and, in the case where n' is 2 or more, two or more —$X^2$—$X^3$— groups present in one repeating unit represented by the general formula (1) may be the same or different.

2. The liquid crystal element according to claim 1, wherein a compound represented by the following general formula (3) and at least one of methyl acrylate and methyl methacrylate are detected by derivatization pyrolytic gas chromatography-mass spectrometry of the polymer resin phase in the presence of an organic alkali derivatizing agent:

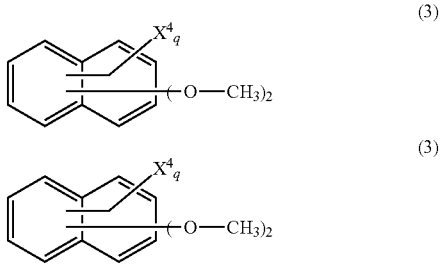

(3)

(3)

wherein q represents an integer of 1 to 3 and, in the case where q is 2 or more, two or more $X^4$ groups present in one molecule of the compound represented by the general formula (3) may be the same or different, $X^4$ represents a group represented by the following general formula (4):

(4)

(4)

wherein $X^5$ represents a direct bond or one linking group selected from the following group:

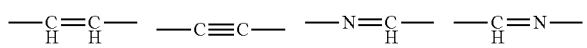

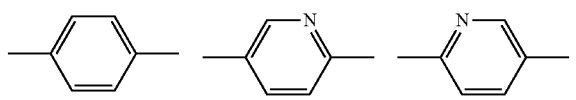

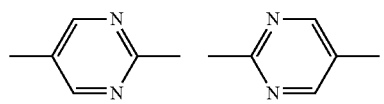

$X^6$ represents a direct bond or one linking group selected from the following group:

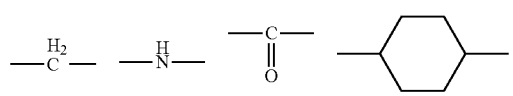

$R^3$ represents a hydrogen atom, a halogen atom, a hydroxyl group, a linear or branched alkyl group having 1 to 7 carbon atoms, a methoxy group, a methylthio group, or a cyano group, q' represents an integer of 1 to 3 and, in the case where q' is 2 or more, two or more —$X^5$—$X^6$— groups present in one molecule of the compound represented by the general formula (3) may be the same or different.

3. The liquid crystal element according to claim 2, wherein the compound represented by the above general formula (3) is detected in an amount of 0.10 mg or more and 0.85 mg or less by derivatization pyrolytic gas chromatography of 1.00 mg of the polymer resin phase in the presence of an organic alkali derivatizing agent.

4. The liquid crystal element according to claim 1, wherein the repeating unit represented by the above general formula (1) is represented by the following general formula (5):

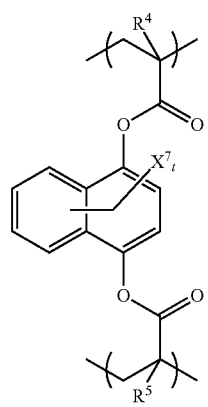
(5)

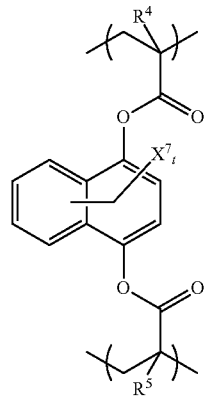
(5)

wherein $R^4$ and $R^5$ each independently represent a hydrogen atom or a methyl group, t represents an integer of 1 to 3 and, in the case where t is 2 or more, two or more $X^7$ groups present in one repeating unit represented by the general formula (5) may be the same or different, $X^7$ represents a group represented by the following general formula (6):

(6)

(6)

wherein $X^8$ represents a direct bond or one linking group selected from the following group:

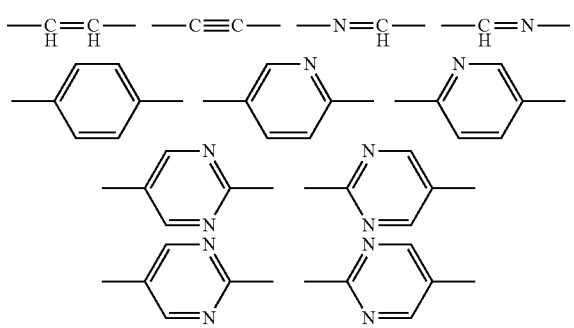

$X^9$ represents a direct bond or one linking group selected from the following group:

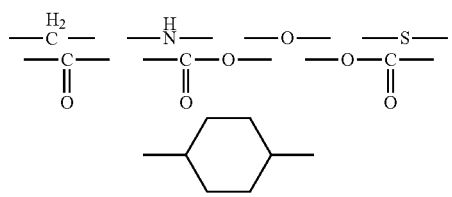

$R^6$ represents a hydrogen atom, a halogen atom, a hydroxyl group, a linear or branched alkyl group having 1 to 7 carbon atoms, a linear or branched alkoxy group having 1 to 7 carbon atoms, or a cyano group, t' represents an integer of 1 to 3 and, in the case where t' is 2 or more, two or more —$X^8$—$X^9$— groups present in one repeating unit represented by the general formula (5) may be the same or different.

5. The liquid crystal element according to claim 1, wherein the chiral nematic liquid crystal phase has a polymerizable monomer represented by the following general formula (9):

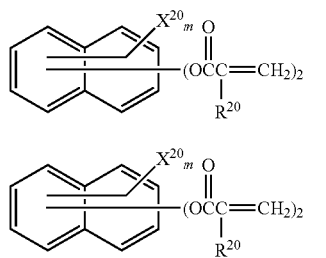

(9)

(9)

wherein $R^{20}$ represents a hydrogen atom or a methyl group and two $R^{20}$ groups present in one polymerizable monomer represented by the general formula (9) may be the same or different, m represents an integer of 1 to 3 and, in the case where m is 2 or more, two or more $X^{20}$ groups present in one molecule of the polymerizable monomer represented by the general formula (9) may be the same or different, $X^{20}$ represents a group represented by the following general formula (10):

(10)

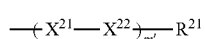

(10)

wherein $X^{21}$ represents a direct bond or one linking group selected from the following group:

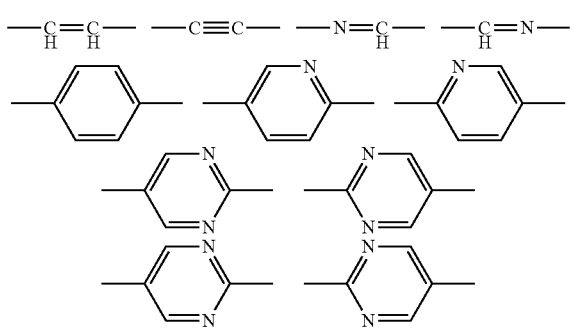

$X^{22}$ A represents a direct bond or one linking group selected from the following group:

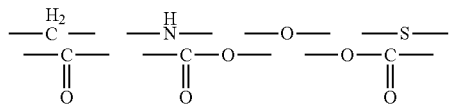

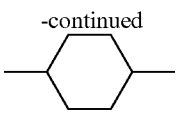

$R^{21}$ represents a hydrogen atom, a halogen atom, a hydroxyl group, a linear or branched alkyl group having 1 to 7 carbon atoms, a linear or branched alkoxy group having 1 to 7 carbon atoms, or a cyano group, m' represents an integer of 1 to 3 and, in the case where m' is 2 or more, two or more —$X^{21}$—$X^{22}$— groups present in one molecule of the polymerizable monomer represented by the general formula (9) may be the same or different.

6. The liquid crystal element according to claim 1, wherein the liquid crystal light adjusting layer is a polymer stabilized liquid crystal.

7. The liquid crystal element according to claim 1, wherein, the liquid crystal element has a region where visible light transmittance at the time when at least one of direct-current voltage or alternative-current voltage is applied, decreases as compared with the visible light transmittance at the time when the voltage is not applied.

8. The liquid crystal element according to claim 1, wherein haze at the time when at least one of direct-current voltage or alternative-current voltage is applied is 70% or more and haze at the time when voltage is not applied is 15% or less.

9. The liquid crystal element according to claim 1, wherein, in the temperature range of –10° C. or higher, when the visible light transmittance of the liquid crystal element at the time when at least one of direct-current voltage and alternative-current voltage is not applied, is normalized to be 100% and the visible light transmittance that is decreased and becomes minimum by the application of at least one of direct-current voltage and alternative-current voltage, is normalized to be 0%, a time required for decreasing the visible light transmittance to 10% from the time when at least one of direct-current voltage or alternative-current voltage is applied and a time required for increasing the visible light transmittance to 90% from the time when the application of at least one of direct-current voltage or alternative-current voltage is stopped, are each 8 msec or less.

10. A screen comprising the liquid crystal element according to claim 1.

11. A display comprising the liquid crystal element according to claim 1.

12. A liquid crystal composition comprising a chiral nematic liquid crystal having a positive dielectric constant anisotropy, a polymerizable monomer represented by the general formula (13), and a radical polymerization initiator:

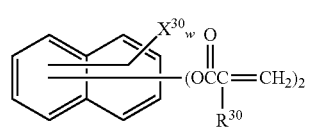

(13)

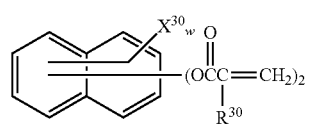

(13)

wherein w represents an integer of 1 to 3 and, in the case where w is 2 or more, two or more $X^{30}$ groups present in one molecule of the polymerizable monomer represented by the general formula (13) may be the same or different, $R^{30}$ represents a hydrogen atom or a methyl group and two $R^{30}$ groups present in one molecule of the polymerizable monomer represented by the general formula (13) may be the same or different, $X^{30}$ represents a group represented by the following general formula (14):

(14)

(14)

wherein $X^{31}$ represents a direct bond or one linking group selected from the following group:

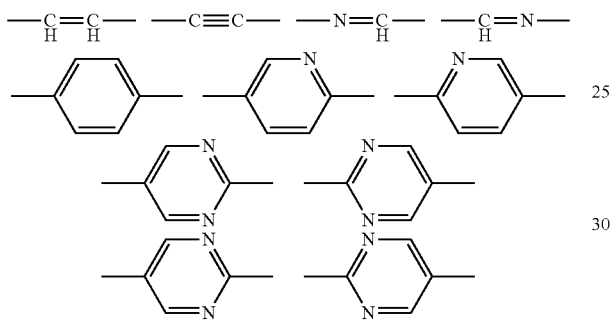

$X^{32}$ represents a direct bond or one linking group selected from the following group:

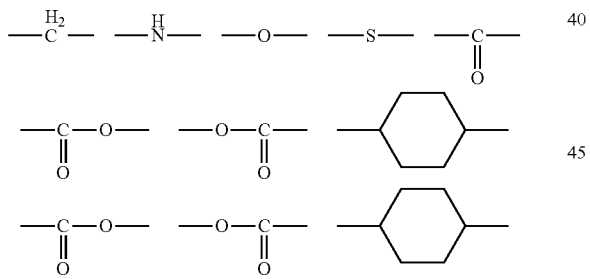

$R^{31}$ represents a hydrogen atom, a halogen atom, a hydroxyl group, a linear or branched alkyl group having 1 to 7 carbon atoms, a linear or branched alkoxy group having 1 to 7 carbon atoms, or a cyano group, w' represents an integer of 1 to 3 and, in the case where w' is 2 or more, two or more —$X^{31}$—$X^{32}$— groups present in one molecule of the polymerizable monomer represented by the general formula (13) may be the same or different, wherein a chiral pitch length p of the chiral nematic liquid crystal is 0.3 μm or more and 2 μm or less.

13. The liquid crystal composition according to claim 12, wherein the polymerizable monomer represented by the above general formula (13) is represented by the following general formula (15):

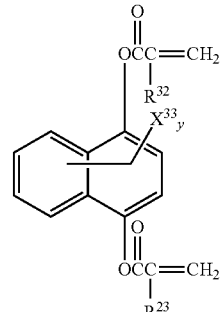
(15)

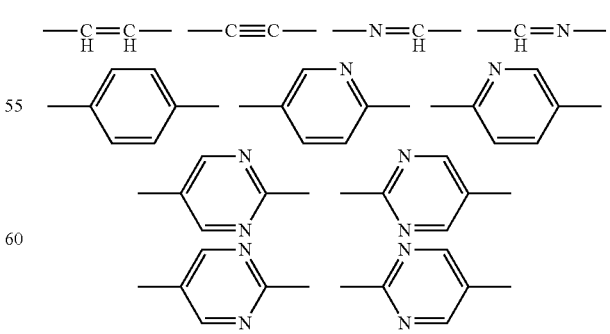
(15)

wherein $R^{32}$ and $R^{33}$ each independently represent a hydrogen atom or a methyl group, y represents an integer of 1 to 3 and, in the case where y is 2 or more, two or more $X^{33}$ groups present in one molecule of the polymerizable monomer represented by the general formula (15) may be the same or different, $X^{33}$ represents a group represented by the following general formula (16):

(16)

(16)

wherein $X^{34}$ represents a direct bond or one linking group selected from the following group:

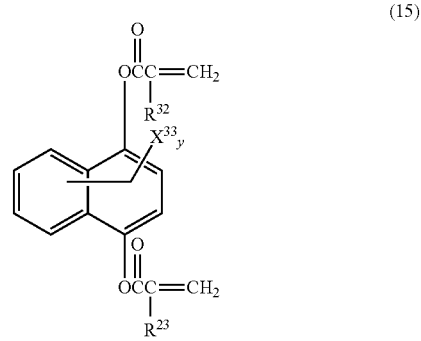

$X^{35}$ represents a direct bond or one linking group selected from the following group:

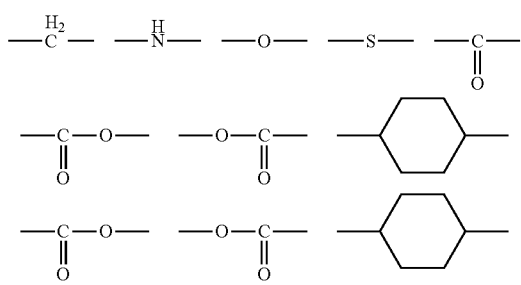

$R^{34}$ represents a hydrogen atom, a halogen atom, a hydroxyl group, a linear or branched alkyl group having 1 to 7 carbon atoms, a linear or branched alkoxy group having 1 to 7 carbon atoms, or a cyano group, y' represents an integer of 1 to 3 and, in the case where y' is 2 or more, two or more $-X^{34}-X^{35}-$ groups present in one molecule of the polymerizable monomer represented by the general formula (15) may be the same or different.

14. The liquid crystal composition according to claim 12, wherein the radical polymerization initiator is an acylphosphine oxide-based initiator.

15. The liquid crystal composition according to claim 12, wherein, when the content ratio of the polymerizable monomer represented by the general formula (13) to the liquid crystal composition is regarded as A % by mass and the content ratio of the radical polymerization initiator thereto is regarded as B % by mass, B/A is 0.01 or more and 0.4 or less.

16. The liquid crystal composition according to claim 12, wherein a liquid crystal-isotropic phase transition temperature is 40° C. or higher.

17. A liquid crystal element which comprises: a pair of substrates with electrodes, in which the substrates are arranged so as to face each other and at least one of the substrates is a transparent substrate; and a liquid crystal light adjusting layer which is disposed between the substrates and contains a composite containing a chiral nematic liquid crystal phase and a polymer resin phase, wherein the polymer resin phase contains a polymer compound having a repeating unit represented by the following general formula (5), and dielectric constant anisotropy of the chiral nematic liquid crystal phase is positive:

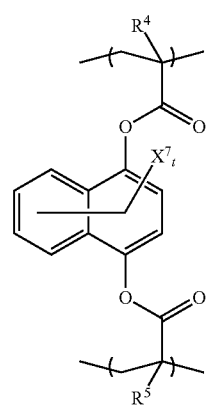

(5)

wherein $R^4$ and $R^5$ each independently represent a hydrogen atom or a methyl group, t represents an integer of 1 to 3 and, in the case where t is 2 or more, two or more $X^7$ groups present in one repeating unit represented by the general formula (5) may be the same or different, $X^7$ represents a group represented by the following general formula (6):

(6)

wherein $X^8$ represents a direct bond or one linking group selected from the following group:

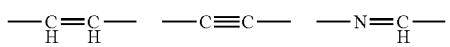

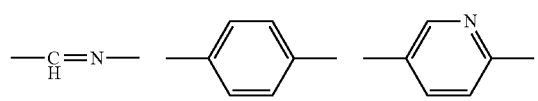

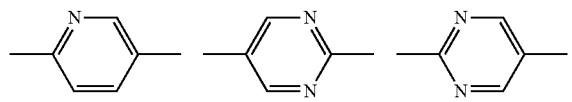

$X^9$ represents a direct bond or one linking group selected from the following group:

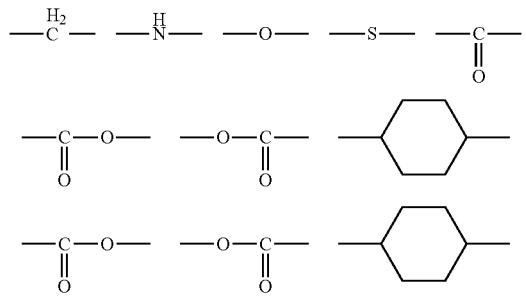

$R^6$ represents a hydrogen atom, a halogen atom, a hydroxyl group, a linear or branched alkyl group having 1 to 7 carbon atoms, a linear or branched alkoxy group having 1 to 7 carbon atoms, or a cyano group;

t' represents an integer of 1 to 3 and, in the case where t' is 2 or more, two or more $-X^8-X^9-$ groups present in one repeating unit represented by the general formula (5) may be the same or different.

* * * * *